United States Patent
Murakami

(10) Patent No.: US 11,470,453 B2
(45) Date of Patent: Oct. 11, 2022

(54) TRANSMISSION METHOD AND TRANSMISSION DEVICE

(71) Applicant: Panasonic Intellectual Property Corporation of America, Torrance, CA (US)

(72) Inventor: Yutaka Murakami, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 50 days.

(21) Appl. No.: 16/973,546

(22) PCT Filed: May 28, 2019

(86) PCT No.: PCT/JP2019/021114
§ 371 (c)(1),
(2) Date: Dec. 9, 2020

(87) PCT Pub. No.: WO2019/239881
PCT Pub. Date: Dec. 19, 2019

(65) Prior Publication Data
US 2021/0258739 A1    Aug. 19, 2021

(30) Foreign Application Priority Data
Jun. 11, 2018 (JP) .............................. JP2018-111090

(51) Int. Cl.
*H04W 4/06* (2009.01)
*H04W 72/04* (2009.01)

(52) U.S. Cl.
CPC ......... *H04W 4/06* (2013.01); *H04W 72/0453* (2013.01)

(58) Field of Classification Search
CPC ........................... H04W 4/06; H04W 72/0453
See application file for complete search history.

(56) References Cited

U.S. PATENT DOCUMENTS

| | | | |
|---|---|---|---|
| 10,469,197 B2 * | 11/2019 | Beale | .................... H04L 1/0028 |
| 2009/0154379 A1 | 6/2009 | Hayashi et al. | |
| 2012/0220239 A1 | 8/2012 | Hosoya et al. | |
| 2018/0294935 A1 | 10/2018 | Uchiyama | |
| 2019/0097751 A1 | 3/2019 | Li et al. | |

FOREIGN PATENT DOCUMENTS

| | | |
|---|---|---|
| JP | 2009-152670 A | 7/2009 |
| JP | 2017-139661 A | 8/2017 |
| WO | 2011/055536 A1 | 5/2011 |
| WO | 2017/193350 A1 | 11/2017 |

OTHER PUBLICATIONS

International Search Report, dated Jul. 30, 2019, for corresponding International Application No. PCT/JP2019/021114, 3 pages.

* cited by examiner

*Primary Examiner* — Joshua L Schwartz
(74) *Attorney, Agent, or Firm* — Seed IP Law Group LLP

(57) ABSTRACT

Provided is a transmission device, and with respect thereto, a first communication device and a second communication device have different relative speeds. The transmission device generates a first signal destined for the first communication device and a second signal destined for the second communication device. In a first period, the transmission device transmits the first signal using a first frequency region and transmits the second signal using a second frequency region.

7 Claims, 37 Drawing Sheets

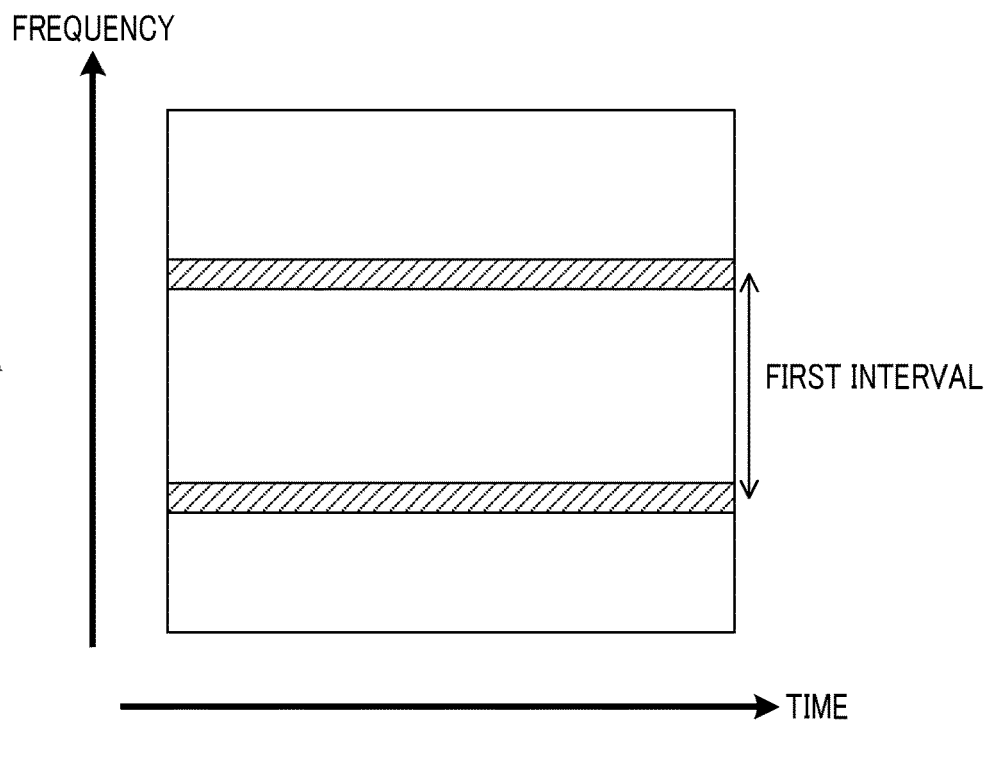
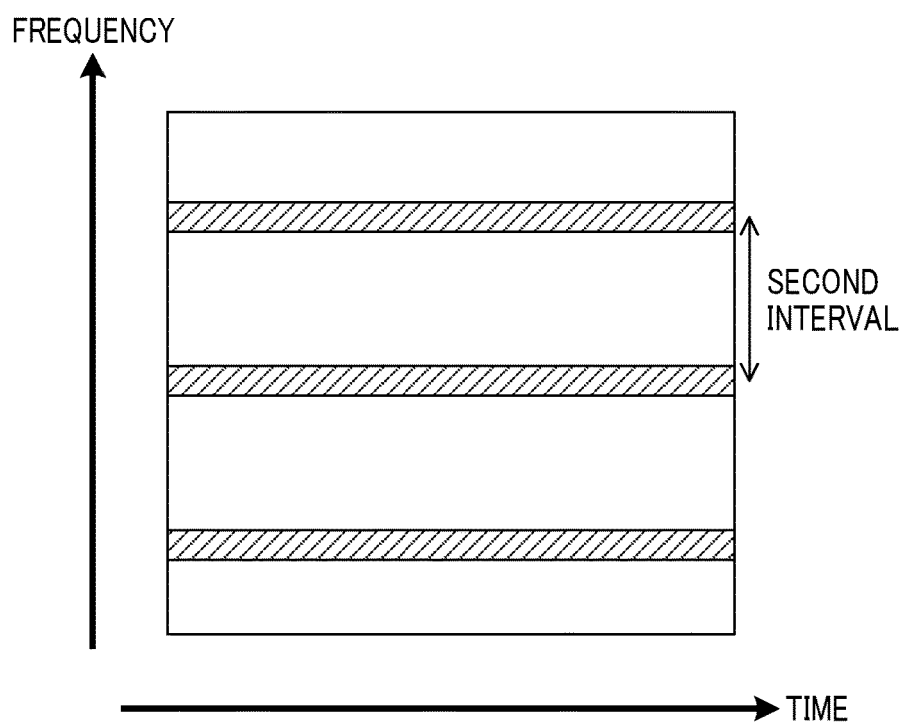

☒ 4001 : PILOT SYMBOL

☒ 4001 : PILOT SYMBOL

☒ 4001 : PILOT SYMBOL

☒ 4001 : PILOT SYMBOL

TRANSMISSION METHOD AND TRANSMISSION DEVICE

TECHNICAL FIELD

The present disclosure relates to a transmission method and a transmission apparatus.

BACKGROUND ART

A communication method called Multiple-Input Multiple-Output (MIMO), for example, is a conventional communication method using a plurality of antennas. Multi-antenna communication represented by MIMO makes it possible to increase data reception quality and/or data communication rate (per unit time) by modulating multiple streams of transmission data and by transmitting modulation signals respectively from different antennas using the same frequency (common frequency) at the same time (in the same transmission slot).

Further, when multicast/broadcast communication is performed in the multi-antenna communication, a semi-omni pattern antenna of allowing a transmission apparatus to have a substantially constant antenna gain over a wide range of directions in the space may be used. For example, Patent Literature (hereinafter, referred to as "PTL") 1 describes that a transmission apparatus transmits modulation signals using a semi-omni pattern antenna.

CITATION LIST

Patent Literature

PTL1
WO2011/055536

SUMMARY OF INVENTION

Further performance improvements are desired for communication methods using a plurality of antennas.

A transmission apparatus of one aspect of the present disclosure is a transmission apparatus that transmits a signal to a plurality of communication apparatuses, the transmission apparatus including: a signal processor, which in operation, generates a first signal addressed to a first communication apparatus whose relative speed to the transmission apparatus is less than a predetermined threshold, and a second signal addressed to a second communication apparatus whose relative speed to the transmission apparatus is equal to or greater than the predetermined threshold; and a radio transmitter, which in operation, transmits the first signal using a first frequency domain and the second signal using a second frequency domain in a first period.

According to the present disclosure, it is possible to improve performance in a communication method using a plurality of antennas.

BRIEF DESCRIPTION OF DRAWINGS

FIG. 25A illustrates an example of insertion of pilot symbols;
FIG. 25B illustrates an example of insertion of the pilot symbols.

DESCRIPTION OF EMBODIMENTS

Hereinafter, an embodiment of the present disclosure will be described with reference to the accompanying drawings.

EMBODIMENT

Example 1

Figure 1:
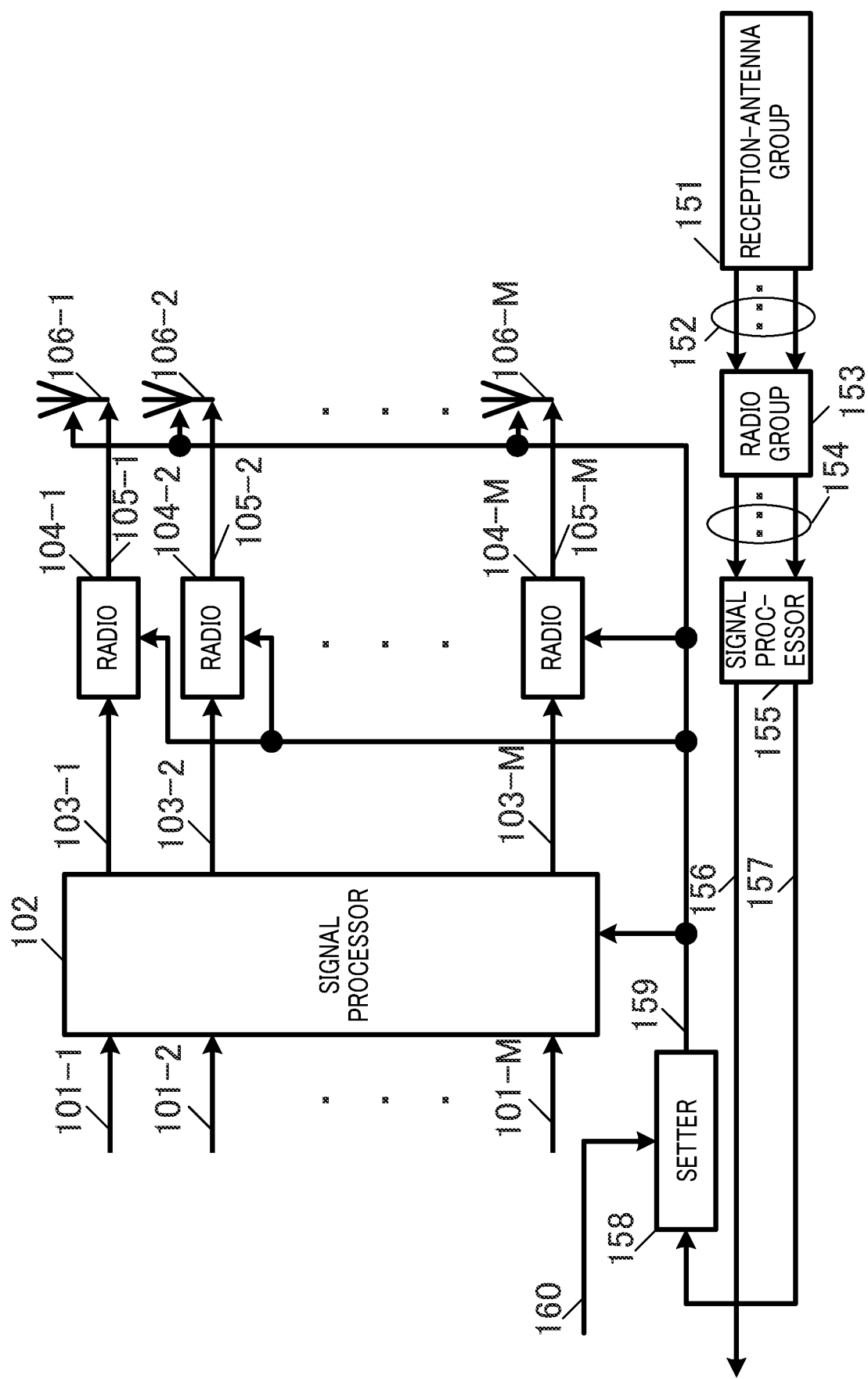
FIG. 1 illustrates an example of a configuration of a base station.

FIG. 1 illustrates an example of a configuration of a base station (or an access point or the like) according to the present embodiment.

Signal processor 102 receives inputs of #$i_a$ information 101-$i_a$ ("$i_a$" denotes an integer of from 1 through M, and "M" denotes an integer equal to or greater than 2), and control signal 159. Note that not all the pieces of information of from the #1 information to the #M information have to be present.

Signal processor 102 performs signal processing based on information such as "information on an error correction coding scheme (coding rate, code length (block length))," "information on a modulation scheme," "information on precoding," "a transmission method (multiplexing method)," "whether to perform multicast transmission or to perform unicast transmission (the multicast transmission and the unicast transmission may also be realized simultaneously)," "the number of transmission streams for multicasting," and "a transmission method in the case where a multicast modulation signal is transmitted (which will be described in detail later)," for example, included in control signal 159, and outputs #$i_a$ signal 103-#$i_a$ after the signal processing ("$i_a$" denotes an integer of from 1 through M).

Note that, not all the signals of from signal #1 after the signal processing to signal #M after the signal processing have to be present. Then, error correction coding is performed on #$i_a$ information 101-$i_a$, and thereafter, mapping according to a configured modulation scheme is performed. Accordingly, a baseband signal is obtained.

Then, baseband signals corresponding respectively to the pieces of information are collected to perform precoding. In addition, for example, Orthogonal Frequency Division Multiplexing (OFDM) may be applied.

Radio 104-$i_a$ ("$i_a$" denotes an integer of from 1 through M) receives inputs of signal 103-$i_a$ after the signal processing, and control signal 159, and performs processing e.g., of band limitation, frequency conversion, and amplification based on control signal 159 to output transmission signal 105-$i_a$ ("$i_a$" denotes an integer of from 1 through M). Then, transmission signal 105-$i$ ("i" denotes an integer of from 1 through M) is output as a radio wave from antenna section 106-$i_a$ ("$i_a$" denotes an integer of from 1 through M).

Note that, when there is no signal after signal processing, radios 104-$i_a$ do not have to perform the above processing.

Radio group 153 receives an input of reception signal group 152 received by reception-antenna group 151, and performs processing such as frequency conversion on the reception-signal group and outputs baseband-signal group 154.

Signal processor 155 receives an input of baseband-signal group 154, and performs demodulation and error correction decoding. For example, processes of time synchronization, frequency synchronization, and channel estimation are also performed. Since signal processor 155 receives modulation signals transmitted by one or more terminals and performs processing on the modulation signals at this time, the signal processor obtains data transmitted by each of the terminals and control information transmitted by each of the terminals. Accordingly, signal processor 155 outputs data group 156 corresponding to one or more terminals and control information group 157 corresponding to one or more terminals.

Setter 158 receives inputs of control information group 157 and configuration signal 160, and determines, based on control information group 157, the "error correction coding scheme (coding rate and code length (block length))," "modulation scheme," "precoding method," "transmission method," "antenna configuration," "whether to perform multicast transmission or to perform unicast transmission (the multicast transmission and the unicast transmission may be realized simultaneously)," "number of transmission streams for multicasting," and "transmission method for transmitting a multicast modulation signal," for example, to output control signal 159 including the determined information.

Antenna section 106-$i_a$ receives an input of control signal 159. An operation at this time will be described with reference to FIG. 2.

Figure 2:
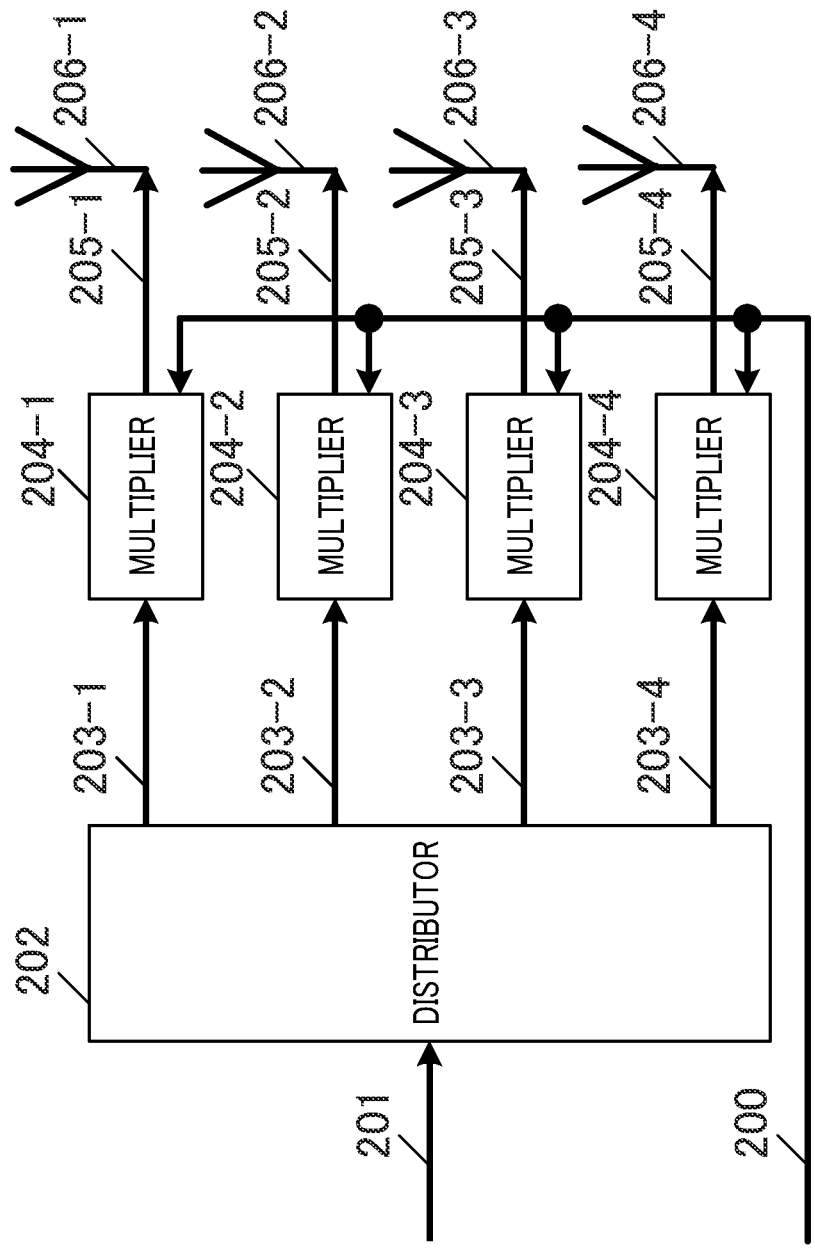
FIG. 2 illustrates an example of a configuration of an antenna section of the base station.

FIG. 2 illustrates an exemplary configuration of antenna section 106-$i_a$. In addition, each antenna section may include one or more antennas, and includes four antennas in FIG. 2.

Distributor 202 receives inputs of transmission signals 201 (corresponding to transmission signals 105-$i$ in FIG. 1), and distributes transmission signals 201 to output signals 203-1, 203-2, 203-3, and 203-4.

Multiplier 204-1 receives inputs of signal 203-1 and control signal 200 (corresponding to control signal 159 in FIG. 1), and multiplies signal 203-1 by factor W1 based on information on a multiplication factor included in control signal 200, to output signal 205-1 resulting from multiplication. Note that factor W1 is defined by a complex number. Thus, W1 may be a real number. Accordingly, when signal 203-1 is expressed as v1(t), signal 205-1 resulting from multiplication can be expressed as W1×v1(t) ("t" is hereinafter described as time, and will be defined each time it has another function). Then, signal 205-1 resulting from multiplication is output as a radio wave from antenna 206-1.

Note that the operations of multipliers 204-2, 204-3, and 204-4 are the same as those of multiplier 204-1 and, accordingly, the description thereof is omitted here. Note that the factors of complex numbers are denoted respectively by W2, W3, and W4, signals 203-2, 203-3, and 203-4 are denoted respectively by v2(t), v3(t), and v4(t), and signals 205-2, 205-3, and 205-4 resulting from multiplication are denoted respectively by W2×v2(t), W3×v3(t), and W4×v4(t), and, signals 205-2, 205-3, and 205-4 resulting from multiplication are output as radio waves from antennas 206-2, 206-3, and 206-4, respectively.

Note that, the absolute value of factor W1, the absolute value of factor W2, the absolute value of factor W3, and the absolute value of factor W4 may be equal to one another.

Figure 3:
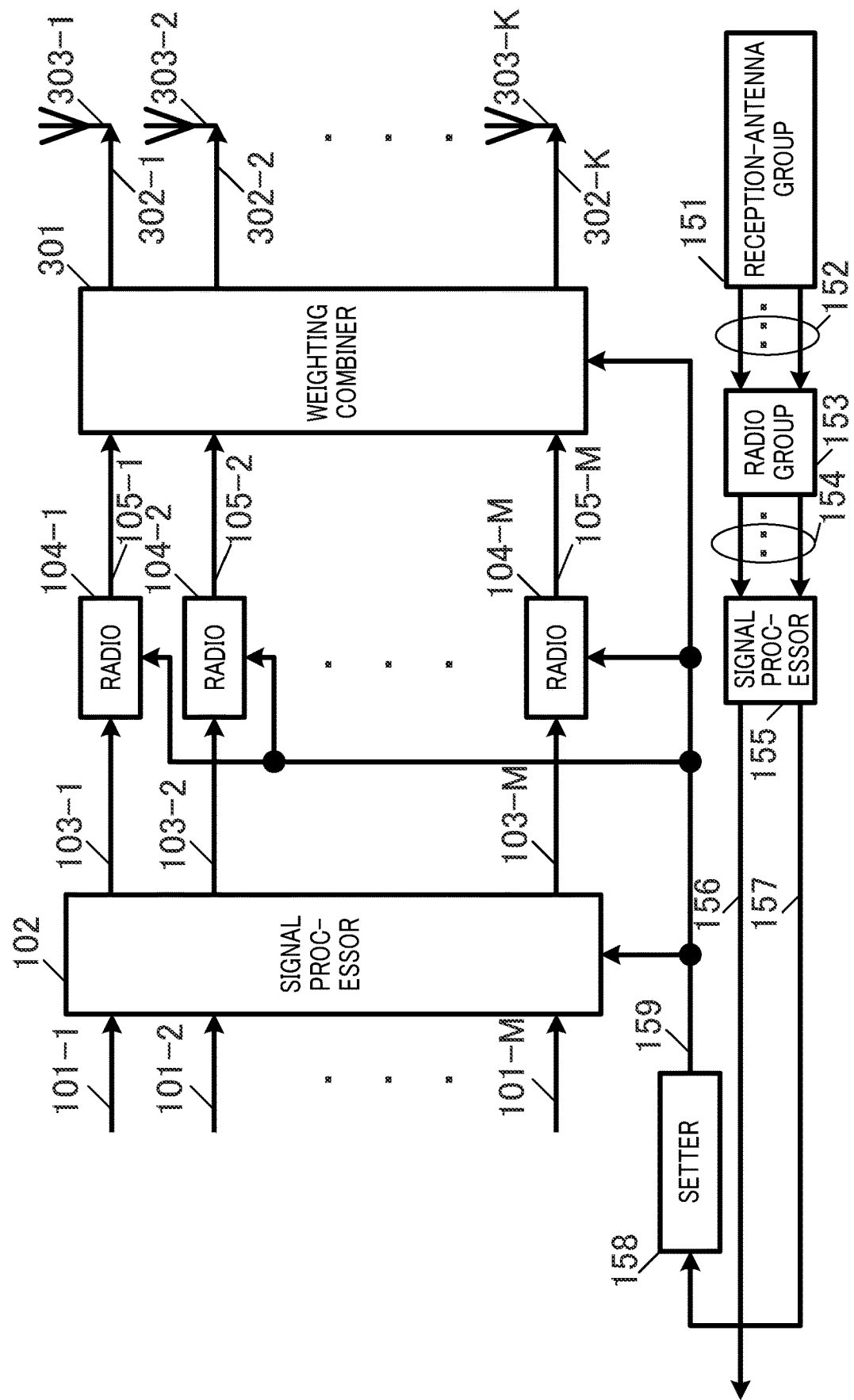
FIG. 3 illustrates an example of the configuration of the base station.

FIG. 3 illustrates a configuration of the base station different from the configuration of the base station of FIG. 1 in the present embodiment, and components in FIG. 3 that operate in the same manner as those in FIG. 1 are provided with the same reference numerals. The descriptions of those components are omitted below.

Weighting combiner 301 receives inputs of modulation signal 105-$i_a$ ("$i_a$" denotes an integer of from 1 through M) and control signal 159. Then, weighting combiner 301 performs weighted combination on modulation signals 105-

$i_a$ based on information on weighted combination included in control signal 159, to output signals 302-$i_b$ resulting from the weighted combination ("$i_b$" denotes an integer of from 1 through K, and "K" denotes an integer equal to or greater than 1). Then, signals 302-$i_b$ resulting from the weighted combination are output as radio waves from antennas 303-$i_b$.

Signal $y_{ib}(t)$ 302-$i_b$ resulting from the weighted combination ("$i_b$" denotes an integer of from 1 through K) is expressed as follows:

[1]

$$y_{ib}(t) = A_{ib1} \times x_1(t) + A_{ib2} \times x_2(t) + \ldots + A_{ibM} \times x_M(t) \quad \text{(Equation 1)}$$
$$= \sum_{j=1}^{M} A_{ibja} \times x_{ja}(t)$$

In Equation 1, "$A_{ibja}$" is a value that can be defined by a complex number, and "$A_{ibja}$" can thus be a real number. Accordingly, "$x_{ja}(t)$" represents modulation signal 105-$ja$. The character "$j_a$" denote an integer of from 1 through M.

<Configuration of Terminal>

Figure 4:
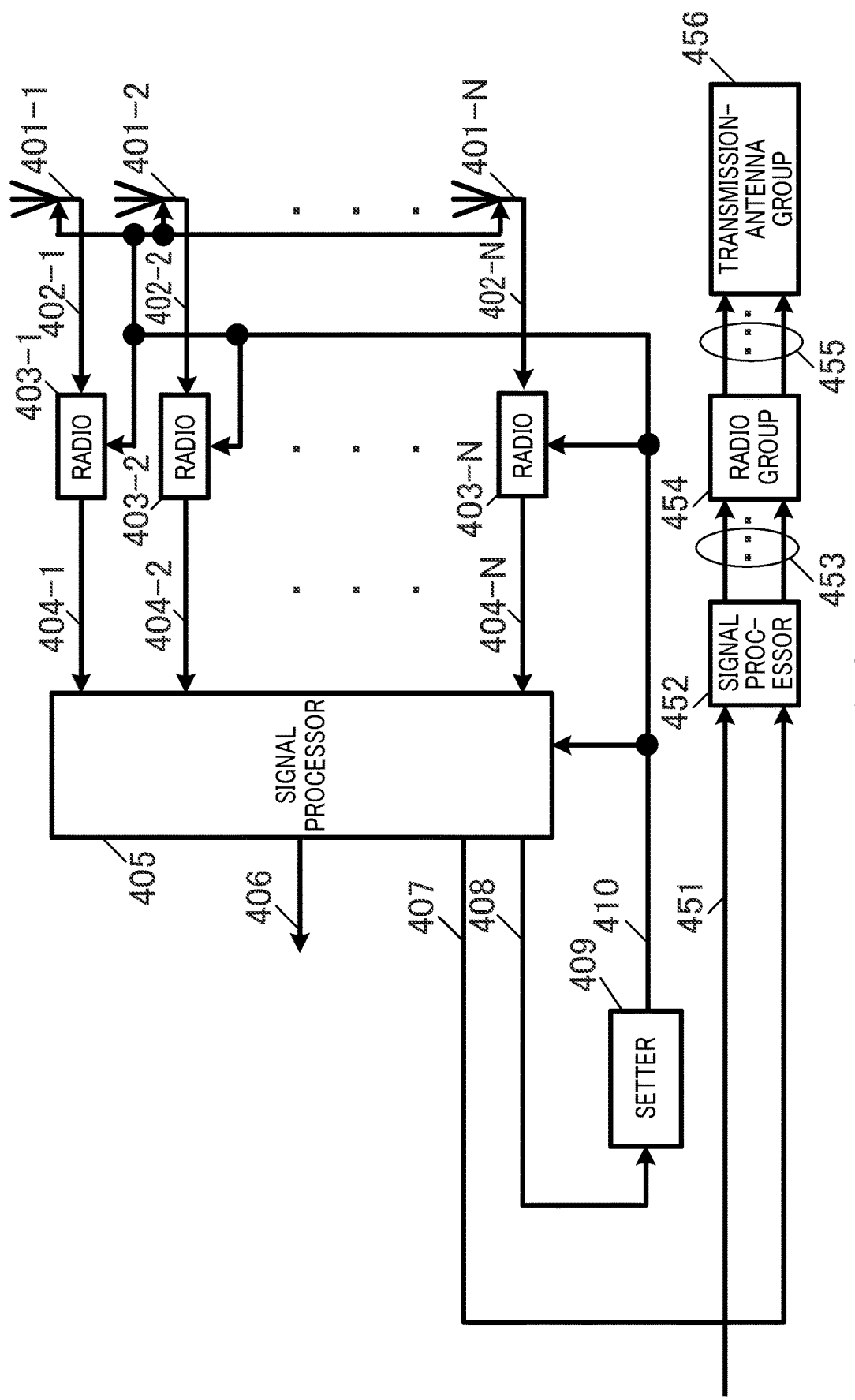
FIG. 4 illustrates an example of a configuration of a terminal.

FIG. 4 illustrates an example of a configuration of a terminal. Antenna section 401-$i_c$ ("$i_c$" denotes an integer of from 1 through N, and "N" denotes an integer equal to or greater than 1) receives an input of control signal 410.

Radio 403-$i_c$ ("$i_c$" denotes an integer of from 1 through N, and "N" denotes an integer equal to or greater than 1) receives inputs of reception signal 402-$i_c$ received by antenna section 401-$i_c$ and control signal 410, and performs processing such as frequency conversion and the like on reception signal 402-$i_c$ based on control signal 410 to output baseband signal 404-$i_c$.

However, not all radios 403-$i_c$ have to operate. Thus, not all baseband signals 404-$i_c$ have to be present.

Signal processor 405 receives inputs of baseband signal 404-$i_c$ and control signal 410, and performs processing of demodulation and error correction decoding based on control signal 410 to output data 406, transmission control information 407, and control information 408. For example, signal processor 405 also performs processing of time synchronization, frequency synchronization, and channel estimation.

Setter 409 receives an input of control information 408, and performs setting for a reception method and outputs control signal 410.

Signal processor 452 receives inputs of information 451 and transmission control information 407, and performs processing e.g., of error correction encoding and mapping according to a configured modulation scheme, to output baseband-signal group 453.

Radio group 454 receives an input of baseband-signal group 453, and performs processing of band limitation, frequency conversion, amplification, and/or the like to output transmission-signal group 455, and, transmission-signal group 455 is output from transmission antenna group 456 as radio waves.

Figure 5:
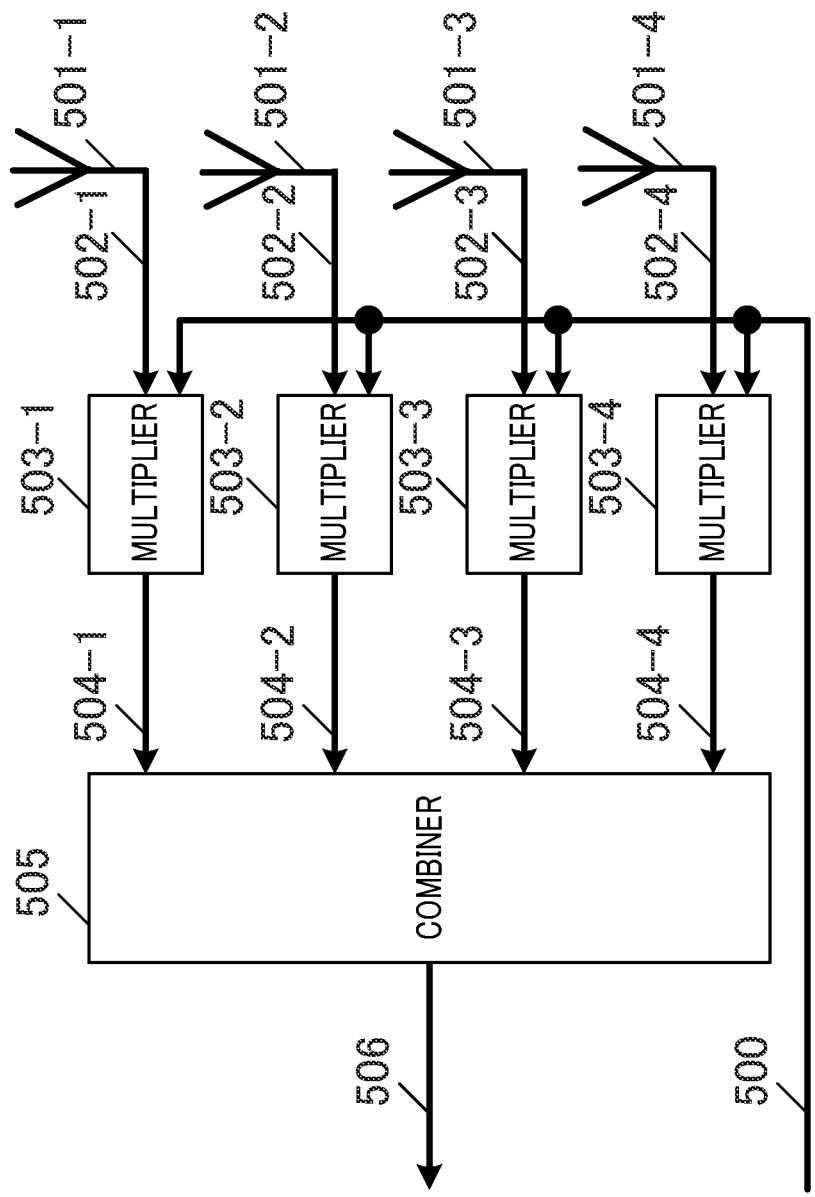
FIG. 5 illustrates an example of a configuration of an antenna section of the terminal.

FIG. 5 illustrates an example of a configuration of antenna section 401-$i_c$ ("$i_c$" denotes an integer of from 1 through N, and "N" denotes an integer equal to or greater than 1). Each antenna section may include one or more antennas, and includes four antennas in FIG. 5.

Multiplier 503-1 receives inputs of reception signal 502-1 received by antenna 501-1 and control signal 500 (corresponding to control signal 410 in FIG. 4), and multiplies reception signal 502-1 by factor D1 based on the information on the multiplication factor included in control signal 500, to output signal 504-1 resulting from multiplication. Note that factor D1 is defined by a complex number. Thus, D1 can also take a real number. Accordingly, when reception signal 502-1 is expressed as e1(t), signal 504-1 resulting from multiplication can be expressed as D1×e1(t).

Note that the operations of multipliers 503-2, 503-3, and 503-4 are the same as those of multiplier 503-1 and, accordingly, the descriptions thereof are omitted here. Note that, factors D2, D3, and D4 are defined by complex numbers, reception signal 502-2 is defined as e2(t), reception signal 502-3 is defined as e3(t), reception signal 502-4 is defined as e4(t), signal 504-2 resulting from multiplication is defined as D2×e2(t), signal 504-3 resulting from multiplication is defined as D3×e3(t), and signal 504-4 resulting from multiplication is defined as D4×e4(t).

Combiner 505 receives inputs of signals 504-1, 504-2, 504-3, and 504-4 resulting from multiplication, and adds together signals 504-1, 504-2, 504-3, and 504-4 resulting from multiplication to output combined signal 506 (corresponding to reception signal 402-$i$ in FIG. 4). Accordingly, combined signal 506 is expressed as D1×e1(t)+D2×e2(t)+D3×e3(t)+D4×e4(t).

Figure 6:
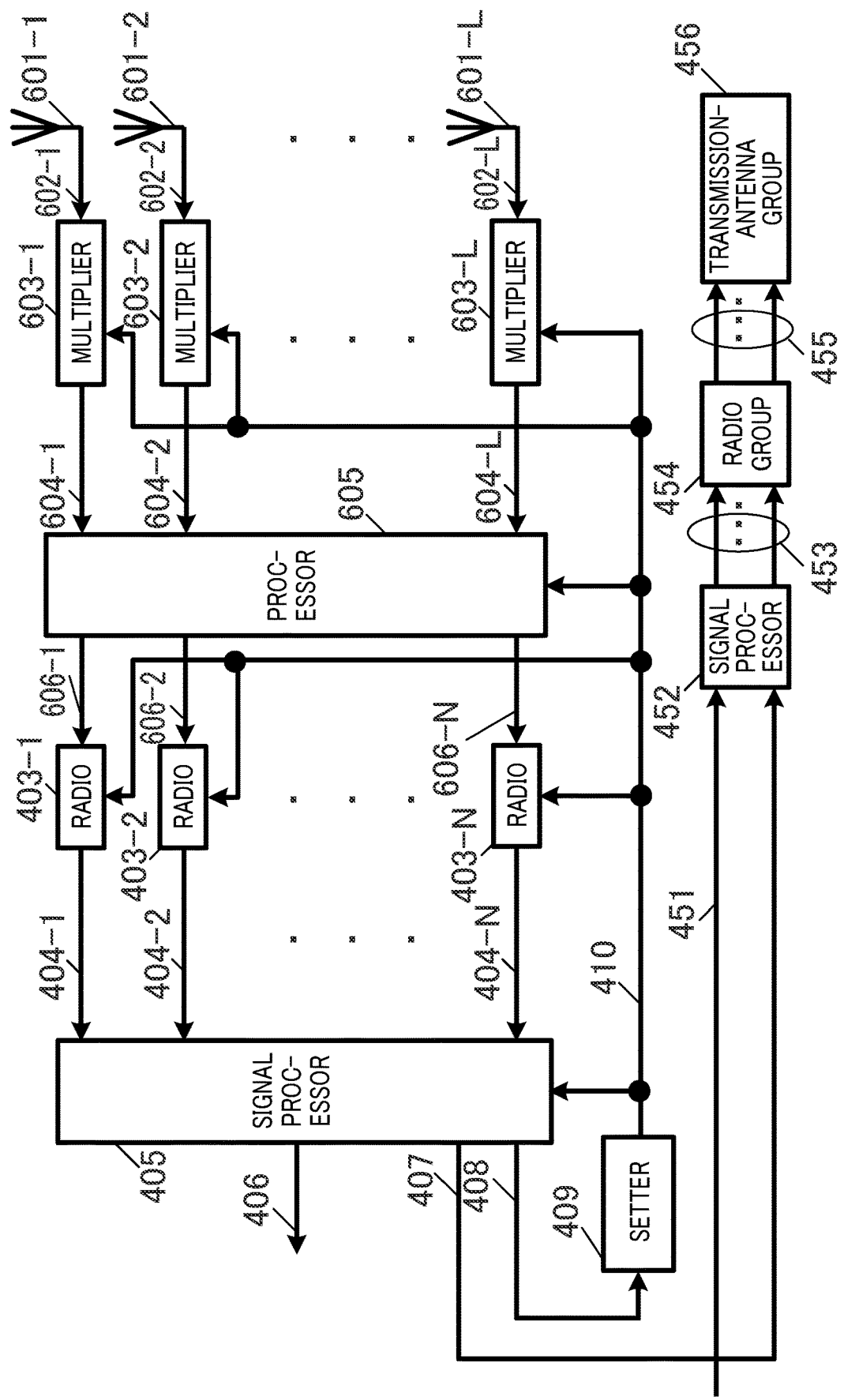
FIG. 6 illustrates an example of the configuration of the terminal.

FIG. 6 illustrates a configuration of a terminal different from the configuration of the terminal of FIG. 4, and components in FIG. 6 that operate in the same manner as those in FIG. 4 are provided with the same reference numerals. The descriptions of those components are omitted below.

Multiplier 603-1 receives inputs of reception signal 602-1 received by antenna 601-1 and control signal 410, and multiplies reception signal 602-1 by factor G1 based on information on a multiplication factor included in control signal 410, to output signal 604-1 resulting from multiplication. Note that factor G1 can be defined by a complex number. Thus, G1 can also take a real number. Accordingly, when reception signal 602-1 is expressed as c1(t), signal 604-1 resulting from multiplication can be expressed as G1×c1(t).

Similarly, Multiplier 603-2 receives inputs of reception signal 602-2 received by antenna 601-2 and control signal 410, and multiplies reception signal 602-2 by factor G2 based on the information on the multiplication factor included in control signal 410, to output signal 604-2 resulting from multiplication. Note that factor G2 can be defined by a complex number. Thus, G2 can also take a real number. Accordingly, when reception signal 602-2 is expressed as c2(t), signal 604-2 resulting from multiplication can be expressed as G2×c2(t). The descriptions of multipliers 603-3 to 603-(L−1) are omitted.

Multiplier 603-L receives inputs of reception signal 602-L received by antenna 601-L and control signal 410, and multiplies reception signal 602-L by factor GL based on the information on the multiplication factor included in control signal 410, to output signal 604-L resulting from multiplication. Note that factor GL can be defined by a complex number. Thus, GL can also take a real number. Accordingly, when reception signal 602-L is expressed as cL(t), signal 604-L resulting from multiplication can be expressed as GL×cL(t).

Thus, multiplier 603-$i_d$ receives inputs of reception signal 602-$i_d$ received by the antenna 601-$i_d$ and control signal 410, and multiplies reception signal 602-$i_d$ by factor G$i_d$ based on information on a multiplication factor included in control signal 410, to output signal 604-$i_d$ resulting from multiplication. Note that factor G$i_d$ can be defined by a complex number. Thus, $Gi_d$ can also take a real number. Accordingly, when reception signal $602\text{-}i_d$ is expressed as $ci_d(t)$, signal $604\text{-}i_a$ resulting from multiplication can be expressed as $Gi_d \times ci_d(t)$. Note that, "$i_d$" denotes an integer of from 1 through L, and "L" denotes an integer equal to or greater than 2.

Processor 605 receives inputs of signal 604-1 resulting from multiplication, signal 604-2 resulting from multiplication, . . . , and/or signal 604-L resulting from multiplication and control signal 410, and performs signal processing based on control signal 410, to output processed signals 606-1, 606-2, . . . , and/or 606-N. The letter "N" denotes an integer equal to or greater than 2. In this case, signal $604\text{-}i_d$ resulting from multiplication is expressed as $p_i(t)$. Letting "$i_d$" be an integer of from 1 through L, processed signal 606-$j_b$ ($r_j(t)$) ("$j_b$" denotes an integer of from 1 through N) is expressed as follows:

[2]

$$r_j(t) = B_{jb1} \times p_1(t) + B_{jb2} \times p_2(t) + \ldots + B_{jbL} \times p_L(t) \quad \text{(Equation 2)}$$

$$= \sum_{i=1}^{L} B_{jbid} \times p_i(t)$$

Note that, in Equation 2, $B_{jbid}$ is a value that can be defined by a complex number. Thus, $B_{jbid}$ can also take a real number.

The operation of setter 158 of the base station illustrated in FIG. 1 or 3 will be described.

Setter 158 receives an input of configuration signal 160. Configuration signal 160 includes the information on "whether to perform multicast transmission or to perform unicast transmission," and when the base station performs transmission as illustrated in FIG. 7, configuration signal 160 provides an input of the information "multicast transmission is to be performed" into setter 158.

Figure 7:
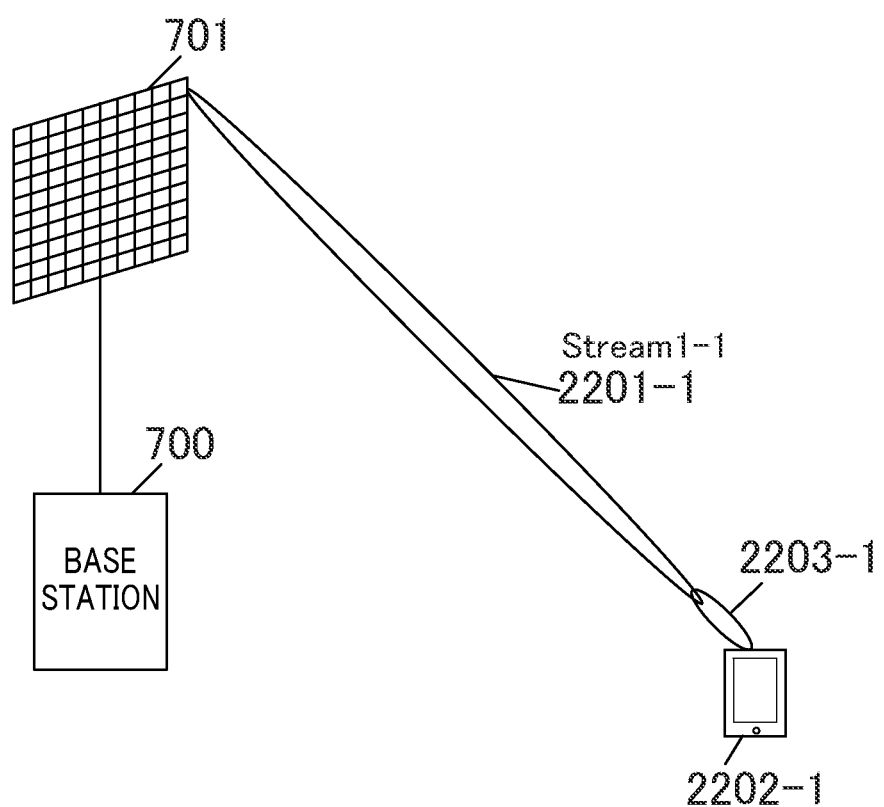
FIG. 7 illustrates an example of a communication state between the base station and the terminal.

Configuration signal 160 includes information on the "number of transmission streams for multicasting," and when the base station performs transmission as illustrated in FIG. 7, configuration signal 160 provides an input of the information "the number of transmission streams is 2" into setter 158.

Configuration signal 160 may also include information on "how many transmission beams are used to transmit each stream." When the base station performs transmission as illustrated in FIG. 7, configuration signal 160 provides an input of the information "the number of transmission beams for transmitting stream 1 is 3 and the number of transmission beams for transmitting stream 2 is 3" into setter 158.

Note that, the base station of FIG. 1 or 3 may transmit a control information symbol including information on whether data symbols are "multicast transmission/unicast transmission," information on "the number of transmission streams for multicasting," information on "how many transmission beams are used to transmit each stream," and/or the like. It is thus possible for the terminal to perform suitable reception. Details of the configuration of the control information symbol will be described later.

Example 2

In the present example, a multicast communication method in which beamforming is applied in addition to the configuration of Example 1 will be described.

The configuration of the base station is as described with reference to FIGS. 1 to 3 and, accordingly, part of the configuration for the same operations is not described. In addition, the configuration of the terminal that communicates with the base station is as described with reference to FIGS. 4 to 6 and, accordingly, part of the configuration for the same operations is not described.

Hereinafter, an example of operation of the base station and the terminal in the multicast communication method in which beamforming is applied will be described.

FIG. 7 illustrates a case where the base station transmits a multicast transmission stream to one terminal.

In FIG. 7, base station 700 transmits transmission beam 2201-1 of "(multicast) stream 1-1 (first beam of stream 1)" from transmission antenna 701 to terminal 2202-1, and terminal 2202-1 performs directivity control to generate reception directivity 2203-1, and receives transmission beam 2201-1 of "stream 1-1."

Figure 8:
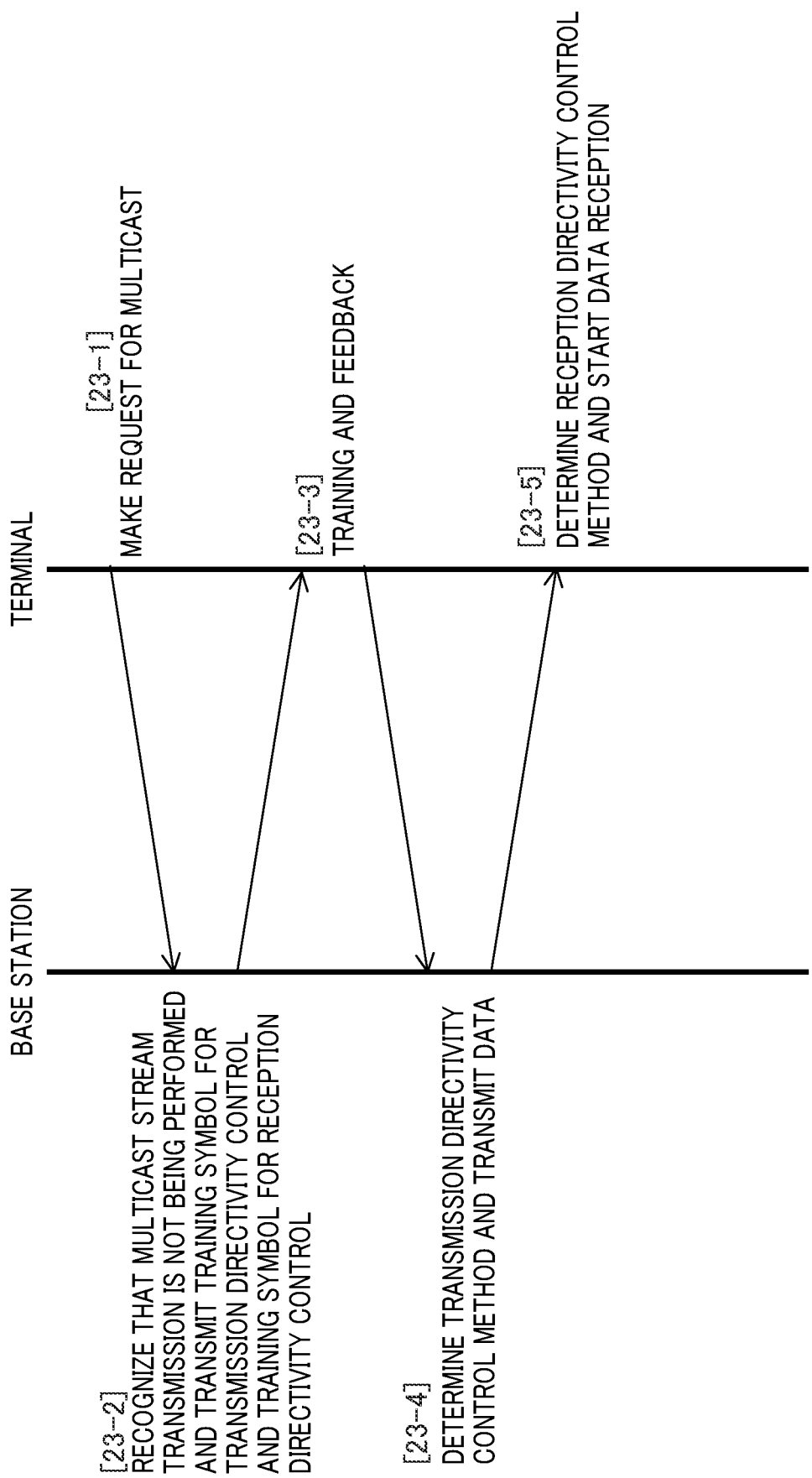
FIG. 8 illustrates a procedure for performing communication between the base station and the terminal.

FIG. 8 explains a "procedure for performing communication between the base station and the terminal" which is to be performed for the communication state between the base station and the terminal as illustrated in FIG. 7.

[23-1] To begin with, the terminal makes a "request for multicast transmission of stream 1" to the base station.

[23-2] In response to [23-1], the base station recognizes that "multicast transmission of stream 1 is not being performed." Accordingly, the base station transmits to the terminal a training symbol for transmission directivity control and a training symbol for reception directivity control in order to perform multicast transmission of stream 1.

[23-3] The terminal receives the training symbol for transmission directivity control and the training symbol for reception directivity control transmitted by the base station, and transmits feedback information to the base station in order for the base station to perform the transmission directivity control and for the terminal to perform the reception directivity control.

[23-4] Based on the feedback information transmitted by the terminal, the base station determines a method for transmission directivity control (for example, determines a weighting factor used for performing the directivity control), performs the transmission directivity control, and transmits data symbols of stream 1.

[23-5] The terminal determines a reception directivity control method (for example, determines a weighting factor used for performing the directivity control) and starts receiving the data symbols of stream 1 transmitted by the base station.

Note that the "procedure for performing communication between the base station and the terminal" in FIG. 8 is an example, and the order of transmissions of information is not limited to that of FIG. 8. Accordingly, the procedure can also be implemented even with a different order of transmissions of information. In addition, although a case in which the terminal performs the reception directivity control has been described as an example with reference to FIG. 8, the present disclosure is applicable to a case in which the terminal does not perform the reception directivity control. In this case, the base station does not have to transmit the training symbol for reception directivity control, and the terminal does not determine the reception directivity control method in FIG. 8.

In addition, when the base station performs the transmission directivity control and the base station has the configuration of FIG. 1, multiplication factors of multipliers 204-1, 204-2, 204-3, and 204-4 in FIG. 2 are set, for example. Further, when the base station performs the transmission directivity control and when the base station has the configuration of FIG. 3, a weighting factor of weighting-combiner 301 is set, for example. Note that, the number of streams to be transmitted is "1" in the case of FIG. 7, but is not limited thereto.

In addition, when the terminal performs the reception directivity control and the terminal has the configuration of FIG. 4, multiplication factors of multipliers 503-1, 503-2, 503-3, and 503-4 in FIG. 5 are set, for example. Further, when the terminal performs the reception directivity control and when the terminal has the configuration of FIG. 6, multiplication factors of multipliers 603-1, 603-2, . . . , and 603-L are set, for example.

Figure 9:
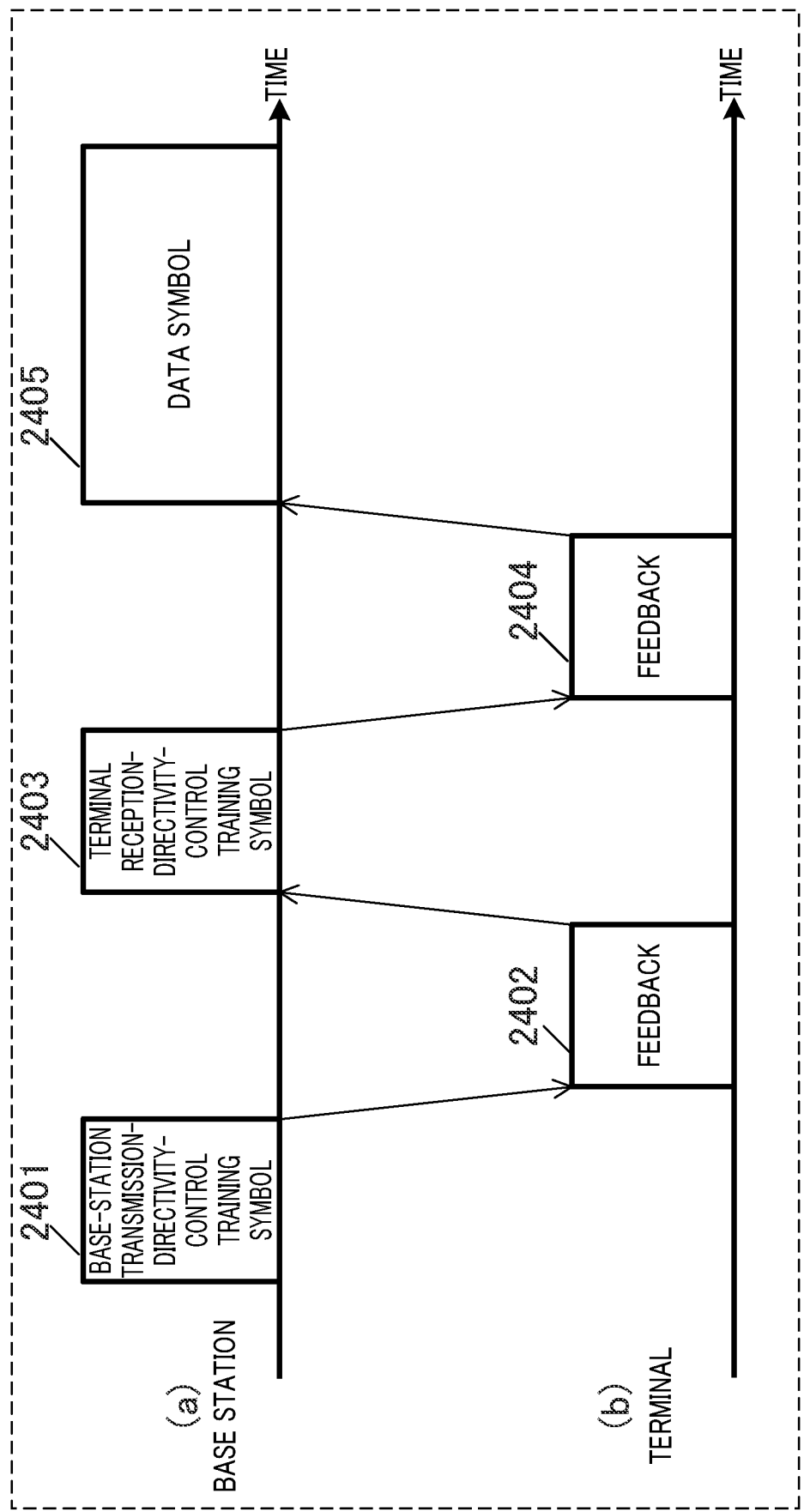
FIG. 9 illustrates an example of symbols transmitted by the base station and the terminal.

FIG. 9 illustrates an example of symbols transmitted by the base station and symbols transmitted by the terminal on the time axis in a case where the base station in FIG. 8 transmits the transmission directivity control symbol, the reception directivity control symbol, and the data symbols. FIG. 9 illustrates, at (a), an example of symbols on the time axis transmitted by the base station, and illustrates, at (b), an example of symbols on the time axis transmitted by the terminal. Both the horizontal axes represent time.

When communication is performed between the base station and the terminal as illustrated in FIG. 8, the base station first transmits "base-station transmission-directivity-control training symbol" 2401 as illustrated in FIG. 9. For example, "base-station transmission-directivity-control training symbol" 2401 is composed of a control information symbol and a known PSK symbol.

Then, the terminal receives "base-station transmission-directivity-control training symbol" 2401 transmitted by the base station, and transmits, for example, information on an antenna used by the base station for transmission and information on the multiplication factor (or the weighting factor) used in directivity control as "feedback information symbol" 2402.

The base station receives "feedback information symbol" 2402 transmitted by the terminal, and determines an antenna to be used for transmission from "feedback information symbol" 2402. The base station also determines a factor to be used for transmission directivity control from "feedback information symbol" 2402. Then, the base station transmits "terminal reception-directivity-control training symbol" 2403. For example, "terminal reception-directivity-control training symbol" 2403 is composed of a control information symbol and a known PSK symbol.

Then, the terminal receives "terminal reception-directivity-control training symbol" 2403 transmitted by the base station, and determines, for example, an antenna used by the terminal for reception and a multiplication factor used by the terminal for reception directivity control. The terminal transmits "feedback information symbol" 2404 to indicate completion of preparation for receiving data symbols.

Then, the base station receives "feedback information symbol" 2404 transmitted by the terminal, and outputs "data symbols" 2405 based on "feedback information symbol" 2404.

Note that, the communication between the base station and the terminal of FIG. 9 is an example, and the order of transmissions of the symbols and/or the order of transmissions by the base station and transmissions by the terminal is not limited to the example. Further, each of "base-station transmission-directivity-control training symbol" 2401, "feedback information symbol" 2402, "terminal reception-directivity-control training symbol" 2403, "feedback information symbol" 2404, and "data symbols" 2405 may include: a preamble, a reference symbol, and/or a pilot symbol for signal detection, time synchronization, frequency synchronization, frequency offset estimation, and channel estimation; a symbol for transmitting control information; and/or the like.

Figure 10:
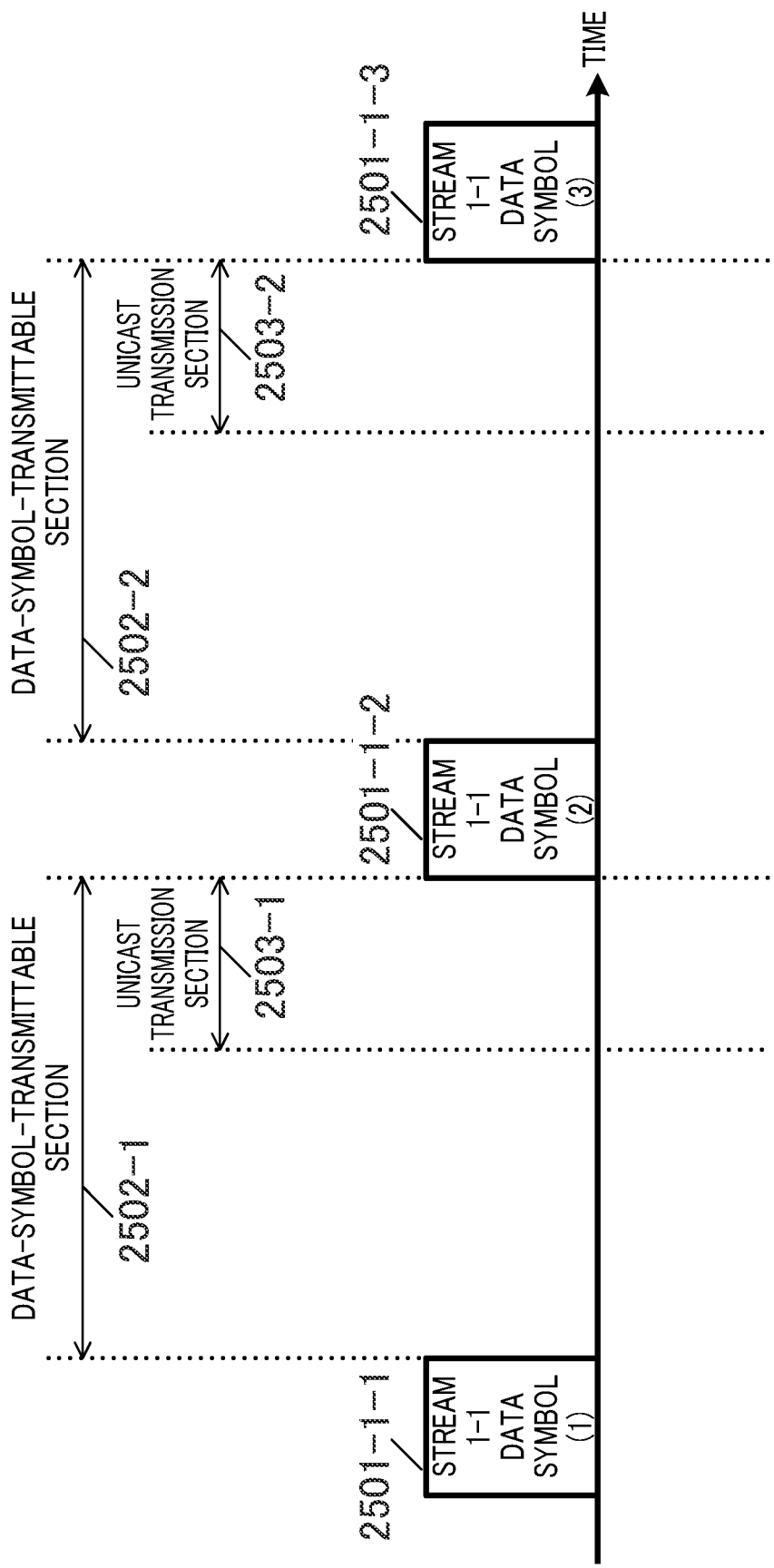
FIG. 10 illustrates an example of symbols transmitted by the base station.

FIG. 10 illustrates an example of symbols transmitted by the base station when the base station transmits the data symbols of stream 1 after the communication between the base station and the terminal in FIG. 8 is completed. The horizontal axis represents time.

In FIG. 10, the base station transmits the first data symbol of transmission beam 1 of stream 1 as "(multicast) stream 1-1 data symbol (1)" 2501-1-1. A section in which data symbols are transmittable (hereinafter, referred to as "data-symbol-transmittable section") 2502-1 is arranged behind the first data symbol.

Thereafter, the base station transmits the second data symbol of transmission beam 1 of (multicast) stream 1 as "(multicast) stream 1-1 data symbol (2)" 2501-1-2. Data-symbol-transmittable section 2502-2 is arranged behind the second data symbol.

Thereafter, the base station transmits the third data symbol of transmission beam 1 of (multicast) stream 1 as "(multicast) stream 1-1 data symbol (3)" 2501-1-3.

The base station thus transmits the data symbols of "(multicast) stream 1-1" 2201-1 illustrated in FIG. 7. Note that, in FIG. 10, "(multicast) stream 1-1 data symbol (1)" 2501-1-1, "(multicast) stream 1-1 data symbol (2)" 2501-1-2, "(multicast) stream 1-1 data symbol (3)" 2501-1-3, and the like may include: a preamble, a reference symbol, and/or a pilot symbol for signal detection, time synchronization, frequency synchronization, frequency offset estimation, and channel estimation; a symbol for transmitting control information; and/or the like in addition to the data symbols.

Note that, in FIG. 10, data-symbol-transmittable section 2502-1 includes unicast transmission section 2503-1, and data-symbol-transmittable section 2502-2 includes unicast transmission section 2503-2.

In FIG. 10, the frame includes unicast transmission sections 2503-1 and 2503-2. For example, in FIG. 10, the base station may transmit multicast symbols in a section of data-symbol-transmittable section 2502-1 other than unicast transmission section 2503-1 and a section of data-symbol-transmittable section 2502-2 other than unicast transmission section 2503-2. A description in this respect will be given below using an example.

Providing a frame with unicast transmission sections as described above is a useful configuration requirement for stably operating a radio communication system. A description of an example will be given below in this respect. Note also that, the unicast transmission sections do not have to be in the temporal positions as illustrated in FIG. 10, and may be arranged in any temporal position. Note that, in the unicast transmission sections, the base station may transmit a symbol or the terminal may transmit a symbol.

Further, the base station may be configured to be capable of directly setting a unicast transmission section, but alternatively, the base station may set a maximum transmit data rate for transmitting multicast symbols.

For example, when the transmission rate for data transmittable by the base station is 2 Gbps (bps: bits per second) and the maximum transmission rate for data that can be allocated for the base station to transmit multicast symbols is 1.5 Gbps, a unicast transmission section equivalent to 500 Mbps can be set.

As is understood, the base station may be configured to indirectly set the unicast transmission section. Note that, another specific example will be described below.

Note that, correspondingly to the state of FIG. 7, FIG. 10 illustrates the frame configuration in which "(multicast) stream 1-1 data symbol (1)" 2501-1-1, "(multicast) stream 1-1 data symbol (2)" 2501-1-2, and "(multicast) stream 1-1 data symbol (3)" 2501-1-3 are present, but the present disclosure is not limited thereto. For example, there may be data symbols of a multicast stream other than stream 1 (stream 1-1), data symbols of stream 1-2 that is the second transmission beam of stream 1, and/or data streams of stream 1-3 that is the third transmission beam of stream 1. A description will be given below in this respect.

Figure 11:
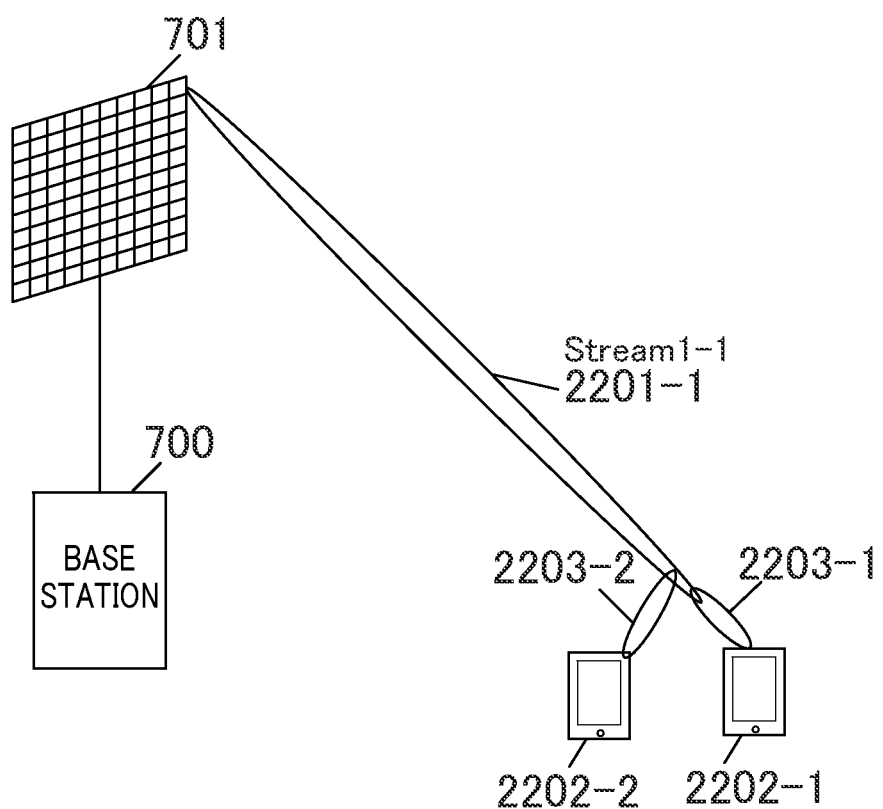
FIG. 11 illustrates an example of the communication state between the base station and the terminal.

FIG. 11 illustrates the state in which the base station illustrated in FIG. 7 is transmitting a multicast transmission stream to one terminal and to which one new terminal is added, and components in FIG. 11 that operate in the same manner as those in FIG. 7 are provided with the same reference numerals.

In FIG. 11, the newly added terminal is terminal 2202-2. Terminal 2202-2 performs directivity control to generate reception directivity 2203-2, and receives transmission beam 2201-1 of "(multicast) stream 1-1."

Figure 12:
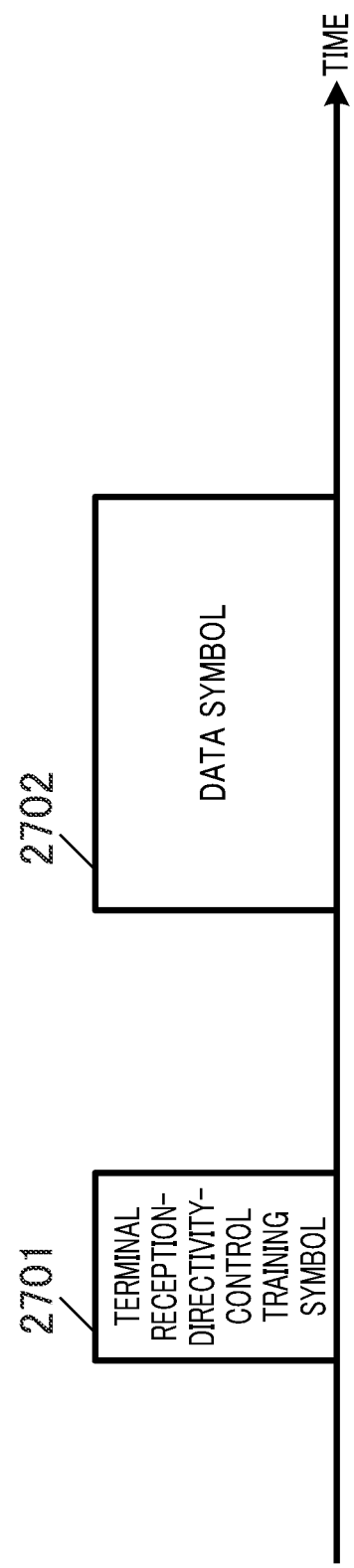
FIG. 12 illustrates an example of symbols transmitted by the base station.

Next, a description will be given with reference to FIG. 12.

The description below relates to the state of FIG. 11 in which terminal 2202-2 newly participates in the multicast communication being performed between base station 700 and terminal 2202-1. As illustrated in FIG. 12, the base station transmits "terminal reception-directivity-control training symbol" 2701 and "data symbols" 2702, but does not transmit the "base-station transmission training symbol" illustrated in FIG. 9. Note that the horizontal axis represents time in FIG. 12.

Figure 13:
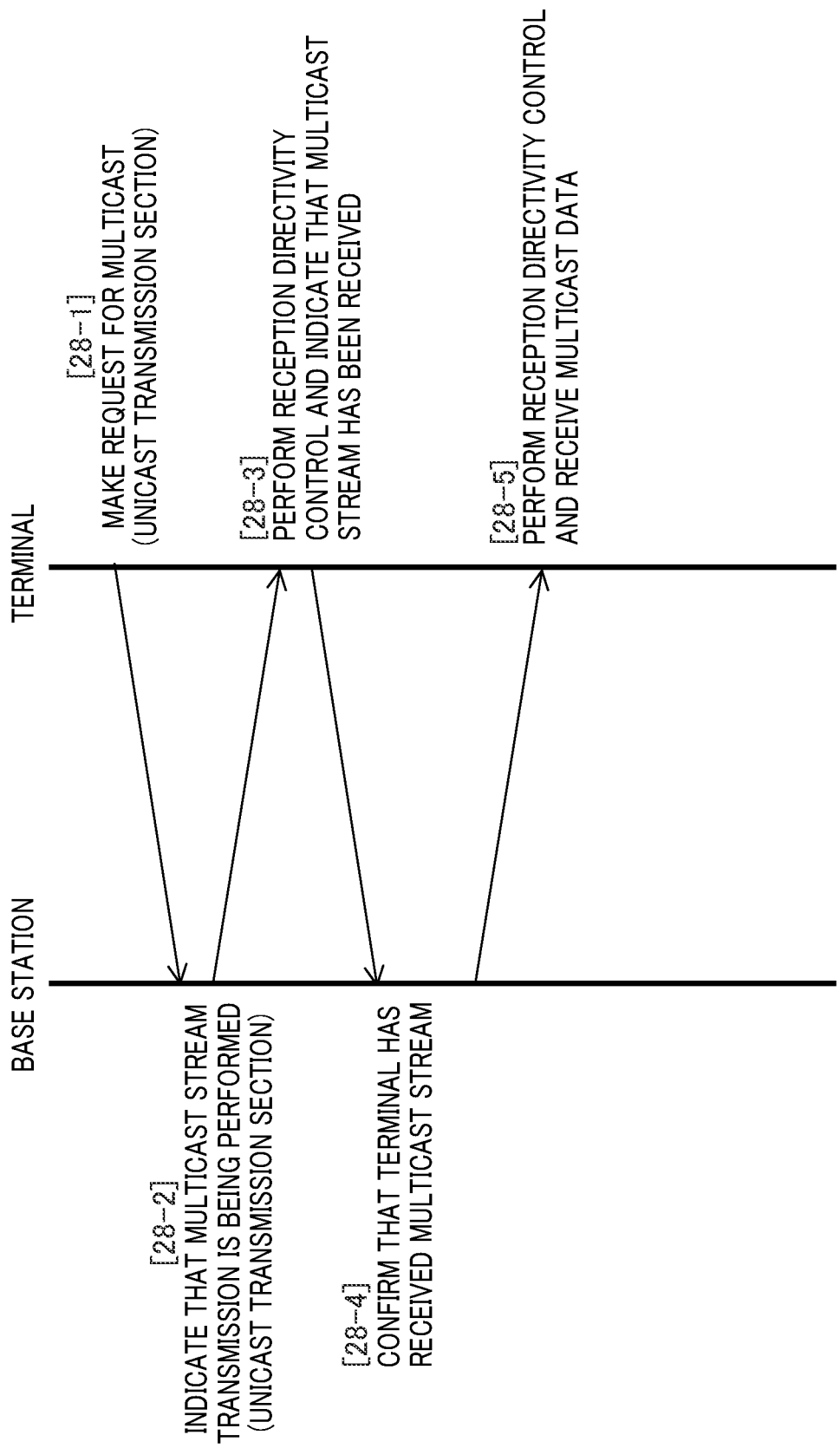
FIG. 13 illustrates a procedure for performing communication between the base station and the terminal.

FIG. 13 illustrates an example of an operation performed in order to achieve the state as illustrated in FIG. 11 in which the base station transmits multicast transmission beams to two terminals.

[28-1] Terminal 2202-2 makes a "request for multicast transmission of stream 1" to the base station. Note that, the "request for multicast transmission of stream 1" is transmitted in one of the unicast transmission sections illustrated in FIG. 10.

[28-2] In response to [28-1], the base station indicates to terminal 2202-2 that "multicast stream 1 is being transmitted." Note that, the indication "multicast stream 1 is being transmitted" is transmitted in one of the unicast transmission sections illustrated in FIG. 10.

[28-3] In response to [28-2], terminal 2202-2 performs reception directivity control in order to start receiving multicast stream 1. Terminal 2202-2 then performs the reception directivity control and indicates to the base station that "multicast stream 1" has been received successfully.

[28-4] In response to [28-3], the base station confirms that the terminal has successfully received "multicast stream 1."

[28-5] Terminal 2202-2 performs the reception directivity control and starts receiving "multicast stream 1."

Figure 14:
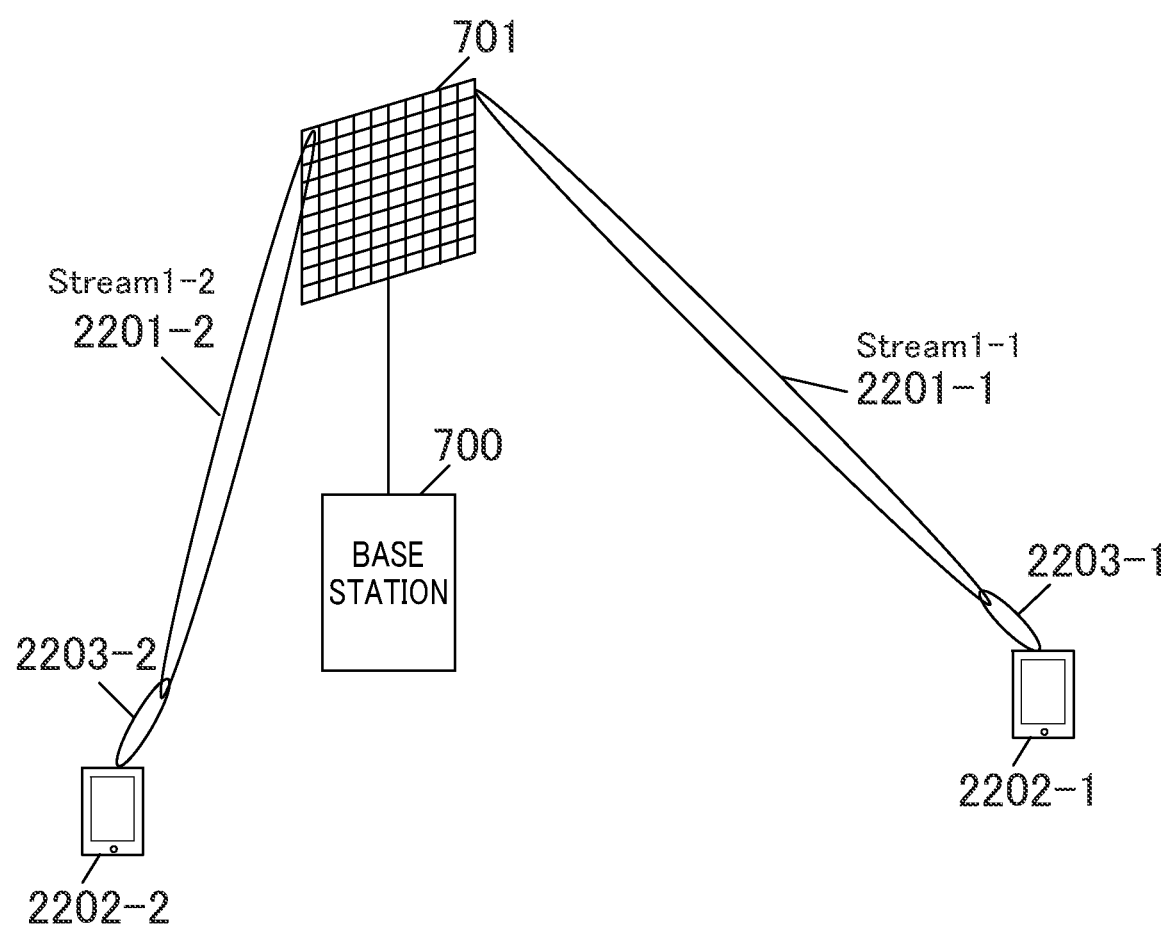
FIG. 14 illustrates an example of the communication state between the base station and the terminal.

FIG. 14 illustrates the state in which the base station illustrated in FIG. 7 is transmitting a multicast transmission stream to one terminal and to which one new terminal is added, and components in FIG. 14 that operate in the same manner as those in FIG. 7 are provided with the same reference numerals.

In FIG. 14, the newly added terminal is terminal 2202-2. FIG. 14 differs from FIG. 11 in that base station 700 newly transmits transmission beam 2201-2 of "(multicast) stream 1-2" (second transmission beam of stream 1), and terminal 2202-2 performs directivity control to generate reception directivity 2203-2 and receive transmission beam 2201-2 of (multicast) stream 1-2.

Next, the control performed for the state as illustrated in FIG. 14 will be described.

The description below relates to the state of FIG. 14 in which terminal 2202-2 newly participates in the multicast communication being performed between base station 700 and terminal 2202-1.

Figure 15:
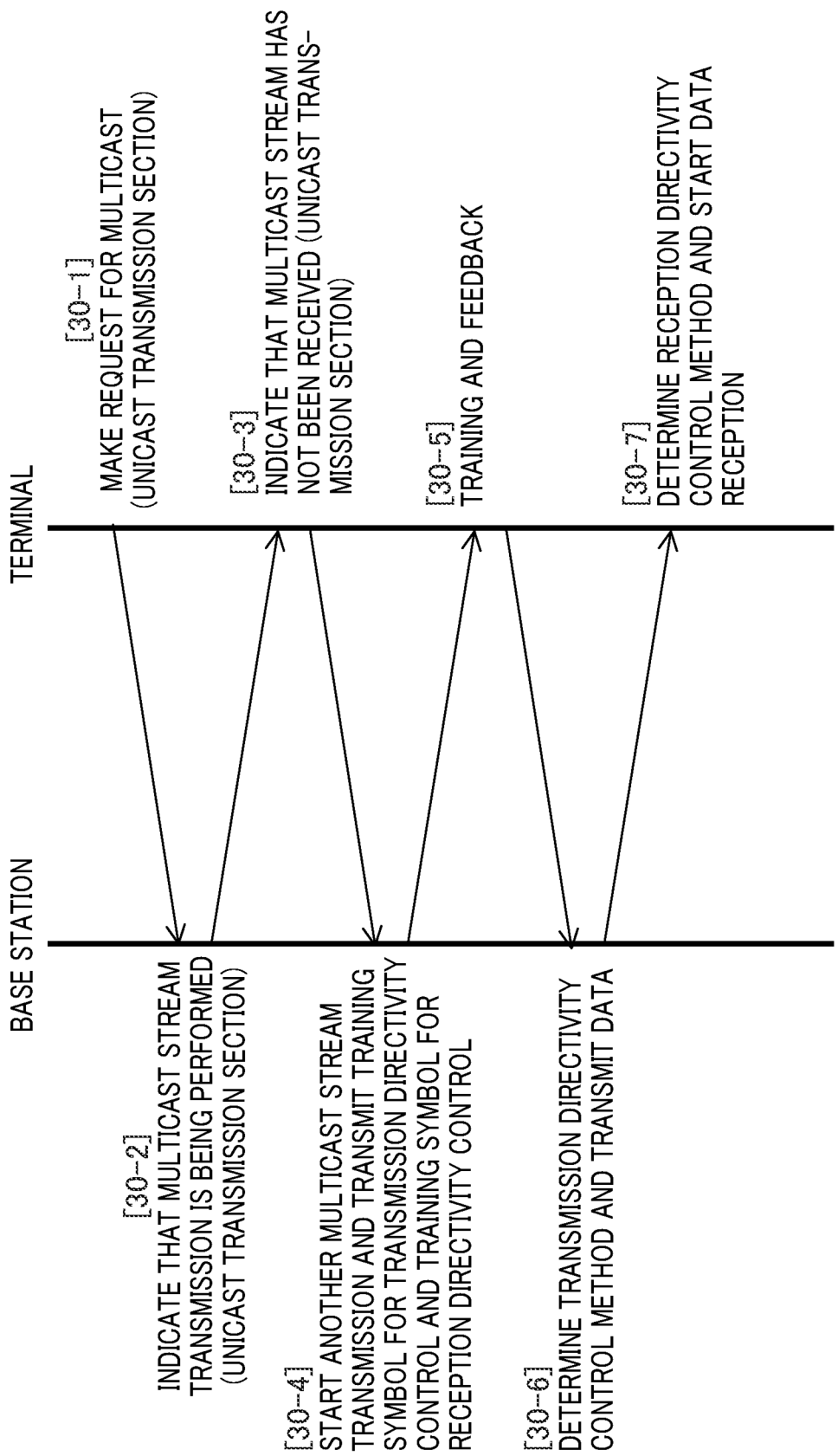
FIG. 15 illustrates a procedure for performing communication between the base station and the terminal.

FIG. 15 illustrates an example of an operation performed in order to achieve the state as illustrated in FIG. 14 in which the base station transmits multicast transmission beams to two terminals.

[30-1] Terminal 2202-2 makes a "request for multicast transmission of stream 1" to the base station. Note that, the "request for multicast transmission of stream 1" is transmitted in one of the unicast transmission sections illustrated in FIG. 10.

[30-2] In response to [30-1], the base station indicates to terminal 2202-2 that "multicast stream 1 is being transmitted." Note that, the indication "multicast stream 1 is being transmitted" is transmitted in one of the unicast transmission sections illustrated in FIG. 10.

[30-3] In response to [30-2], terminal 2202-2 notifies the base station that the terminal has not received multicast stream 1. Note that the indication "multicast stream 1 has not been received" is transmitted in one of the unicast transmission sections illustrated in FIG. 10.

[30-4] In response to [30-3], the base station determines to transmit another transmission beam of multicast stream 1 (i.e., transmission beam 2201-2 in FIG. 14). Note that, although the other transmission beam of multicast stream 1 is here determined to be transmitted, the other transmission beam of multicast stream 1 may be determined not to be transmitted. A description will be given below in this respect.

Accordingly, the base station transmits to terminal 2202-2 a training symbol for transmission directivity control and a training symbol for reception directivity control in order to perform multicast transmission of stream 1. Note that the base station is transmitting the transmission beam of stream 1-1 in FIG. 14 in addition to the transmissions of these training symbols. A description will be given below in this respect.

[30-5] Terminal 2202-2 receives the training symbol for transmission directivity control and the training symbol for reception directivity control transmitted by the base station, and transmits feedback information to the base station in order for the base station to perform the transmission directivity control and for terminal 2202-2 to perform the reception directivity control.

[30-6] Based on the feedback information transmitted by terminal 2202-2, the base station determines a method for transmission directivity control (for example, determines a weighting factor used for performing the directivity control) and transmits data symbols of stream 1 (transmission beam 2201-2 of stream 1-2 in FIG. 14).

[30-7] Terminal 2202-2 determines a reception directivity control method (for example, determines a weighting factor used for performing the directivity control) and starts receiving the data symbols of stream 1 (transmission beam 2201-2 of stream 1-2 in FIG. 14) transmitted by the base station.

Note that the "procedure for performing communication between the base station and the terminal" in FIG. 15 is an example, and the order of transmissions of information is not limited to that of FIG. 15. Accordingly, the procedure can also be implemented even with a different order of transmissions of information.

In addition, although a case in which the terminal performs the reception directivity control has been described as an example with reference to FIG. 15, the present disclosure is applicable to a case in which the terminal does not perform the reception directivity control. In this case, the base station does not have to transmit the training symbol for reception directivity control, and the terminal does not have to determine the reception directivity control method in FIG. 15.

Further, when the base station performs the transmission directivity control and the base station has the configuration of FIG. 1, multiplication factors of multipliers 204-1, 204-2, 204-3, and 204-4 in FIG. 2 are set, for example. Further, when the base station performs the transmission directivity control and when the base station has the configuration of FIG. 3, a weighting factor of weighting-combiner 301 is set, for example. Note that, the number of streams to be transmitted is "2" in the case of FIG. 14, but is not limited thereto.

In addition, when terminals 2202-1 and 2202-2 perform the reception directivity control and each of the terminals has the configuration of FIG. 4, multiplication factors of multipliers 503-1, 503-2, 503-3, and 503-4 in FIG. 5 are set, for example. Further, when terminals 2202-1 and 2202-2 perform the reception directivity control and each of the terminals has the configuration of FIG. 6, multiplication factors of multipliers 603-1, 603-2, . . . , and 603-L are set, for example.

Figure 16:
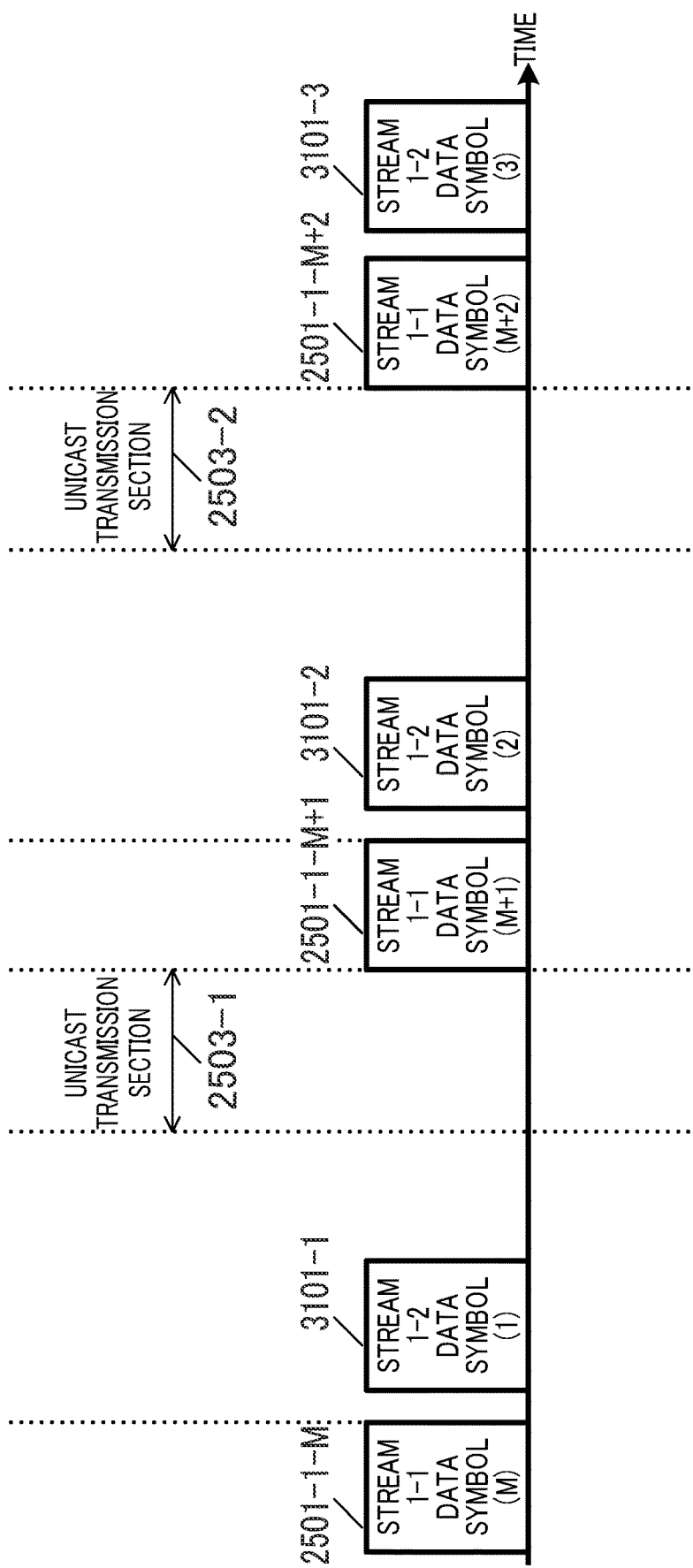
FIG. 16 illustrates an example of symbols transmitted by the base station.

FIG. 16 illustrates an example of symbols transmitted by the base station when the base station transmits the data symbols of stream 1 after the communication between the base station and the terminal in FIG. 15 is completed. The horizontal axis represents time.

Since "stream 1-1" of FIG. 14 is present in FIG. 16, there are "(multicast) stream 1-1 data symbol (M)" 2501-1-M, "(multicast) stream 1-1 data symbol (M+1)" 2501-1-M+1, and "(multicast) stream 1-1 data symbol (M+2)" 2501-1-M+2 in FIG. 16 as in FIG. 10. Note that, the reason for the description of "(M), (M+1), and (M+2)" is because (multicast) stream 1-1 exists before (multicast) stream 1-2 exists. Accordingly, "M" denotes an integer equal to or greater than 2 in FIG. 16.

As illustrated in FIG. 16, there are "(multicast) stream 1-2 data symbol (1)" 3101-1, "(multicast) stream 1-2 data symbol (2)" 3101-2, and "(multicast) stream 1-2 data symbol (3)" 3101-3 in a section other than unicast transmission sections 2503-1 and 2503-2.

As described above, the following features are included.
The "(multicast) stream 1-1 data symbol (M)" 2501-1-M, "(multicast) stream 1-1 data symbol (M+1)" 2501-1-M+1, "(multicast) stream 1-1 data symbol (M+2)" 2501-1-M+2, "(multicast) stream 1-2 data symbol (1)" 3101-1, "(multicast) stream 1-2 data symbol (2)" 3101-2, and "(multicast) stream 1-2 data symbol (3)" 3101-3 are data symbols for transmitting "stream 1."
The terminal is capable of obtaining the "data symbols of stream 1-1" to obtain the "data of stream 1." The terminal is also capable of obtaining the "data symbols of stream 1-2" to obtain the "data of stream 1."
The directivities of the transmission beams of "(multicast) stream 1-1 data symbol (M)" 2501-1-M, "(multicast) stream 1-1 data symbol (M+1)" 2501-1-M+1, and "(multicast) stream 1-1 data symbol (M+2)" 2501-1-M+2 are different from the directivities of the transmission beams of "(multicast) stream 1-2 data symbol (1)" 3101-1, "(multicast) stream 1-2 data symbol (2)" 3101-2, and "(multicast) stream 1-2 data symbol (3)" 3101-3. Thus, a set of multiplication factors (or weighting factors) of the transmission apparatus of the base station used to generate the transmission beams of "(multicast) stream 1-1 data symbol (M)" 2501-1-M, "(multicast) stream 1-1 data symbol (M+1)" 2501-1-M+1, "(multicast) stream 1-1 data symbol (M+2)" 2501-1-M+2 is different from a set of multiplication factors (or weighting factors) of the transmission apparatus of the base station used to generate the transmission beams of "(multicast) stream 1-2 data symbol (1)" 3101-1, "(multicast) stream 1-2 data symbol (2)" 3101-2, and "(multicast) stream 1-2 data symbol (3)" 3101-3.

Accordingly, the two terminals are capable of receiving multicast streams transmitted by the base station. In this case, the directivity control is performed through transmission and reception, so that an effect that it is possible to broaden the area in which the multicast streams can be received is obtained. Moreover, the addition of a stream and/or the addition of a transmission beam are performed when the stream and/or the transmission beam is used, so that an effect that it is possible to effectively utilize the frequency resources, time resources, and/or spatial resources for transmitting data is obtained.

Note that the control as described below may be performed in some cases. Details of the control are as follows.

Figure 17:
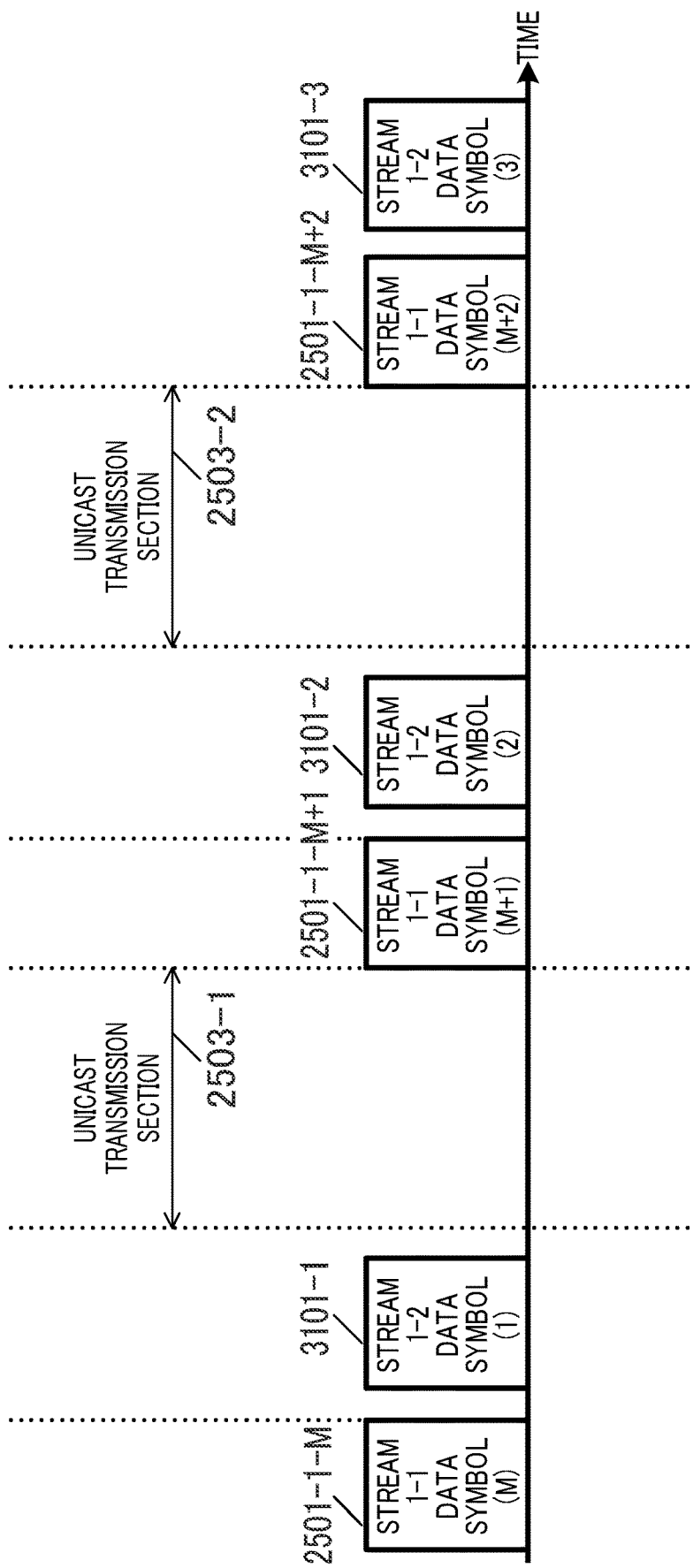
FIG. 17 illustrates an example of symbols transmitted by the base station.

FIG. 17 illustrates an "example of symbols transmitted by the base station when the base station transmits the data symbols (of stream 1) after the communication between the base station and the terminal in FIG. 15 is completed," which is different from the example of FIG. 16. The horizontal axis represents time. Note that, components in FIG. 17 that operate in the same manner as those in FIG. 10 or 16 are provided with the same reference numerals.

FIG. 17 differs from FIG. 16 in that unicast transmission sections 2503-1 and 2503-2 are set longer in time, so that the base station does not transmit a further multicast symbol additionally.

Figure 18:
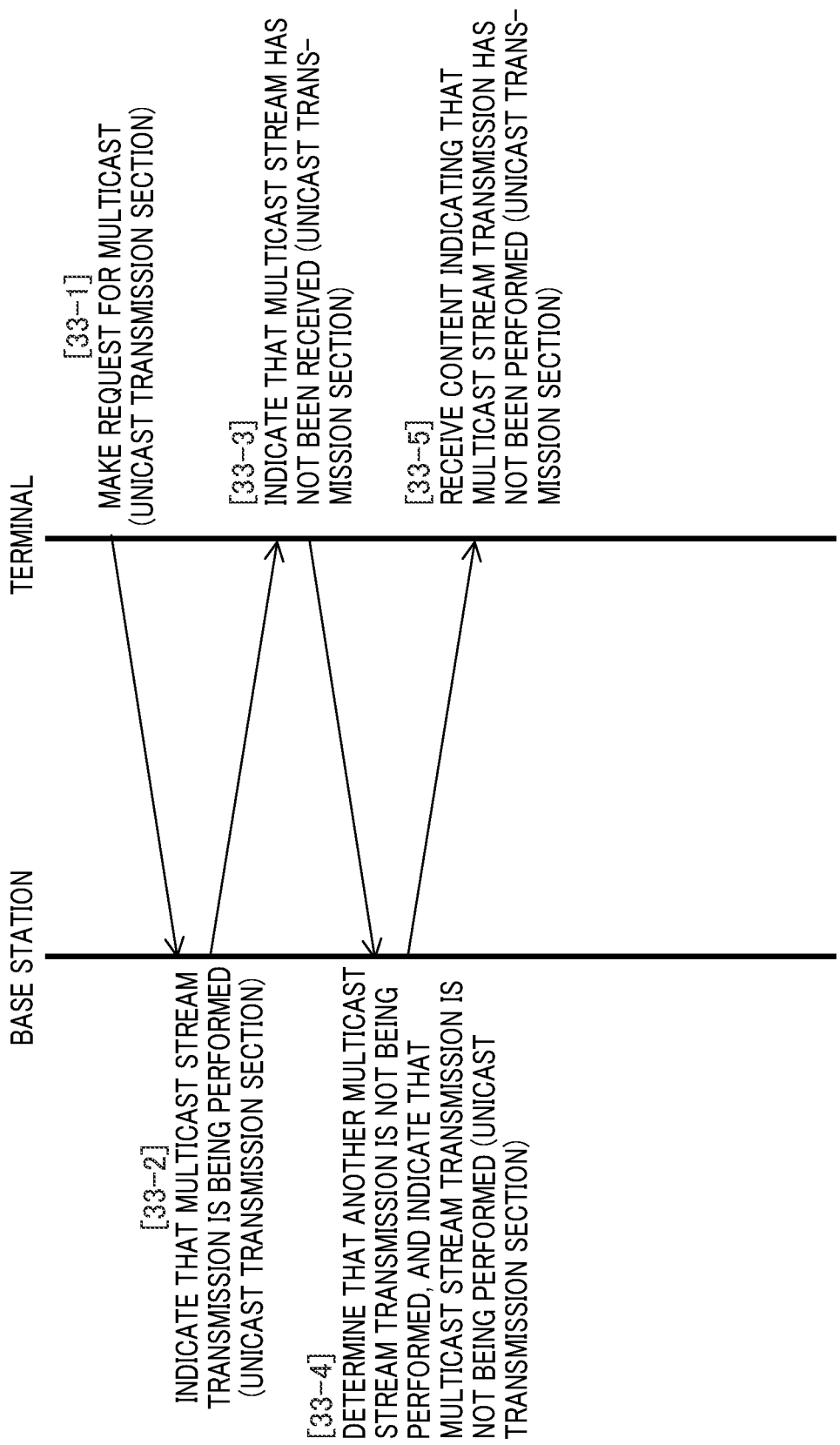
FIG. 18 illustrates a procedure for performing communication between the base station and the terminal.

FIG. 18 illustrates an example of an operation in which the base station transmits multicast transmission beams to two terminals (terminals 2202-1 and 2202-2) as in FIG. 14 and, additionally, new terminal 2202-3 requests, from the base station, addition of a transmission beam. Note that, the frame of a modulation signal transmitted by the base station is illustrated in FIG. 17.

[33-1] Terminal 2202-3 makes a "request for multicast transmission of stream 1" to the base station. Note that, the "request for multicast transmission of stream 1" is transmitted in one of the unicast transmission sections illustrated in FIG. 17.

[33-2] In response to [33-1], the base station indicates to terminal 2202-3 that "multicast stream 1 is being transmitted." Note that, the indication "multicast stream 1 is being transmitted" is transmitted in one of the unicast transmission sections illustrated in FIG. 17.

[33-3] In response to [33-2], terminal 2202-3 notifies the base station that the terminal has not received multicast stream 1. Note that the indication "multicast stream 1 has not been received" is transmitted in one of the unicast transmission sections illustrated in FIG. 17.

[33-4] In response to [33-3], the base station determines whether a transmission beam different from the transmission beam of stream 1-1 and the transmission beam of stream 1-2 can be transmitted as one of the transmission beams of multicast stream 1. At this time, considering that the frame is as illustrated in FIG. 17, the base station determines not to transmit another transmission beam of multicast stream 1. Accordingly, the base station indicates to terminal 2202-3 that "another transmission beam of multicast stream 1 is not transmitted." Note that the "indication of not transmitting another transmission beam of multicast stream 1" is transmitted in one of the unicast transmission sections illustrated in FIG. 17.

[33-5] Terminal 2202-3 receives the "indication of not transmitting another transmission beam of multicast stream 1."

Note that the "procedure for performing communication between the base station and the terminal" in FIG. 18 is an example, and the order of transmissions of information is not limited to that of FIG. 18. Accordingly, the procedure can also be implemented even with a different order of transmissions of information. As in this example, when communication resources for multicast transmission are insufficient, addition of a multicast transmission beam does not have to be performed.

Figure 19:
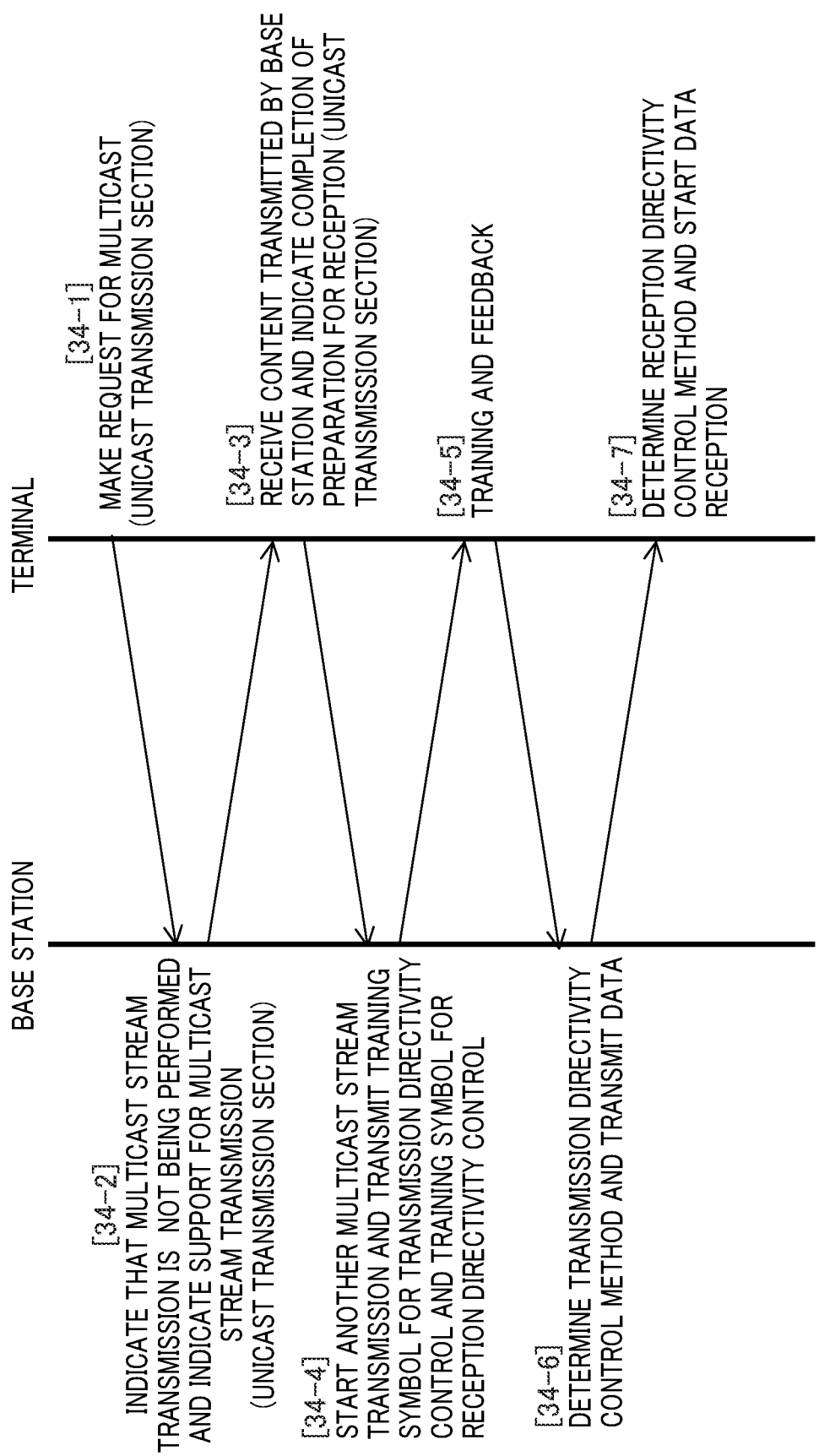
FIG. 19 illustrates a procedure for performing communication between the base station and the terminal.

FIG. 19 illustrates an example of an operation in which the base station transmits multicast transmission beams to two terminals (terminals 2202-1 and 2202-2) as illustrated in FIG. 14 and, additionally, new terminal 2202-3 requests, from the base station, addition of a transmission beam of another multicast stream (stream 2). Note that, the frame of a modulation signal transmitted by the base station is as illustrated in FIG. 16.

[34-1] Terminal 2202-3 makes a "request for multicast transmission of stream 2" to the base station. Note that, the "request for multicast transmission of stream 2" is transmitted in one of unicast transmission sections 2503 illustrated in FIG. 16.

[34-2] In response to [34-1], the base station indicates to terminal 2202-3 that "multicast stream 2 is not being transmitted." In addition, the base station determines "whether the base station can additionally transmit a transmission beam of multicast stream 2." At this time, considering the frame state as illustrated in FIG. 16, the base station indicates to terminal 2202-3 the "support for transmission of the transmission beam of multicast stream 2." Note that, the "indication that multicast stream 2 is not being transmitted" and the "indication that multicast stream 2 can be transmitted" are transmitted in one of unicast transmission sections 2503 illustrated in FIG. 16.

[34-3] In response to [34-2], terminal 2203-3 indicates to the base station "completion of preparation for receiving multicast stream 2." Note that, the indication of the "completion of preparation for receiving multicast stream 2" is transmitted in one of unicast transmission sections 2503 illustrated in FIG. 16.

[34-4] In response to [34-3], the base station determines to transmit the transmission beam of multicast stream 2. Accordingly, the base station transmits to terminal 2202-3 a training symbol for transmission directivity control and a training symbol for reception directivity control in order to perform multicast transmission of stream 2. Note that the base station transmits the transmission beam of stream 1-1 and the transmission beam of stream 1-2 as in FIG. 16, separately from the transmission of the training symbols. A description will be given below in this respect.

[34-5] Terminal 2202-3 receives the training symbol for transmission directivity control and the training symbol for reception directivity control transmitted by the base station, and transmits feedback information to the base station in order for the base station to perform the transmission directivity control and for terminal 2202-3 to perform the reception directivity control.

[34-6] Based on the feedback information transmitted by terminal 2202-3, the base station determines a method for transmission directivity control (for example, determines a weighting factor used for performing the directivity control) and transmits data symbols of stream 2.

[34-7] Terminal 2202-3 determines a reception directivity control method (for example, determines a weighting factor used for performing the directivity control) and starts receiving the data symbols of stream 2 transmitted by the base station.

Note that the "procedure for performing communication between the base station and the terminal" in FIG. 19 is an example, and the order of transmissions of information is not limited to that of FIG. 19. Accordingly, the procedure can also be implemented even with a different order of transmissions of information. In addition, although the example in which the terminal performs the reception directivity control has been described with reference to FIG. 19, the terminal does not have to perform the reception directivity control. At this time, the base station does not have to transmit the training symbol for reception directivity control, and the terminal does not determine the reception directivity control method in FIG. 19.

Further, when the base station performs the transmission directivity control and the base station has the configuration of FIG. 1, multiplication factors of multipliers 204-1, 204-2, 204-3, and 204-4 in FIG. 2 are set, for example.

In addition, when terminals 2202-1, 2202-2, and 2202-3 perform the reception directivity control and each of the terminals has the configuration of FIG. 4, multiplication factors of multipliers 503-1, 503-2, 503-3, and 503-4 in FIG. 5 are set, for example. Further, when terminals 2202-1, 2202-2, and 2202-03 perform the reception directivity control and each of the terminals has the configuration of FIG. 6, multiplication factors of multipliers 603-1, 603-2, . . . , and 603-L are set, for example.

Figure 20:
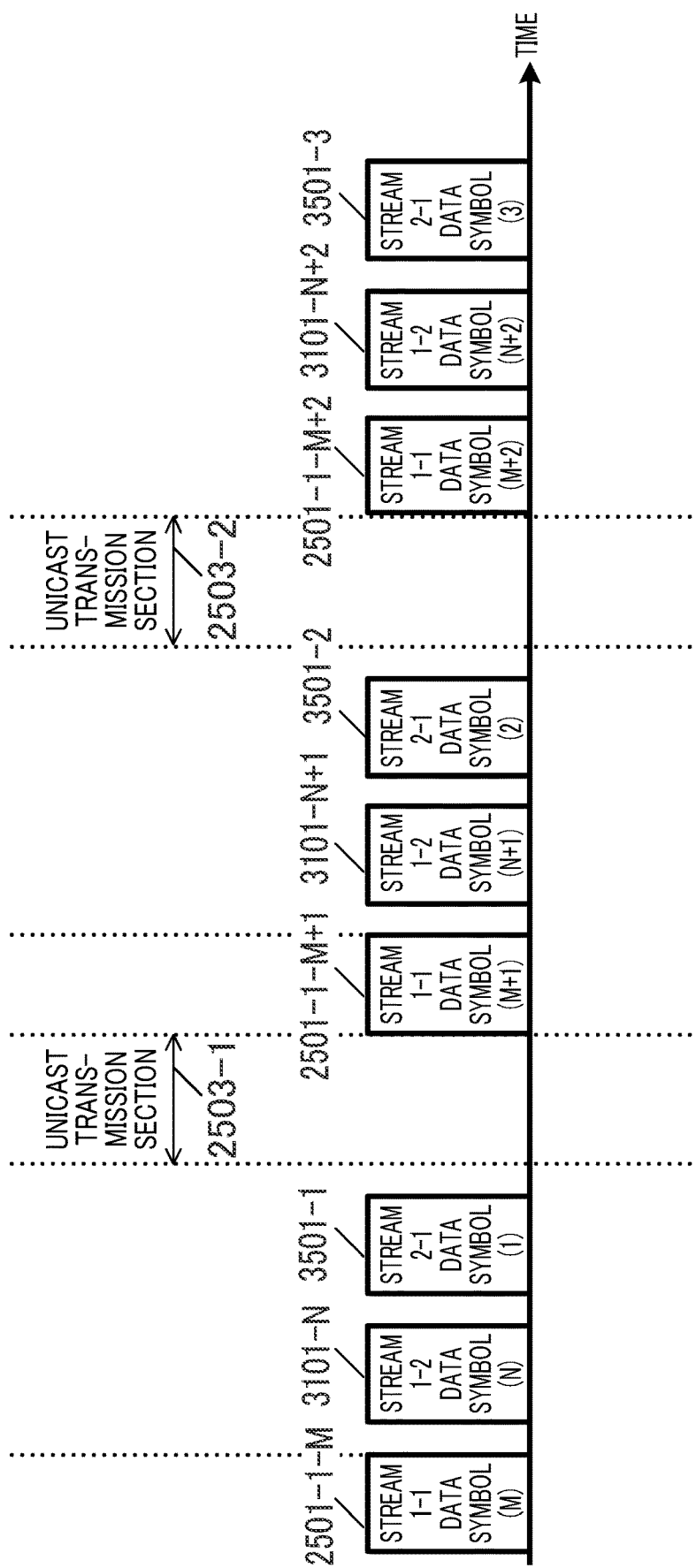
FIG. 20 illustrates an example of symbols transmitted by the base station.

FIG. 20 illustrates an example of symbols transmitted by the base station when the base station transmits the data symbols of streams 1 and 2 after the communication between the base station and the terminal in FIG. 19 is completed. The horizontal axis represents time.

Since "stream 1-1" and "stream 1-2" illustrated in FIG. 16 exist in FIG. 20, there are "(multicast) stream 1-1 data symbol (M)" 2501-1-M, "(multicast) stream 1-1 data symbol (M+1)" 2501-1-M+1, "(multicast) stream 1-1 data symbol (M+2)" 2501-1-M+2, "(multicast) stream 1-2 data symbol (N)" 3101-N, "(multicast) stream 1-2 data symbol (N+1)" 3101-N+1, and "(multicast) stream 1-2 data symbol (N+2)" 3101-N+2 in FIG. 20. Note that "N" and "M" are an integer equal to or greater than 2.

In addition, as illustrated in FIG. 20, there are "(multicast) stream 2-1 data symbol (1)" 3501-1, "(multicast) stream 2-1 data symbol (2)" 3501-2, and "(multicast) stream 2-1 data symbol (3)" 3501-3 in a section other than unicast transmission sections 2503-1 and 2503-2.

As described above, the following features are included in this case.

All of "(multicast) stream 1-1 data symbol (M)" 2501-1-M, "(multicast) stream 1-1 data symbol (M+1)" 2501-1-M+1, "(multicast) stream 1-1 data symbol (M+2)" 2501-1-M+2, "(multicast) stream 1-2 data symbol (N)" 3101-N, "(multicast) stream 1-2 data symbol (N+1)" 3101-N+1, and "(multicast) stream 1-2 data symbol (N+2)" 3101-N+2 are data symbols for transmitting "stream 1."

The terminal obtains the "data symbols of stream 1-1" to obtain the "data of stream 1." The terminal also obtains the "data symbols of stream 1-2" to obtain the "data of stream 1."

The directivities of the transmission beams of "(multicast) stream 1-1 data symbol (M)" 2501-1-M, "(multicast) stream 1-1 data symbol (M+1)" 2501-1-M+1, "(multicast) stream 1-1 data symbol (M+2)" 2501-1-M+2 are different from the directivities of the transmission beams of "(multicast) stream 1-2 data symbol (1)" 3101-N, "(multicast) stream 1-2 data symbol (2)" 3101-N+1, and "(multicast) stream 1-2 data symbol (3)" 3101-N+2.

Thus, a set of multiplication factors (or weighting factors) of the transmission apparatus of the base station used to generate the transmission beams of "(multicast) stream 1-1 data symbol (M)" 2501-1-M, "(multicast) stream 1-1 data symbol (M+1)" 2501-1-M+1, "(multicast) stream 1-1 data symbol (M+2)" 2501-1-M+2 is different from a set of multiplication factors (or weighting factors) of the transmission apparatus of the base station used to generate the transmission beams of "(multicast) stream 1-2 data symbol (1)" 3101-N, "(multicast) stream 1-2 data symbol (2)" 3101-N+1, and "(multicast) stream 1-2 data symbol (3)" 3101-N+2.

The "(multicast) stream 2-1 data symbol (1)" 3501-1, "(multicast) stream 2-1 data symbol (2)" 3501-2, and "(multicast) stream 2-1 data symbol (3)" 3501-3 are data symbols for transmitting "stream 2."

The terminal obtains the "data symbols of stream 2-1" to obtain the "data of stream 2." As is understood from the above, the terminals can receive a plurality of multicast streams (stream 1 and stream 2) transmitted by the base station. In this case, the directivity control is performed through transmission and reception, so that an effect that it is possible to broaden the area in which the multicast streams can be received is obtained. Moreover, the addition of a stream and/or the addition of a transmission beam are performed when the stream and/or the transmission beam is used, so that an effect that it is possible to effectively utilize the frequency resources, time resources, and/or spatial resources for transmitting data is obtained.

Note that, control as described below may also be performed. Details of the control are as follows.

FIG. 17 is an "example of symbols transmitted by a base station when the base station transmits the data symbols (of stream 1)," which is different from the example of FIG. 20. The horizontal axis represents time. Note that, components in FIG. 17 that operate in the same manner as those in FIG. 10 or 16 are provided with the same reference numerals.

FIG. 17 differs from FIG. 20 in that unicast transmission sections 2503-1 and 2503-2 are set longer in time, so that the base station does neither add nor transmit a further multicast symbol (e.g., a symbol of a new stream).

Figure 21:
FIG. 21 illustrates a procedure for performing communication between the base station and the terminal.

FIG. 21 illustrates an example of an operation in which the base station transmits multicast transmission beams to two terminals (terminals 2202-1 and 2202-2) as in FIG. 14 and, additionally, new terminal 2202-3 requests, from the base station, addition of a transmission beam of another multicast stream (stream 2). Note that, the frame of a modulation signal transmitted by the base station is illustrated in FIG. 17.

[36-1] Terminal 2202-3 makes a "request for multicast transmission of stream 2" to the base station. Note that, the "request for multicast transmission of stream 2" is transmitted in one of the unicast transmission sections illustrated in FIG. 17.

[36-2] In response to [36-1], the base station indicates to terminal 2202-3 that "multicast stream 2 is not being transmitted." Note that, the indication "multicast stream 2 is not being transmitted" is transmitted in one of the unicast transmission sections illustrated in FIG. 17. In addition, the base station determines whether the transmission beam of multicast stream 2 can be transmitted. Considering the frame illustrated in FIG. 17, the base station determines not to transmit the transmission beam of multicast stream 2. Accordingly, the base station indicates to terminal 2202-3 that "the transmission beam of multicast stream 2 is not transmitted." Note that, the "indication of not transmitting the transmission beam of multicast stream 2" is transmitted in one of the unicast transmission sections illustrated in FIG. 17.

[36-3] Terminal 2202-3 receives the "indication of not transmitting the transmission beam of multicast stream 2."

Note that the "procedure for performing communication between the base station and the terminal" in FIG. 21 is an example, and the order of transmissions of information is not limited to that of FIG. 21. Accordingly, the procedure can also be implemented even with a different order of transmissions of information. As in this example, when communication resources for multicast transmission are insufficient, addition of a stream and/or addition of a multicast transmission beam do not have to be performed.

Note that, a supplementary description will be given of the method of setting unicast transmission sections 2503-1 and 2503-2 illustrated in FIG. 20 and the like.

For example, in FIG. 20, the maximum number of multicast transmission beams is determined in advance or set.

Then, in response to requests by terminals, the base station transmits multicast transmission beams, the number of which is equal to or less than the maximum number of multicast transmission beams. For example, in the case of FIG. 20, the number of multicast transmission beams is 3. The base station transmits a plurality of multicast transmission beams, and determines a temporally idle time after the transmission of each of the plurality of transmission beams as a unicast transmission section.

The unicast transmission sections may be determined as described above.

<Supplement 1>

Another example will be supplementally given for a symbol group transmitted by the base station in Example 2.

The base station may transmit another symbol group using another transmission beam different from the "transmission beam for transmitting stream 1-1 data symbol (1) 2501-1-1, stream 1-1 data symbol (2) 2501-1-2, or stream 1-1 data symbol (3) 2501-1-3" during a time period of transmitting stream 1-1 data symbol (1) 2501-1-1, stream 1-1 data symbol (2) 2501-1-2, or stream 1-1 data symbol (3) 2501-1-3 as in the frame configuration of FIG. 10.

Note that the same applies to a case where the horizontal axis represents frequency in FIG. 10, and the base station may transmit another symbol group using another transmission beam different from the "transmission beam for transmitting stream 1-1 data symbol (1) 2501-1-1, stream 1-1 data symbol (2) 2501-1-2, or stream 1-1 data symbol (3) 2501-1-3" during a time period of transmitting stream 1-1 data symbol (1) 2501-1-1, stream 1-1 data symbol (2) 2501-1-2, or stream 1-1 data symbol (3) 2501-1-3.

Further, the base station may transmit another symbol group using another transmission beam different from the "transmission beam for transmitting stream 1-1 data symbol (M) 2501-1-M, stream 1-1 data symbol (M+1) 2501-1-M+1, or stream 1-1 data symbol (M+2) 2501-1-M+2" during a time period of transmitting stream 1-1 data symbol (M) 2501-1-M, stream 1-1 data symbol (M+1) 2501-1-M+1, or stream 1-1 data symbol (M+2) 2501-1-M+2 as in the frame configuration of FIGS. 16 and 17.

Note that the same applies to a case where the horizontal axis represents frequency in FIGS. 16 and 17, and the base station may transmit another symbol group using another transmission beam different from the "transmission beam for transmitting stream 1-1 data symbol (M) 2501-1-M, stream 1-1 data symbol (M+1) 2501-1-M+1, or stream 1-1 data symbol (M+2) 2501-1-M+2" during a time period of transmitting stream 1-1 data symbol (M) 2501-1-M, stream 1-1 data symbol (M+1) 2501-1-M+1, or stream 1-1 data symbol (M+2) 2501-1-M+2.

In addition, the base station may transmit another symbol group using another transmission beam different from the "transmission beam for transmitting stream 1-2 data symbol (1) 3101-1, stream 1-2 data symbol (2) 3101-2, or stream 1-2 data symbol (3) 3101-3" during a time period of transmitting stream 1-2 data symbol (1) 3101-1, stream 1-2 data symbol (2) 3101-2, or stream 1-2 data symbol (3) 3101-3 as in the frame configuration of FIGS. 16 and 17.

Note that the same applies to a case where the horizontal axis represents frequency in FIGS. 16 and 17, and the base station may transmit another symbol group using another transmission beam different from the "transmission beam for transmitting stream 1-2 data symbol (1) 3101-1, stream 1-2 data symbol (2) 3101-2, or stream 1-2 data symbol (3) 3101-3" during a time period of transmitting stream 1-2 data symbol (1) 3101-1, stream 1-2 data symbol (2) 3101-2, or stream 1-2 data symbol (3) 3101-3.

The base station may transmit another symbol group using another transmission beam different from the "transmission beam for transmitting stream 1-1 data symbol (M) 2501-1-M, stream 1-1 data symbol (M+1) 2501-1-M+1, or stream 1-1 data symbol (M+2) 2501-1-M+2" during a time period of transmitting stream 1-1 data symbol (M) 2501-1-M, stream 1-1 data symbol (M+1) 2501-1-M+1, or stream 1-1 data symbol (M+2) 2501-1-M+2 as in the frame configuration of FIG. 20.

Note that the same applies to a case where the horizontal axis represents frequency in FIG. 20, and the base station may transmit another symbol group using another transmission beam different from the "transmission beam for transmitting stream 1-1 data symbol (M) 2501-1-M, stream 1-1 data symbol (M+1) 2501-1-M+1, or stream 1-1 data symbol (M+2) 2501-1-M+2" during a time period of transmitting stream 1-1 data symbol (M) 2501-1-M, stream 1-1 data symbol (M+1) 2501-1-M+1, or stream 1-1 data symbol (M+2) 2501-1-M+2.

Further, the base station may transmit another symbol group using another transmission beam different from the "transmission beam for transmitting stream 1-2 data symbol (N) 3101-N, stream 1-2 data symbol (N+1) 3101-N+1, or stream 1-2 data symbol (N+2) 3101-N+2" during a time period of transmitting stream 1-2 data symbol (N) 3101-N, stream 1-2 data symbol (N+1) 3101-N+1, or stream 1-2 data symbol (N+2) 3101-N+2 as in the frame configuration of FIG. 20.

Note that the same applies to a case where the horizontal axis represents frequency in FIG. 20, and the base station may transmit another symbol group using another transmission beam different from the "transmission beam for transmitting stream 1-2 data symbol (N) 3101-N, stream 1-2 data symbol (N+1) 3101-N+1, or stream 1-2 data symbol (N+2) 3101-N+2" during a time period of transmitting stream 1-2 data symbol (N) 3101-N, stream 1-2 data symbol (N+1) 3101-N+1, or stream 1-2 data symbol (N+2) 3101-N+2.

The base station may transmit another symbol group using another transmission beam different from the "transmission beam for transmitting stream 2-1 data symbol (1) 3501-1, stream 2-1 data symbol (2) 3501-2, or stream 2-1 data symbol (3) 3501-3" during a time period of transmitting stream 2-1 data symbol (1) 3501-1, stream 2-1 data symbol (2) 3501-2, or stream 2-1 data symbol (3) 3501-3 as in the frame configuration of FIG. 20.

Note that the same applies to a case where the horizontal axis represents frequency in FIG. 20, and the base station may transmit another symbol group using another transmission beam different from the "transmission beam for transmitting stream 2-1 data symbol (1) 3501-1, stream 2-1 data symbol (2) 3501-2, or stream 2-1 data symbol (3) 3501-3" during a time period of transmitting stream 2-1 data symbol (1) 3501-1, stream 2-1 data symbol (2) 3501-2, or stream 2-1 data symbol (3) 3501-3.

In the above description, the "other symbol group" may be a symbol group including data symbols addressed to a certain terminal, a symbol group including a control information symbol as described in other portions of the present specification, or a symbol group including other multicast data symbols.

In this case, the base station of FIG. 1 may generate a transmission beam for the above-described "other symbol group" through the signal processing by signal processor 102. Alternatively, the base station of FIG. 1 may generate the transmission beam for the above-described "other symbol group" by selecting an antenna of antenna sections 106-1 to 106-M.

In addition, the base station of FIG. 3 may generate a transmission beam for the above-described "other symbol group" through the "signal processing by signal processor 102 and the signal processing by weighting combiner 301" or through the "signal processing by signal processor 102 or the signal processing by weighting combiner 301."

In addition, unicast transmission sections 2503-1 and 2503-2 as described in FIGS. 10, 16, 17, and 20 do not have to be set.

Example 3

With respect to Supplement 1 to Example 2, the description has been given of the case where the modulation signal is transmitted with the horizontal axes of the frames of, for example, FIGS. 10, 16, and 17 being considered not as time but as frequency. A specific example of use thereof will be described in Example 3.

Example 3 is an example in which an "Orthogonal Frequency Division Multiple Access (OFDMA) allowing multiple users to access by Orthogonal Frequency Division Multiplexing (OFDM)" or a "scheme allowing multiple users to access by a multicarrier transmission scheme" is used.

Figure 22:
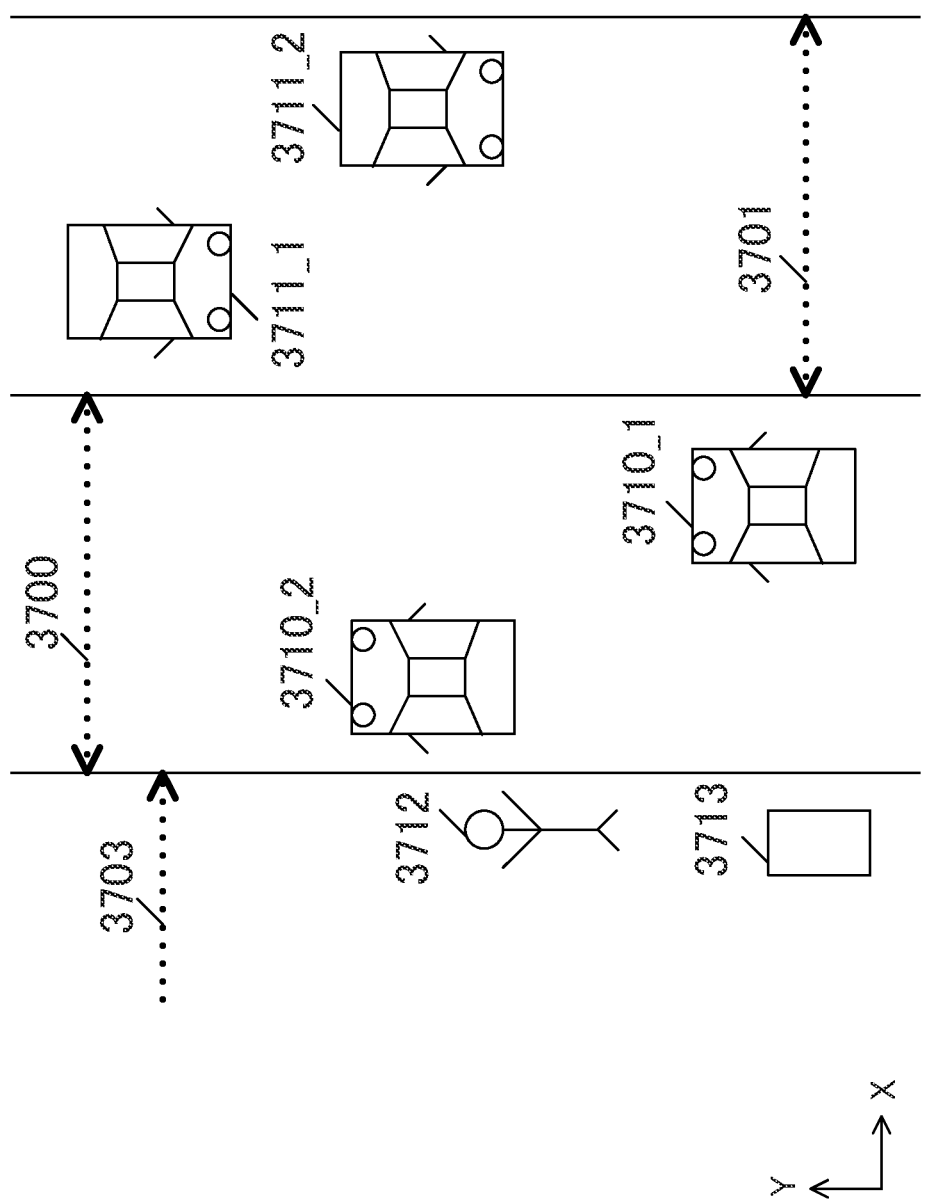
FIG. 22 illustrates an example of the position and the direction of movement of each communication apparatus.

FIG. 22 illustrates an exemplary state in Example 3.

Automobiles (or vehicles) 3710_1, 3710_2, 3711_1, and 3711_2, person 3712, and communication apparatus 3713 are illustrated in FIG. 22.

Also illustrated in FIG. 22 is lane (region) 3700 for movement in a positive direction of the Y-axis, and lane 3700 is referred to as a "traveling direction." As is understood, automobiles 3710_1 and 3710_2 move in the positive direction of the Y-axis in FIG. 22.

Also illustrated in FIG. 22 is lane (region) 3701 for movement in a negative direction of the Y-axis, and lane 3701 is referred to as an "opposite direction" (opposite lane). As is understood, automobiles 3711_1 and 3711_2 move in the negative direction of the Y-axis in FIG. 22.

Also illustrated in FIG. 22 is region 3703 for a statically moving, semi-statically moving, or non-moving (stationary) object. For example, person 3712 and communication apparatus 3713 exist in this region 3703.

In FIG. 22, each of automobile 3710_1, automobile 3710_2, automobile 3711_1, and automobile 3711_2 are equipped with a radio communication apparatus. Person 3712 possesses a radio communication apparatus.

The radio communication apparatuses mounted on automobile 3710_1, automobile 3710_2, automobile 3711_1, and automobile 3711_2, the radio communication apparatus possessed by person 3712, and communication apparatus 3713 communicate with one another.

For example, the radio communication apparatus mounted on automobile 3710_1 transmits a modulation signal (transmission signal).

For example, the moving speeds of person 3712 and automobiles 3710 are assumed as follows:

The moving speed of the radio communication apparatus possessed by person 3712 is 0 km/h (kilometers per hour). The moving speed of communication apparatus 3713 is 0 km/h (kilometers per hour).

The moving speed of the radio communication apparatus mounted on each of automobiles 3710_1 and 3710_2 is 100 km/h (kilometers per hour) in the positive direction of the Y-axis.

The moving speed of the radio communication apparatus mounted on each of automobiles 3711_1 and 3711_2 is 100 km/h (kilometers per hour) in the negative direction of the Y-axis.

In the case of the above moving speeds, the relative moving speeds with respect to the radio communication apparatus mounted on automobile 3710_1 are as follows:

The relative moving speed of the radio communication apparatus mounted on automobile 3710_2 is 0 km/h.

The relative moving speed of the radio communication apparatuses mounted on each of automobiles 3711_1 and 3711_2 is −200 km/h.

The relative moving speed of the radio communication apparatus possessed by "person 3712" is −100 km/h. Similarly, the relative moving speed of the communication apparatus is −100 km/h.

In such a situation under consideration, communication partners (other communication apparatuses) with which the radio communication apparatus mounted on automobile 3710_1 communicates can be divided into the following three cases, for example.

"Case 1": Communication is performed with an "other statically-moving, semistatically-moving, or non-moving (stationary) communication apparatus." That is, in case 1, the radio communication apparatus mounted on automobile 3710_1 transmits a modulation signal (transmission signal), and the "other statically-moving, semistatically-moving, or non-moving (stationary) communication apparatus" receives the modulation signal. In this case, the absolute value of a Doppler (shift) frequency is a moderate value. This case corresponds to communication with person 3712 or communication apparatus 3713 in FIG. 22, for example.

"Case 2": Communication is performed with an "other communication apparatus moving in the same direction, for example, an other communication apparatus mounted on an automobile traveling in the traveling direction." In case 2, the radio communication apparatus mounted on automobile 3710_1 transmits a modulation signal (transmission signal)), and the other communication apparatus mounted on the automobile traveling in the traveling direction receives the modulation signal. In this case, the absolute value of the Doppler (shift) frequency is a small value. This case corresponds to communication with automobile 3710_2 in FIG. 22, for example.

"Case 3": Communication is performed with an "other communication apparatus moving in the opposite direction, for example, an other communication apparatus mounted on the automobile traveling on the opposite lane." In case 3, the radio communication apparatus mounted on automobile 3710_1 transmits a modulation signal (transmission signal), and the other communication apparatus mounted on the automobile traveling in the opposite direction (opposite lane) receives the modulation signal. In this case, the absolute value of the Doppler (shift) frequency is a large value. This case corresponds to communication with automobile 3711_1 or automobile 3711_2 in FIG. 22, for example.

Next, a "frame configuration of the modulation signal transmitted by the radio communication apparatus mounted on automobile 3710_1" considering the above will be described.

Figure 23:
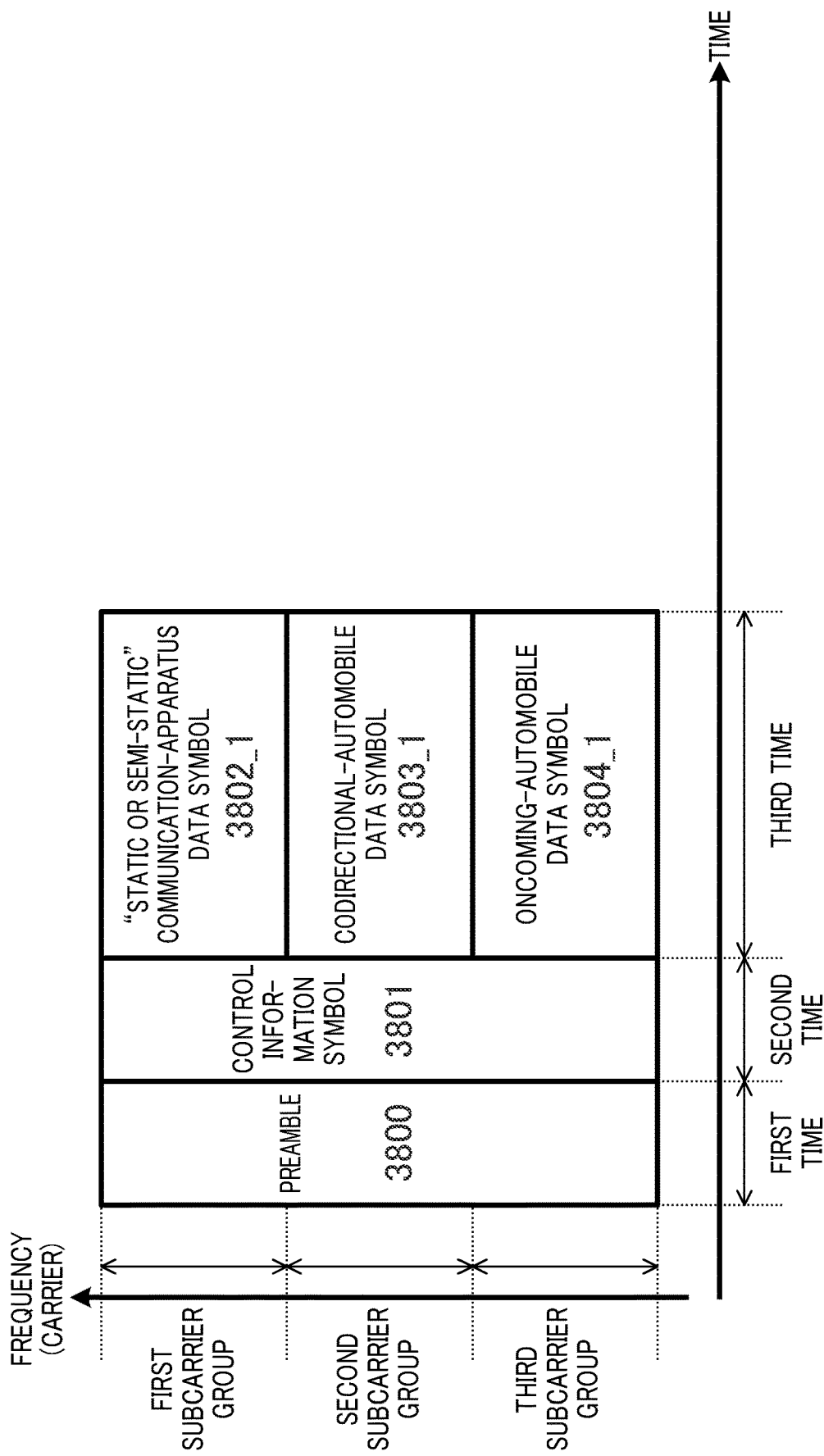
FIG. 23 illustrates an example of a frame configuration.

FIG. 23 illustrates an example of the "frame configuration of the modulation signal transmitted by the radio communication apparatus mounted on automobile 3710_1." Note that the modulation signal transmitted by the radio communication apparatus mounted on automobile 3710_1 is a modulation signal of the "OFDMA allowing multiple users to access by OFDM" or a modulation signal of the "scheme allowing multiple users to access by the multicarrier transmission scheme."

In FIG. 23, the horizontal axis represents time, and the vertical axis represents the frequency ((sub) carrier). As illustrated in FIG. 23, a "first subcarrier group," "second subcarrier group," and "third subcarrier group" are present on the frequency axis, for example. Each of the subcarrier groups is composed of one or more subcarriers. Note that the subcarrier group may be described as "carrier group."

Then, as illustrated in FIG. 23, the radio communication apparatus mounted on automobile 3710_1 transmits preamble 3800 using the first subcarrier group at the first time, the second subcarrier group at the first time, and the third subcarrier group at the first time. Preamble 3800 is a "symbol for a reception apparatus 'receiving the modulation signal transmitted by the radio communication apparatus mounted on automobile 3710_1' to perform, for example, time synchronization, frequency synchronization, frequency offset estimation, or signal detection."

The radio communication apparatus mounted on automobile 3710_1 transmits control information symbol 3801 using the first subcarrier group at the second time, the second subcarrier group at the second time, and the third subcarrier group at the second time. Note that details of control information symbol 3801 will be described below.

The radio communication apparatus mounted on automobile 3710_1 transmits "static or semi-static" communication-apparatus data symbol 3802_1 using the first subcarrier group at the third time. Note that, "static or semi-static" communication-apparatus data symbol 3802_1 is a data symbol transmitted by the radio communication apparatus mounted on automobile 3710_1 to the "other statically-moving, semistatically-moving, or non-moving (stationary) communication apparatus" described in case 1.

The radio communication apparatus mounted on automobile 3710_1 transmits codirectional-automobile data symbol 3803_1 using the second subcarrier group at the third time. Note that codirectional-automobile data symbol 3803_1 is a data symbol transmitted by the radio communication apparatus mounted on automobile 3710_1 to the "other communication apparatus moving in the same direction, for example, the other communication apparatus mounted on the automobile traveling in the traveling direction" described in "Case 2."

The radio communication apparatus mounted on automobile 3710_1 transmits oncoming-automobile data symbol 3804_1 using the third subcarrier group at the third time. Oncoming-automobile data symbol 3804_1 is a data symbol transmitted by the radio communication apparatus mounted on automobile 3710_1 to the "communication apparatus moving in the opposite direction, for example, the other communication apparatus mounted on the automobile traveling on the opposite lane" described in "Case 3."

Note that each of "'static or semi-static' communication-apparatus data symbol 3802_1," "codirectional-automobile data symbol 3803_1," and "oncoming-automobile data symbol 3804_1" may include a symbol other than the data symbol, and may also be referred to by another name. For example, data symbols 3802_1, 3803_1, and 3804_1 may include a symbol such as a reference symbol, a pilot symbol, or the like for frequency offset estimation, channel estimation, phase noise estimation, Channel State Information (CSI) estimation, or the like.

Figure 24:
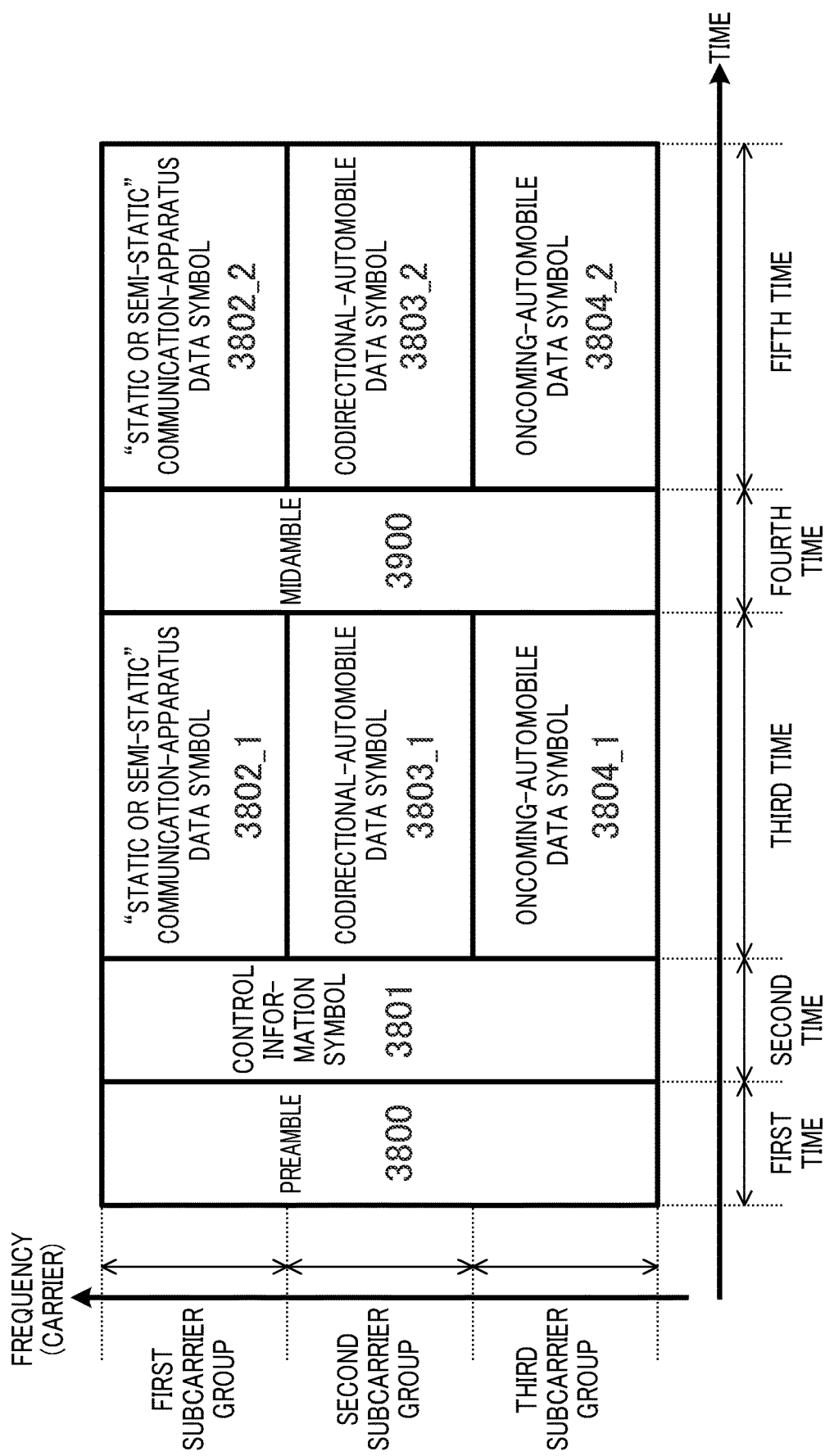
FIG. 24 illustrates an example of the frame configuration.

FIG. 24 illustrates another example of the "frame configuration of the modulation signal transmitted by the radio communication apparatus mounted on automobile 3710_1," which is different from the example of FIG. 23. Note that the modulation signal transmitted by the radio communication apparatus mounted on automobile 3710_1 is a modulation signal of the "OFDMA allowing multiple users to access by OFDM" or a modulation signal of the "scheme allowing multiple users to access by the multicarrier transmission scheme" as in FIG. 23. Note also that components in FIG. 24 that operate in the same manner as those in FIG. 23 are provided with the same reference numerals, and the descriptions of those components are omitted below.

In FIG. 24, the horizontal axis represents time, and the vertical axis represents the frequency (subcarrier). As illustrated in FIG. 24, a "first subcarrier group," "second subcarrier group," and "third subcarrier group" are present on the frequency axis, for example. Each of the subcarrier groups is composed of one or more subcarriers. In FIG. 24, the first to the third times are the same as the first to the third times in FIG. 23 and, accordingly, the descriptions thereof are omitted. Note that the subcarrier group may be described as "carrier group."

As illustrated in FIG. 24, the radio communication apparatus mounted on automobile 3710_1 transmits midamble 3900 using the "first subcarrier group, second subcarrier group, and third subcarrier group" at the fourth time. Midamble 3900 is a "symbol for a reception apparatus 'receiving the modulation signal transmitted by the radio communication apparatus mounted on automobile 3710_1' to perform, for example, time synchronization, frequency synchronization, and frequency offset estimation." Midamble 3900 has the same function as preamble 3800.

The radio communication apparatus mounted on automobile 3710_1 transmits "static or semi-static" communication-apparatus data symbol 3802_2 using the first subcarrier group at the fifth time. Data symbol 3802_2 at the fifth time is a data symbol having the same function as data symbol 3802_1 at the third time.

The radio communication apparatus mounted on automobile 3710_1 transmits codirectional-automobile data symbol 3803_2 using the second subcarrier group at the fifth time. Data symbol 3803_2 at the fifth time is a data symbol having the same function as data symbol 3803_1 at the third time.

The radio communication apparatus mounted on automobile 3710_1 transmits oncoming-automobile data symbol 3804_2 using the third subcarrier group at the fifth time. Data symbol 3804_2 at the fifth time is a data symbol having the same function as data symbol 3804_1 at the third time.

Note that each of "'static or semi-static' communication-apparatus data symbol 3802_2," "codirectional-automobile data symbol 3803_2," and "oncoming-automobile data symbol 3804_2" at the fifth time, like the data symbols at the third time, may include a symbol other than the data symbol, and may also be referred to by another name. For example, data symbols 3802_2, 3803_2, and 3804_2 may include a symbol such as a reference symbol, a pilot symbol, or the like for frequency offset estimation, channel estimation, phase noise estimation, Channel State Information (CSI) estimation, or the like.

In FIGS. 23 and 24, error correction coding schemes (e.g., types of error correction code, coding rates, and code lengths for use) used for generating "static or semi-static" communication-apparatus data symbols 3802_1 and 3802_2, codirectional-automobile data symbols 3803_1 and 3803_2, and oncoming-automobile data symbols 3804_1 and 3804_2 may be separately configured.

In addition, modulation schemes (that will be sets of modulation schemes when multiple streams are transmitted) used for generating "static or semi-static" communication-apparatus data symbols 3802_1 and 3802_2, codirectional-automobile data symbols 3803_1 and 3803_2, and oncoming-automobile data symbols 3804_1 and 3804_2 may be separately configured.

Further, transmission methods (e.g., single-stream transmission or multiple-stream transmission "using multiple antennas") used for generating "static or semi-static" communication-apparatus data symbols 3802_1 and 3802_2, codirectional-automobile data symbols 3803_1 and 3803_2, and oncoming-automobile data symbols 3804_1 and 3804_2 may be separately configurable.

It is thus possible to select an error correction coding scheme, a modulation scheme (a set of modulation schemes), and a transmission method that are suitable with respect to the influence of the Doppler (shift) frequency of the communication partner, so that data reception quality at the communication partner is improved as an effect.

In addition, an insertion method and an insertion rule for at least one of the pilot symbols (reference symbols) included in "static or semi-static" communication-apparatus data symbols 3802_1 and 3802_2, codirectional-automobile data symbols 3803_1 and 3803_2, and oncoming-automobile data symbols 3804_1 and 3804_2 may be separately configured. Note that, the pilot symbols (reference symbols) are symbols for a reception apparatus receiving a modulation signal, for example, to perform time synchronization, frequency synchronization, frequency offset estimation, or channel estimation.

It is thus possible to select an insertion method and an insertion rule for the pilot symbols (reference symbols) that are suitable with respect to the influence of the Doppler (shift) frequency of the communication partner, so that data reception quality at the communication partner is improved as an effect.

In the following, a description will be given of examples of the insertion method, the insertion rule and insertion method, and a change in the insertion rule for the pilot symbols (reference symbols).

FIG. 25A illustrates a first example of the "insertion method and insertion rule for pilot symbols (reference symbols)" for insertion into at least one of "static or semi-static" communication-apparatus data symbols 3802_1 and 3802_2, codirectional-automobile data symbols 3803_1 and 3803_2, and oncoming-automobile data symbols 3804_1 and 3804_2.

In FIG. 25A, the horizontal axis indicates time, the vertical axis indicates the frequency (carrier or subcarrier), and the shaded portion indicates pilot symbols (reference symbols) 4001. In FIG. 25A, the pilot symbols (reference symbols) are arranged on a plurality of first frequencies (carriers or subcarriers) at a first interval in the frequency direction.

FIG. 25B illustrates a second example of the "insertion method and insertion rule for pilot symbols (reference symbols)" for insertion into at least one of "static or semi-static" communication-apparatus data symbols 3802_1 and 3802_2, codirectional-automobile data symbols 3803_1 and 3803_2, and oncoming-automobile data symbols 3804_1 and 3804_2.

In FIG. 25B, the horizontal axis indicates time, the vertical axis indicates the frequency (carrier or subcarrier), and the shaded portion indicates pilot symbols (reference symbols) 4001. In FIG. 25B, pilot symbols (reference symbols) 4001 are arranged on a plurality of second frequencies (carriers or subcarriers) at second intervals in the frequency direction.

Figure 25C:
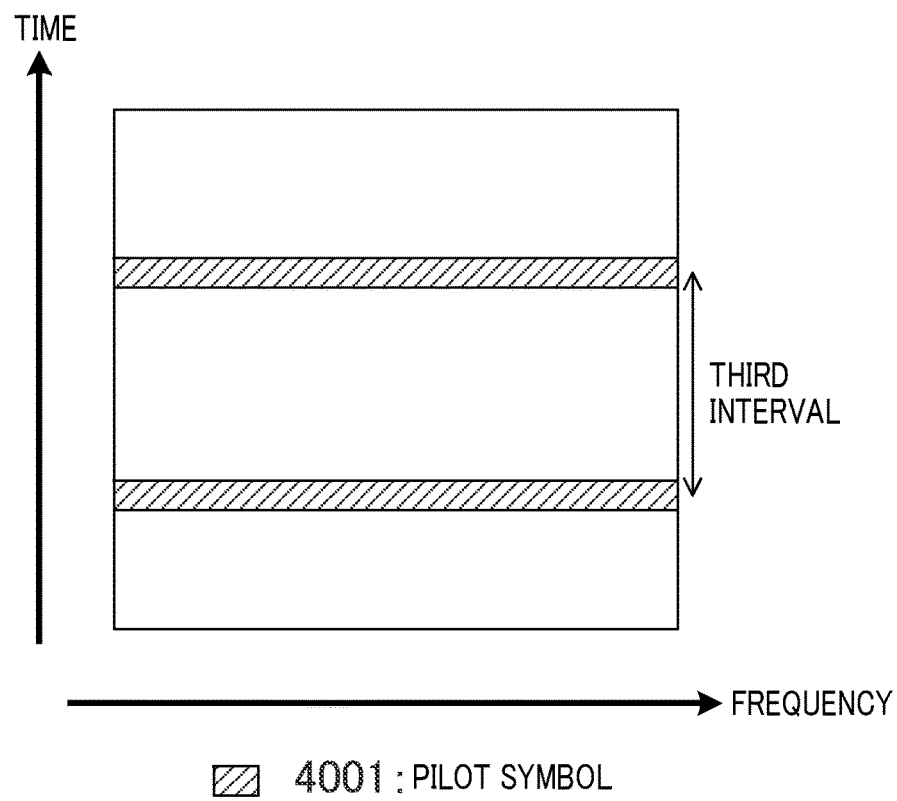
FIG. 25C illustrates an example of insertion of the pilot symbols.

FIG. 25C illustrates a third example of the "insertion method and insertion rule for pilot symbols (reference symbols)" for insertion into at least one of "static or semi-static" communication-apparatus data symbols 3802_1 and 3802_2, codirectional-automobile data symbols 3803_1 and 3803_2, and oncoming-automobile data symbols 3804_1 and 3804_2.

In FIG. 25C, the horizontal axis indicates the frequency (carrier or subcarrier), the vertical axis indicates time, and the shaded portion indicates pilot symbols (reference symbols) 4001. In FIG. 25C, pilot symbols (reference symbols) 4001 are arranged to a plurality of third times at third intervals in the time direction.

Figure 25D:
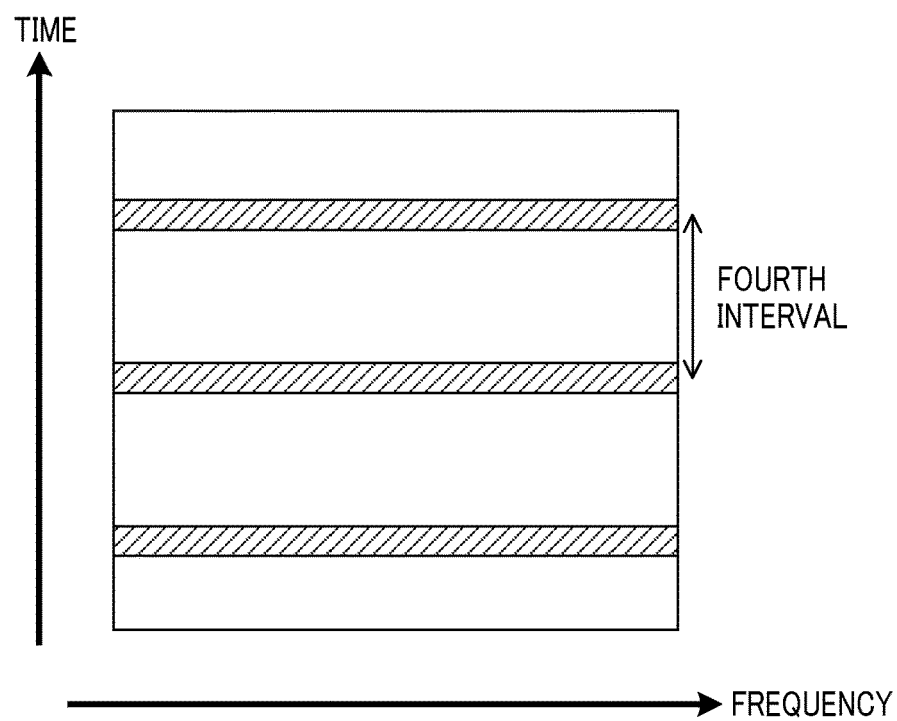
FIG. 25D illustrates an example of insertion of the pilot symbols.

FIG. 25D illustrates a fourth example of the "insertion method and insertion rule for pilot symbols (reference symbols)" for insertion into at least one of "static or semi-static" communication-apparatus data symbols 3802_1 and 3802_2, codirectional-automobile data symbols 3803_1 and 3803_2, and oncoming-automobile data symbols 3804_1 and 3804_2.

In FIG. 25D, the horizontal axis indicates the frequency (carrier or subcarrier), the vertical axis indicates time, and the shaded portion indicates pilot symbols (reference symbols) 4001. In FIG. 25D, pilot symbols (reference symbols) 4001 are arranged to a plurality of fourth times at fourth intervals in the time direction.

Figure 25E:
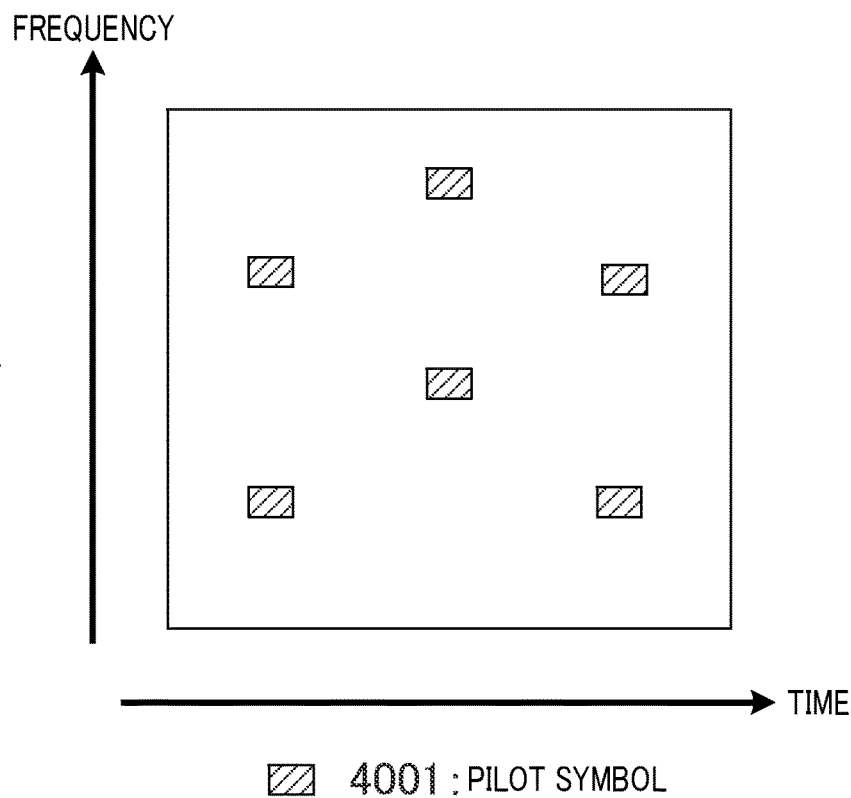
FIG. 25E illustrates an example of insertion of the pilot symbols.

FIG. 25E illustrates a fifth example of the "insertion method and insertion rule for pilot symbols (reference symbols)" for insertion into at least one of "static or semi-static" communication-apparatus data symbols 3802_1 and 3802_2, codirectional-automobile data symbols 3803_1 and 3803_2, and oncoming-automobile data symbols 3804_1 and 3804_2.

In FIG. 25E, the horizontal axis indicates time, the vertical axis indicates the frequency (carrier or subcarrier), and the shaded portion indicates pilot symbols (reference symbols) 4001. In FIG. 25E, six pilot symbols 4001 are arranged in a plurality of fifth regions.

Figure 25F:
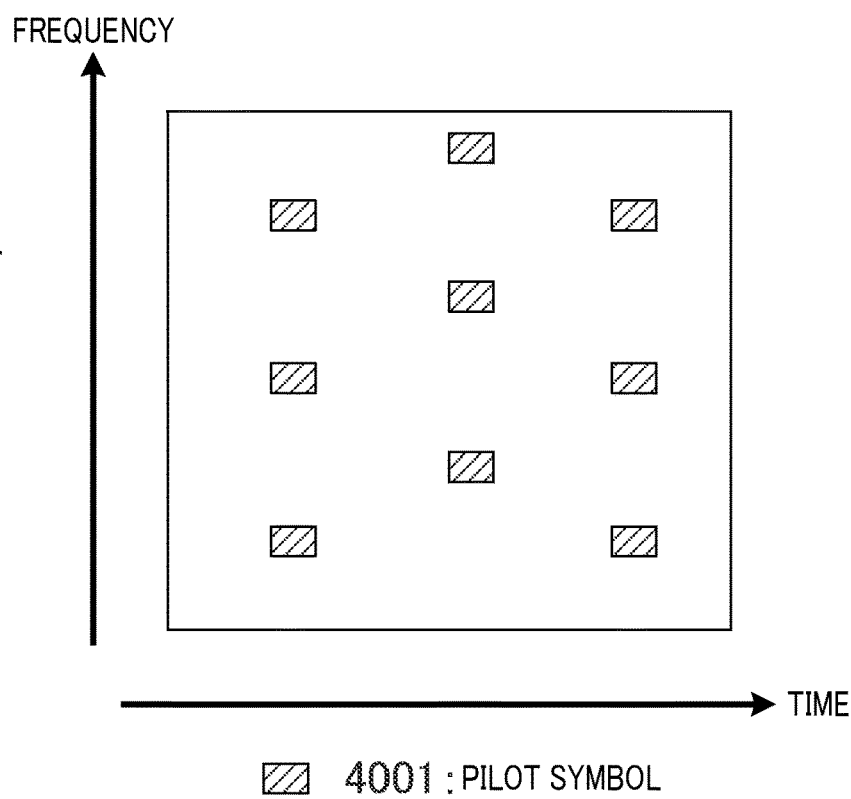
FIG. 25F illustrates an example of insertion of the pilot symbols.

FIG. 25F illustrates a sixth example of the "insertion method and insertion rule for pilot symbols (reference symbols)" for insertion into at least one of "static or semi-static" communication-apparatus data symbols 3802_1 and 3802_2, codirectional-automobile data symbols 3803_1 and 3803_2, and oncoming-automobile data symbols 3804_1 and 3804_2.

In FIG. 25F, the horizontal axis indicates time, the vertical axis indicates the frequency (carrier or subcarrier), and the shaded portion indicates pilot symbols (reference symbols) 4001. In FIG. 25F, nine pilot symbols 4001 are arranged in a plurality of sixth regions.

Figure 25G:
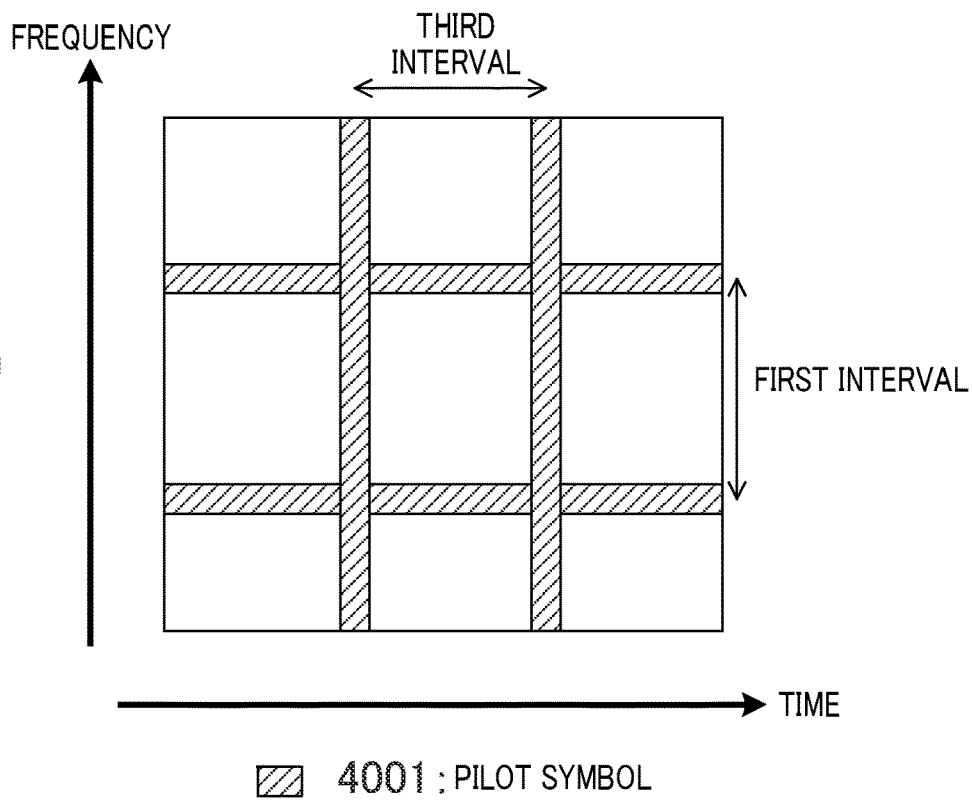
FIG. 25G illustrates an example of insertion of the pilot symbols.

FIG. 25G illustrates a seventh example of the "insertion method and insertion rule for pilot symbols (reference symbols)" for insertion into at least one of "static or semi-static" communication-apparatus data symbols 3802_1 and 3802_2, codirectional-automobile data symbols 3803_1 and 3803_2, and oncoming-automobile data symbols 3804_1 and 3804_2.

In FIG. 25G, the horizontal axis indicates time, the vertical axis indicates the frequency (carrier or subcarrier), and the shaded portion indicates pilot symbols (reference symbols) 4001. In FIG. 25G, pilot symbols (reference symbols) 4001 are arranged at a plurality of seventh frequencies (carriers or subcarriers) at the first intervals in the frequency direction and to a plurality of seventh times at the third intervals in the time direction.

Figure 25H:
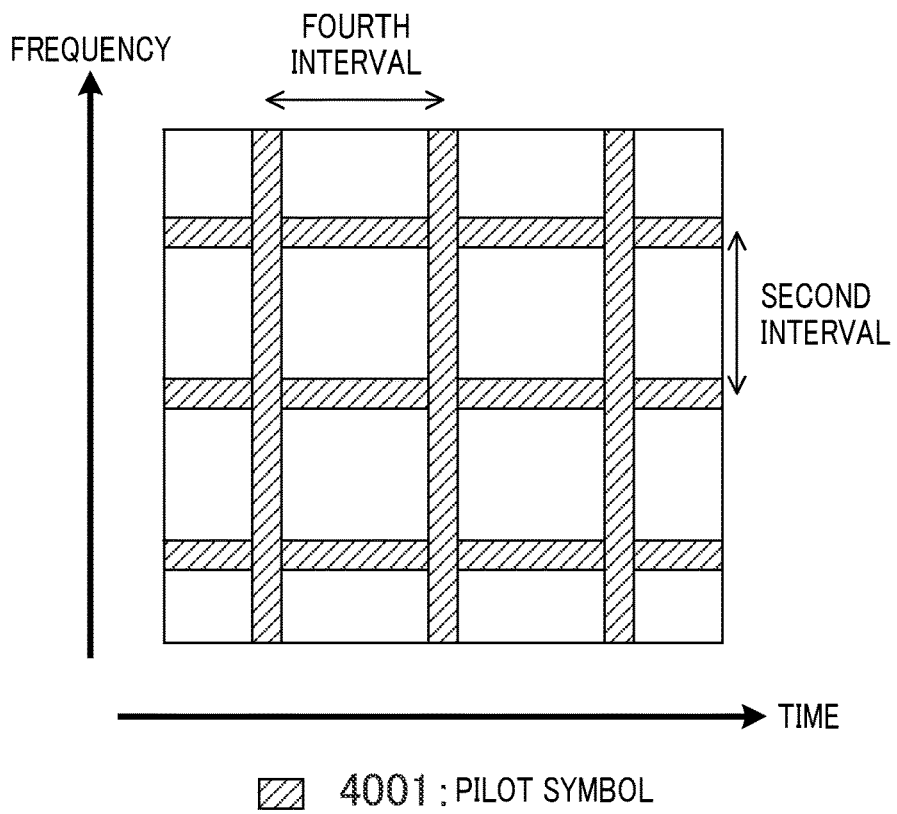
FIG. 25H illustrates an example of insertion of the pilot symbols.

FIG. 25H illustrates an eighth example of the "insertion method and insertion rule for pilot symbols (reference symbols)" for insertion into at least one of "static or semi-static" communication-apparatus data symbols 3802_1 and 3802_2, codirectional-automobile data symbols 3803_1 and 3803_2, and oncoming-automobile data symbols 3804_1 and 3804_2.

In FIG. 25H, the horizontal axis indicates time, the vertical axis indicates the frequency (carrier or subcarrier), and the shaded portion indicates pilot symbols (reference symbols) 4001. In FIG. 25H, pilot symbols (reference symbols) 4001 are arranged at a plurality of eighth frequencies (carriers or subcarriers) at the second intervals in the frequency direction and to a plurality of eighth times at the fourth intervals in the time direction.

Some of the insertion methods and insertion rules for the pilot symbols (reference symbols) in FIGS. 25A, 25B, 25C, 25D, 25E, 25F, 25G, and 25H can be selected for each of "static or semi-static" communication-apparatus symbols 3802_1 and 3802_2, codirectional-automobile data symbols 3803_1 and 3803_2, and oncoming-automobile data symbols 3804_1 and 3804_2, and the insertion methods and insertion rules may be changed after selection of the insertion methods and insertion rules.

Note that control information symbol 3801 in FIGS. 23 and 24 includes information used by the reception apparatus for demodulation, such as, for example, information on an error correction code, information on a modulation scheme, information on a transmission method, and information on a frame configuration for generating "static or semi-static" communication-apparatus data symbols 3802_1 and 3802_2, codirectional-automobile data symbols 3803_1 and 3803_2, and oncoming-automobile data symbols 3804_1 and 3804_2. Thus, the reception apparatus can demodulate the data symbol by obtaining the information included in control information symbol 3801.

Note that the frame configurations illustrated in FIGS. 23 and 24 are only examples, and the present example can be implemented even with a different frame configuration from those of FIGS. 23 and 24.

In the description with reference to FIG. 24, the subcarriers used for each of "static or semi-static" communication-apparatus data symbol 3802_1, codirectional-automobile data symbol 3803_1, and oncoming-automobile data symbol 3804_1 at the third time are the same as the subcarriers used for each of "static or semi-static" communication-apparatus data symbol 3802_2, codirectional-automobile data symbol 3803_2, and oncoming-automobile data symbol 3804_2 at the fifth time. However, some or all of the subcarriers used for each of the data symbols may be different between the third time and the fifth time.

In addition, FIGS. 23 and 24 illustrate examples in which three types of data symbols, i.e., "'static or semi-static' communication-apparatus data symbols 3802_1 and 3802_2," "codirectional-automobile data symbols 3803_1 and 3803_2," and "oncoming-automobile data symbols 3804_1 and 3804_2" exist in the frames. However, the frames may have a configuration in which at least one data symbol among "'static or semi-static' communication-apparatus data symbols 3802_1 and 3802_2," "codirectional-automobile data symbols 3803_1 and 3803_2," and "oncoming-automobile data symbols 3804_1 and 3804_2" exists.

Next, the configuration of the communication apparatus that transmits the modulation signal of the frame of FIG. 23 or 24 will be described.

FIG. 1 illustrates a configuration example of the communication apparatus that transmits the modulation signal of the frame of FIG. 23 or 24. In FIG. 1, for example, information 101-1 is information transmitted by "static or semi-static" communication-apparatus data symbol 3802_1 or 3802_2. Information 101-2 is information transmitted by codirectional-automobile data symbol 3803_1 or 3803_2. Information 101-3 is information transmitted by oncoming-automobile data symbol 3804_1 or 3804_2. Note that, while information is described in FIG. 1 up to M-th information 101-M, a description will be given here on the assumption that M=3.

Signal processor 102 performs processing such as error correction coding, mapping, and the like on input information 101-1, 101-2, and 101-3 to generate "static or semi-static" communication-apparatus data symbol 3802_1 or 3802_2, codirectional-automobile data symbol 3803_1 or 3803_2, and oncoming-automobile data symbol 3804_1 or 3804_2.

Then, signal processor 102 generates preamble 3800, control information symbol 3801, and midamble 3900.

Signal processor 102 then performs, for example, precoding processing, and outputs signal 103-1 after signal processing, signal 103-2 after signal processing, . . . , and signal 103-M after signal processing (that is, signals 103-$i_e$ after signal processing ("$i_e$" denotes an integer of from 1 through M)).

In addition, as a result of the processing of signal processor 102, "static or semi-static" communication-apparatus data symbols 3802_1 and 3802_2 have the first transmission directivity, codirectional-automobile data symbols 3803_1 and 3803_2 have the second transmission directivity, and oncoming-automobile data symbols 3804_1 and 3804_2 have the third transmission directivity. Note that, generation of signals having the transmission directivities is as described above and, accordingly, the description thereof is omitted here.

Next, the first transmission directivity for "static or semi-static" communication-apparatus data symbols 3802_1 and 3802_2, the second transmission directivity for codirectional-automobile data symbols 3803_1 and 3803_2, and the third transmission directivity for oncoming-automobile data symbols 3804_1 and 3804_2 will be described with reference to FIG. 26.

Figure 26:
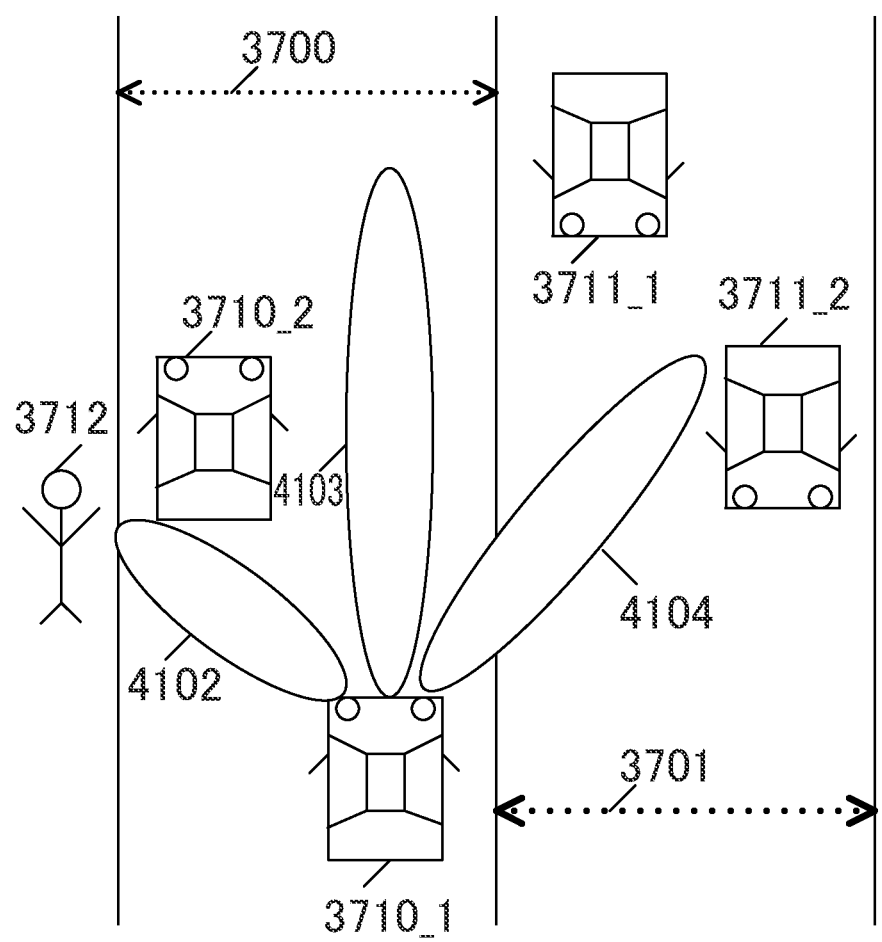
FIG. 26 illustrates an example of transmission directivity.

FIG. 26 illustrates an example of the transmission directivities for a case where the radio communication apparatus mounted on automobile 3710_1 in FIG. 22 transmits the modulation signal of the frame as illustrated in FIG. 23 or 24.

FIG. 26 illustrates first transmission directivity 4102 for "static or semi-static" communication-apparatus data symbols 3802_1 and 3802_2, second transmission directivity 4103 for codirectional-automobile data symbols 3803_1 and 3803_2, and third transmission directivity 4104 for oncoming-automobile data symbols 3804_1, 3804_2. Signal processor 102 illustrated in FIG. 1 may perform precoding which brings the state of FIG. 26. Thus, as an effect, the reception quality of data is improved at the reception apparatus as the communication partner of the radio communication apparatus mounted on automobile 3710_1.

Note that, although not illustrated in FIG. 26, the radio communication apparatus mounted on automobile 3710_1 may also have the first transmission directivity for "static or semi-static" communication-apparatus data symbols 3802_1 and 3802_2, the second transmission directivity for codirectional-automobile data symbols 3803_1 and 3803_2, and the third transmission directivity for oncoming-automobile data symbols 3804_1 and 3804_2 at the rear of the automobile. The directions of generation of the transmission directivities are not limited to the example of FIG. 26. The number of generated transmission directivities is not limited to the example of FIG. 26.

The radio communication apparatus which is a communication partner of the radio communication apparatus mounted on automobile 3710_1 and which includes the reception apparatus is configured as illustrated in FIG. 4, for example. Note that, the operations in FIG. 4 have already been described and, accordingly, the description thereof is omitted here.

Figure 27:
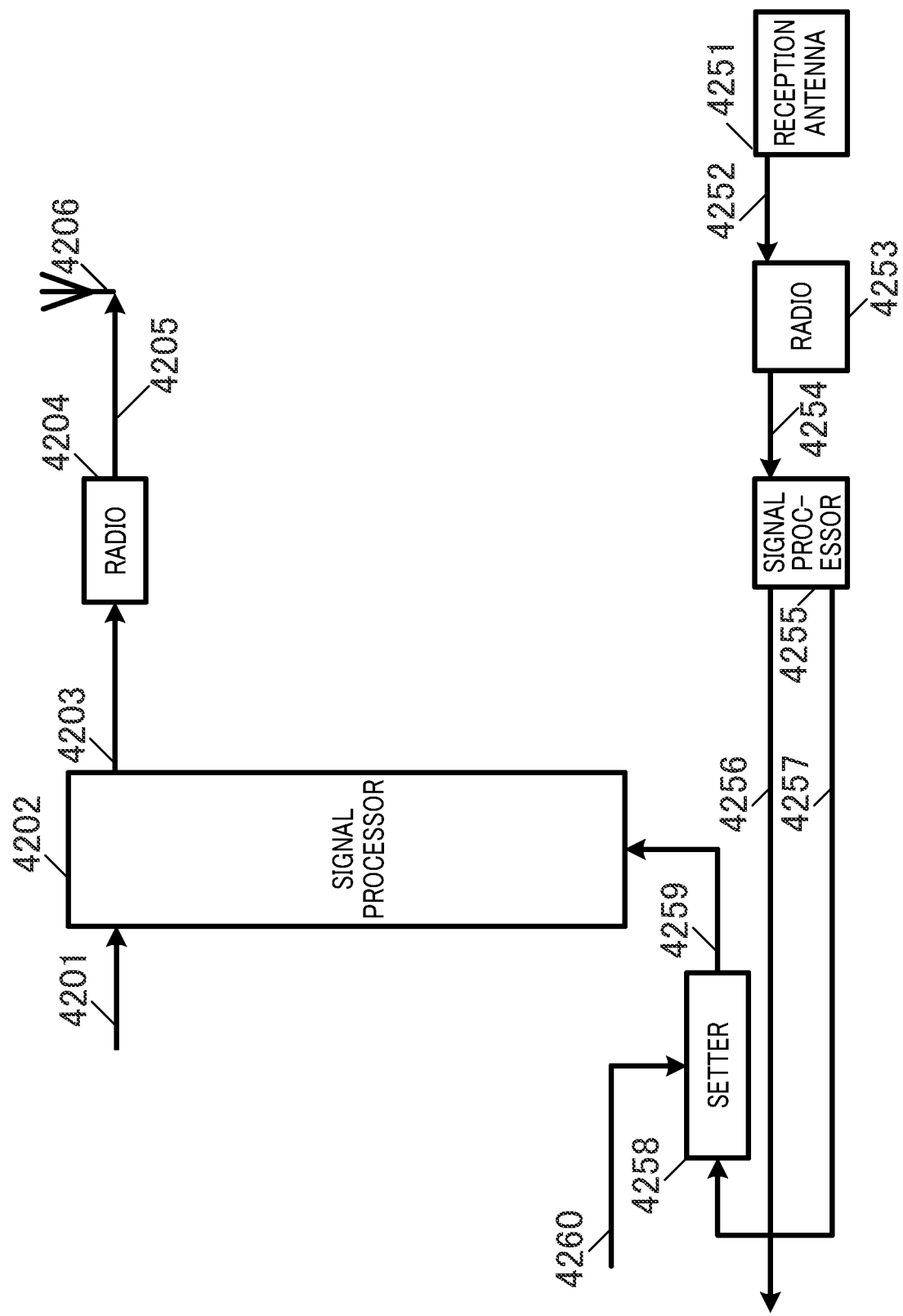
FIG. 27 illustrates an example of a configuration of a transmission apparatus.

FIG. 27 illustrates a configuration of the radio communication apparatus, which is different from the configuration of FIG. 1, for a case where the radio communication apparatus mounted on automobile 3710_1 transmits the modulation signal of the frame as illustrated in FIG. 23 or 24.

In FIG. 27, radio 4253 receives an input of reception signal 4252 received by reception antenna 4251, performs processing, for example, of frequency conversion on the reception signal, and outputs baseband signal 4254.

Signal processor 4255 receives an input of baseband signal 4254, and performs processing, for example, of demodulation and decoding of an error correcting code to obtain data. Then, signal processor 4255 outputs data 4256 and outputs control information 4257.

Setter 4258 receives inputs of control information 4257 and configuration information 4260, and outputs information 4259 on the transmission method.

Signal processor 4202 receives inputs of information 4201 and information 4259 on the transmission method, and performs error correction coding and mapping (modulation), for example, based on the information on the "transmission method, error correction coding scheme, and modulation scheme for each symbol" and information on the frame configuration included in information 4259 on the transmission method, so as to generate and output modulation signal 4203 of the frame as illustrated in FIG. 23 or 24, for example.

Radio 4204 receives an input of modulation signal 4203, and performs processing, for example, of frequency conversion to output transmission signal 4205. Transmission signal 4205 is output as a radio wave from transmission antenna 4206.

For example, if the "radio communication apparatus mounted on automobile 3710_1" having the configuration of FIG. 27 would transmit transmission signal 4205, the transmission directivities as illustrated in FIG. 26 are not provided since the precoding processing is not performed. To avoid this, when transmitting the data symbols as illustrated in FIG. 23 or 24, the "radio communication apparatus mounted on automobile 3710_1" having the configuration of FIG. 27 performs processing of configuring an error correction coding scheme, modulation scheme, and transmission method for each data symbol in consideration of a relative speed so as to allow the reception apparatus as the communication partner of the "radio communication apparatus mounted on automobile 3710_1" to obtain high data reception quality.

Figure 28:
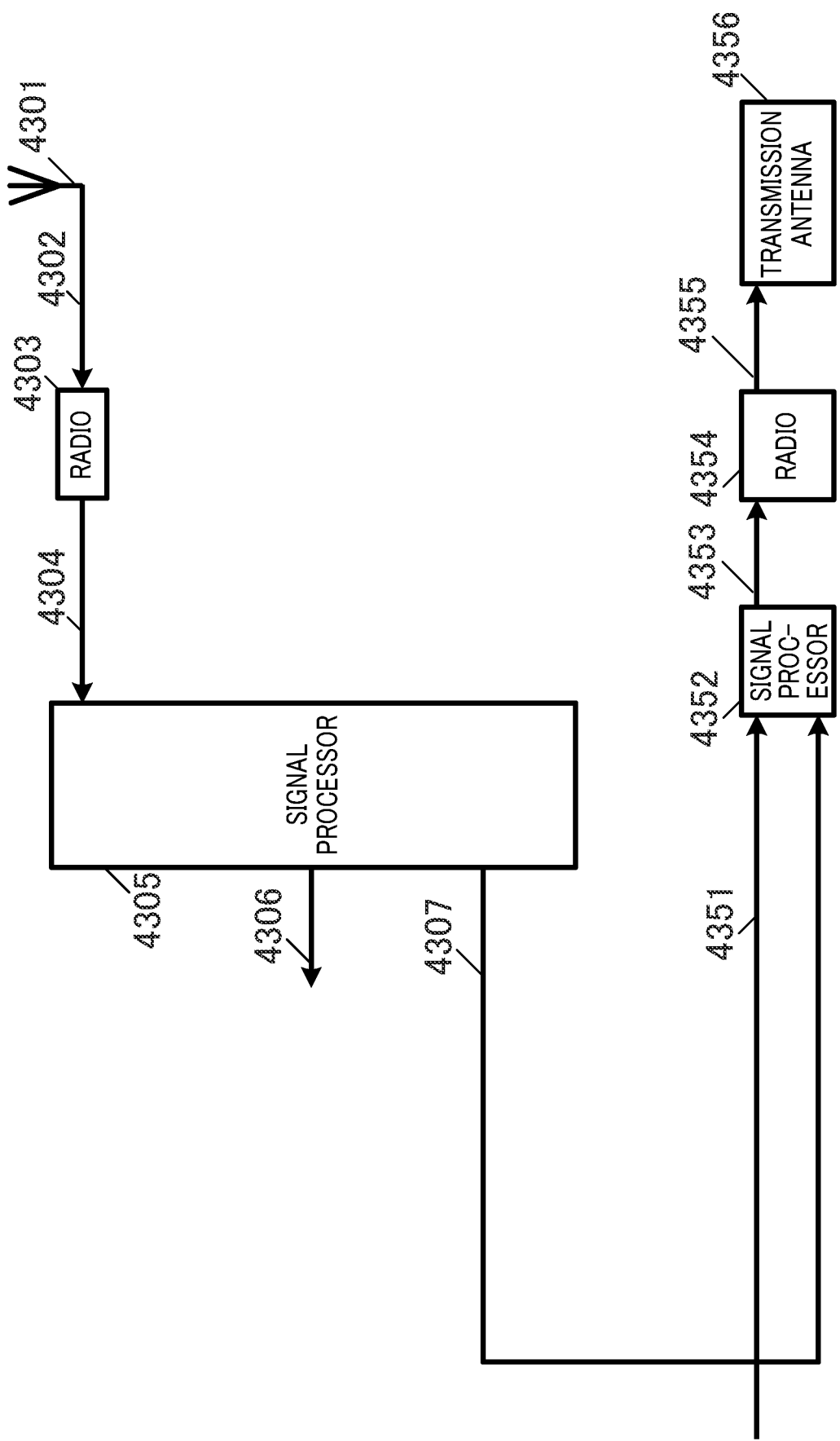
FIG. 28 illustrates an example of a configuration of a reception apparatus.

FIG. 28 illustrates a configuration of the radio communication apparatus including the reception apparatus as a communication partner of the "radio communication apparatus mounted on automobile 3710_1."

Reception antenna 4301 receives a transmission signal transmitted by the "radio communication apparatus mounted on automobile 3710_1." Radio 4303 receives an input of reception signal 4302 received by reception antenna 4301, and performs processing, for example, of frequency conversion to output baseband signal 4304.

Signal processor 4305 receives an input of baseband signal 4304, and performs processing, for example, of demodulation and decoding of the error correcting code to obtain symbols having the frame configuration of FIG. 23 or 24. Then, signal processor 4305 is capable of knowing the position of a desired data symbol in the frame from control information symbol 3801, and obtaining data 4306 at the desired data symbol.

For example, since the frames in FIGS. 23 and 24 include data symbols for three types of relative speeds, a subcarrier group with the fewest errors may be selected from among the first to the third subcarrier groups using preamble 3800 or control information symbol 3801, or data symbols at the third time may be demodulated for each subcarrier group and a data symbol with the fewest errors may be output as data 4306.

Further, signal processor 4305 obtains control information 4307 from baseband signal 4304, and outputs the control information to signal processor 4352.

When information 4351 is to be transmitted to the "radio communication apparatus mounted on automobile 3710_1," signal processor 4352 receives inputs of control information 4307 obtained from the reception signal and information 4351, and performs processing, for example, of the error correction coding and mapping (modulation) used by the "radio communication apparatus mounted on automobile 3710_1" to output baseband signal 4353.

Radio 4354 receives an input of baseband signal 4353, and performs processing, for example, of frequency conversion to output transmission signal 4355. Transmission signal 4355 is output from transmission antenna 4356, for example, as a radio wave.

By the above operation, the communication partner of the "radio communication apparatus mounted on automobile 3710_1" receives the transmission frame in which the data symbols generated in consideration of the relative speed are arranged for each of the subcarrier groups, so that a desired data symbol can be obtained, and a modulation signal of a transmission method suitable for propagation of a radio wave can be obtained. Therefore, high data reception quality can be obtained.

Next, an example of the frame configuration of the modulation signal transmitted by the radio communication apparatus mounted on automobile 3710_1 in the situation of FIG. 22, which is different from the example of FIG. 23 or 24, will be described.

Figure 29:
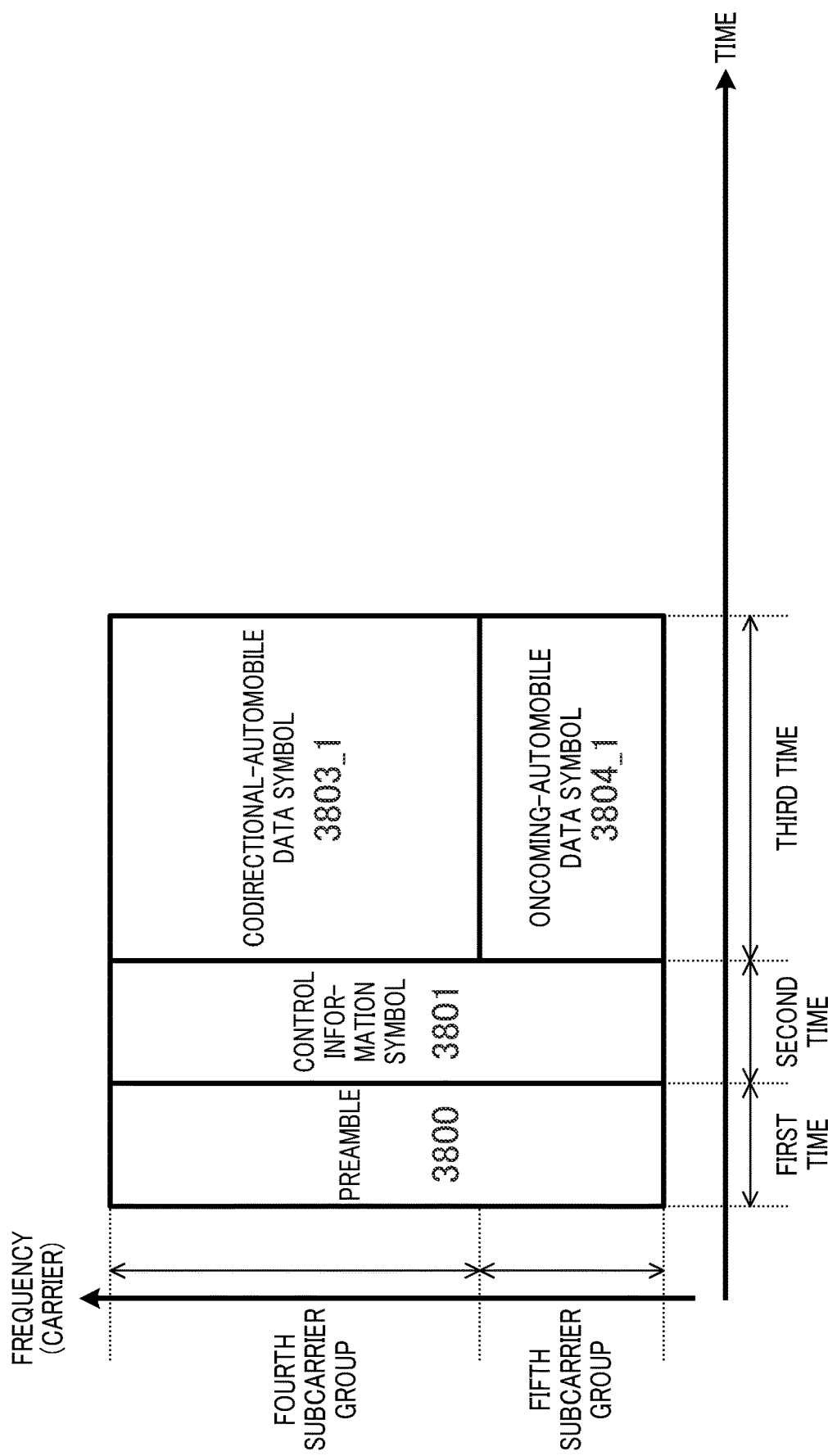
FIG. 29 illustrates an example of the frame configuration.

FIG. 29 illustrates an example of the "frame configuration of the modulation signal transmitted by the radio communication apparatus mounted on automobile 3710_1." Note that the modulation signal transmitted by the radio communication apparatus mounted on automobile 3710_1 is a modulation signal of the "OFDMA allowing multiple users to access by OFDM" or a modulation signal of the "scheme allowing multiple users to access by the multicarrier transmission scheme."

In FIG. 29, the horizontal axis represents time, and the vertical axis represents the frequency (carrier or subcarrier). As illustrated in FIG. 29, a "fourth subcarrier group" and "fifth subcarrier group" are present on the frequency axis. Each of the subcarrier groups is composed of one or more subcarriers. Note that the subcarrier group may be described as "carrier group."

As illustrated in FIG. 29, the radio communication apparatus mounted on automobile 3710_1 transmits preamble 3800 using the fourth subcarrier group at the first time and the fifth subcarrier group at the first time. Preamble 3800 and control information symbol 3801 in FIG. 29 are symbols having the same functions as preamble 3800 and control information symbol 3801 in FIG. 23 and, accordingly, the descriptions thereof are omitted here.

The radio communication apparatus mounted on automobile 3710_1 transmits control information symbol 3801 using the fourth subcarrier group at the second time and the fifth subcarrier group at the second time.

The radio communication apparatus mounted on automobile 3710_1 transmits codirectional-automobile data symbol 3803_1 using the fourth subcarrier group at the third time. Codirectional-automobile data symbol 3803_1 has already been described and, accordingly, the description thereof is omitted here.

The radio communication apparatus mounted on automobile 3710_1 transmits oncoming-automobile data symbol 3804_1 using the fifth subcarrier group at the third time. Oncoming-automobile data symbol 3804_1 has already been described and, accordingly, the description thereof is omitted here.

Note that, the relative speed of the radio communication apparatus possessed by "person 3712" and communication apparatus 3713 in FIG. 22 is 100 km/h with respect to the radio communication apparatus mounted on automobile 3710_1 and differs by 100 km/h from both of the relative speed of 0 km/h of "codirectional-automobile data symbol 3803_1" and the relative speed of 200 km/h of "oncoming-automobile data symbol 3804_1." Thus, the radio communication apparatus possessed by the person and the communication apparatus may receive either of the data symbols to obtain data in the case of the frame configuration illustrated in FIG. 29.

However, when the radio communication apparatuses mounted on codirectional automobiles form a multi-hop network or a mesh network, the transmission destination of the data of "codirectional-automobile data symbol 3803_1" is limited, so that the radio communication apparatus possessed by "person 3712" and communication apparatus 3713 receive "oncoming-automobile data symbol 3804_1" to obtain data.

Hence, even "codirectional-automobile data symbol 3803_1" may include data to be transmitted to the radio communication apparatus possessed by "person 3712" or communication apparatus 3713 that is "static or semi-static" communication apparatuses. In addition, even "oncoming-automobile data symbol 3804_1" may include data to be transmitted to the radio communication apparatus possessed by "person 3712" or communication apparatus 3713 that is "static or semi-static" communication apparatuses.

Figure 30:
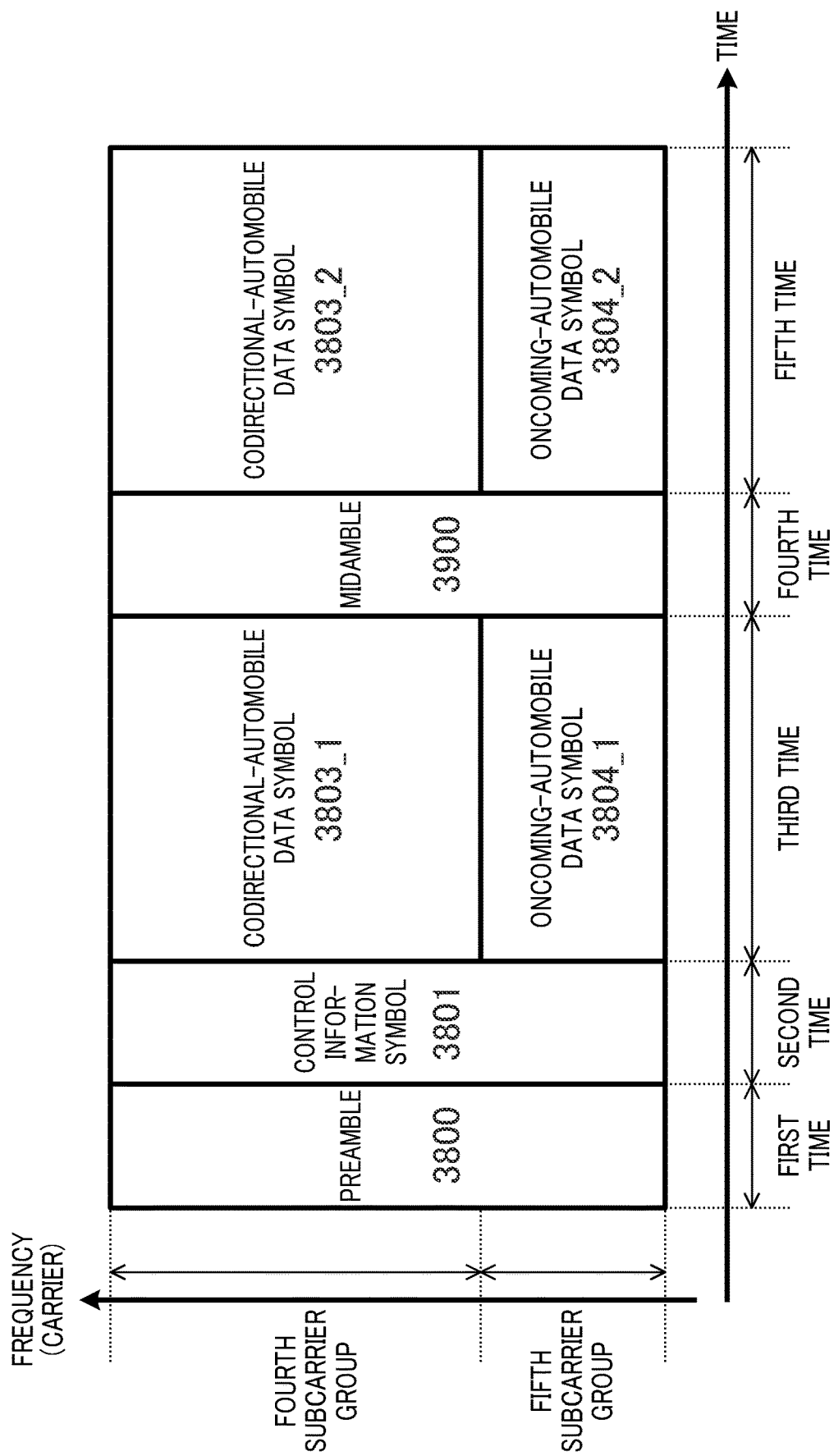
FIG. 30 illustrates an example of the frame configuration.

FIG. 30 illustrates an example of the "frame configuration of the modulation signal transmitted by the radio communication apparatus mounted on automobile 3710_1," which is different from the example of FIG. 29. Note that the modulation signal transmitted by the radio communication apparatus mounted on automobile 3710_1 has already been described and, accordingly, the description thereof is omitted here. Note also that components that operate in the same manner as those in FIG. 29 are provided with the same reference numerals, and the descriptions of those components are omitted.

As illustrated in FIG. 30, the radio communication apparatus mounted on automobile 3710_1 transmits midamble 3900 using the "fourth subcarrier group and fifth subcarrier group" at the fourth time. Midamble 3900 has already been described and, accordingly, the description thereof is omitted here.

The radio communication apparatus mounted on automobile 3710_1 transmits codirectional-automobile data symbol 3803_2 using the fourth subcarrier group at the fifth time. Codirectional-automobile data symbol 3803_2 has already been described and, accordingly, the description thereof is omitted here.

The radio communication apparatus mounted on automobile 3710_1 transmits oncoming-automobile data symbol 3804_2 using the fifth subcarrier group at the fifth time. Oncoming-automobile data symbol 3804_2 has already been described and, accordingly, the description thereof is omitted here.

Note that, as with FIG. 29, even "codirectional-automobile data symbol 3803_1 or 3803_2" of the frame configuration of FIG. 30 may include data to be transmitted to the radio communication apparatus possessed by "person 3712" and communication apparatus 3713 that are "static or semi-static" communication apparatuses. In addition, even "oncoming-automobile data symbol 3804_1 or 3804_2" may include data to be transmitted to the radio communication apparatus possessed by "person 3712" and communication apparatus 3713 that are "static or semi-static" communication apparatuses.

In FIGS. 29 and 30, each of the error correction coding scheme, the modulation scheme, and the transmission method used for generating each data symbol may be separately configured as already described.

It is thus possible to select an error correction coding scheme, a modulation scheme (a set of modulation schemes), and a transmission method that are suitable with respect to the influence of the Doppler (shift) frequency of each of the communication partners different in relative speed, so that data reception quality at the communication partner is improved.

In addition, the insertion method and the insertion rule for pilot symbols (reference symbols) included in codirectional-automobile data symbols 3803_1 and 3803_2 and for pilot symbols (reference symbols) included in oncoming-automobile data symbols 3804_1 and 3804_2 may be separately configured. The pilot symbols (reference symbols) have already been described and, accordingly, the descriptions thereof are omitted here.

It is thus possible to select an insertion method and an insertion rule for the pilot symbols (reference symbols) that are suitable with respect to the influence of the Doppler (shift) frequency of the communication partner, so that data reception quality at the communication partner is improved. Note that, the modifications of the insertion method and the insertion rule for the pilot symbols have already been described with reference to FIGS. 25A, 25B, 25C, 25D, 25E, 25F, 25G, and 25H. Accordingly, the modifications are not described here.

Note that the frame configurations illustrated in FIGS. 29 and 30 are only examples, and the present example can be implemented even with a different frame configuration from those of FIGS. 29 and 30.

In addition, in the description with reference to FIG. 30, the subcarrier groups used for the data symbols (3803_1 and 3804_1) at the third time are the same as the subcarrier groups used for the data symbols (3803_2 and 3804_2) at the fifth time. However, some or all of the subcarrier groups used for the data symbols (3803_1 and 3804_1) may be different from the subcarrier groups used for the data symbols (3803_2 and 3804_2) at the fifth time.

Further, in FIGS. 29 and 30, two types of data symbols, i.e., "codirectional-automobile data symbols 3803_1 and 3803_2" and "oncoming-automobile data symbols 3804_1 and 3804_2" exist in the frames. However, the frames may have a configuration in which at least one of the types of data symbol of "codirectional-automobile data symbols 3803_1 and 3803_2" and "oncoming-automobile data symbols 3804_1 and 3804_2" exist.

In addition, the configuration examples of the transmission apparatus transmitting the modulation signal of the frame configuration of FIG. 29 or 30 and the reception apparatus receiving the modulation signal are "FIGS. 1 and 27" and "FIGS. 4 and 28," respectively. The operations of "FIGS. 1 and 27" and "FIGS. 4 and 28" have already been described. Accordingly, the descriptions thereof are omitted here.

As already described, in the frame configuration (FIG. 23, 24, 29, or 30) described in the present example, the same information, the same data, or multicast (broadcast) data may be included in the "data included in 'static or semi-static' communication-apparatus data symbol 3802_1 or 3802_2," the "data included in codirectional-automobile data symbol 3803_1 or 3803_2," and the "data included in oncoming-automobile data symbol 3804_1 or 3804_2."

It is thus possible to broadcast data to more radio communication apparatuses within a certain time interval.

Note that, "'static or semi-static' communication-apparatus data symbols 3802_1 and 3802_2," "codirectional-automobile data symbols 3803_1 and 3803_2," and "oncoming-automobile data symbols 3804_1 and 3804_2" may also be unicast data symbols.

The frame configurations (FIGS. 23, 24, 29, and 30) may include symbols other than those illustrated in the figures.

Further, the frame configuration illustrated in FIG. 23, 24, 29, or 30 may be applied to each stream or each modulation signal in MIMO already described above.

Example 4

In Example 4, a description will be given of a modification of Example 3.

The present example is an example in which the "OFDMA allowing multiple users to access by OFDM" or the "scheme allowing multiple users to access by the multicarrier transmission scheme" is used.

FIG. 22 illustrates an exemplary state in the present example. Note that, Example 3 has been described with reference to FIG. 22 and, accordingly, such description is omitted.

Next, a "frame configuration of the modulation signal transmitted by the radio communication apparatus mounted on automobile 3710_1" will be described.

Figure 31:
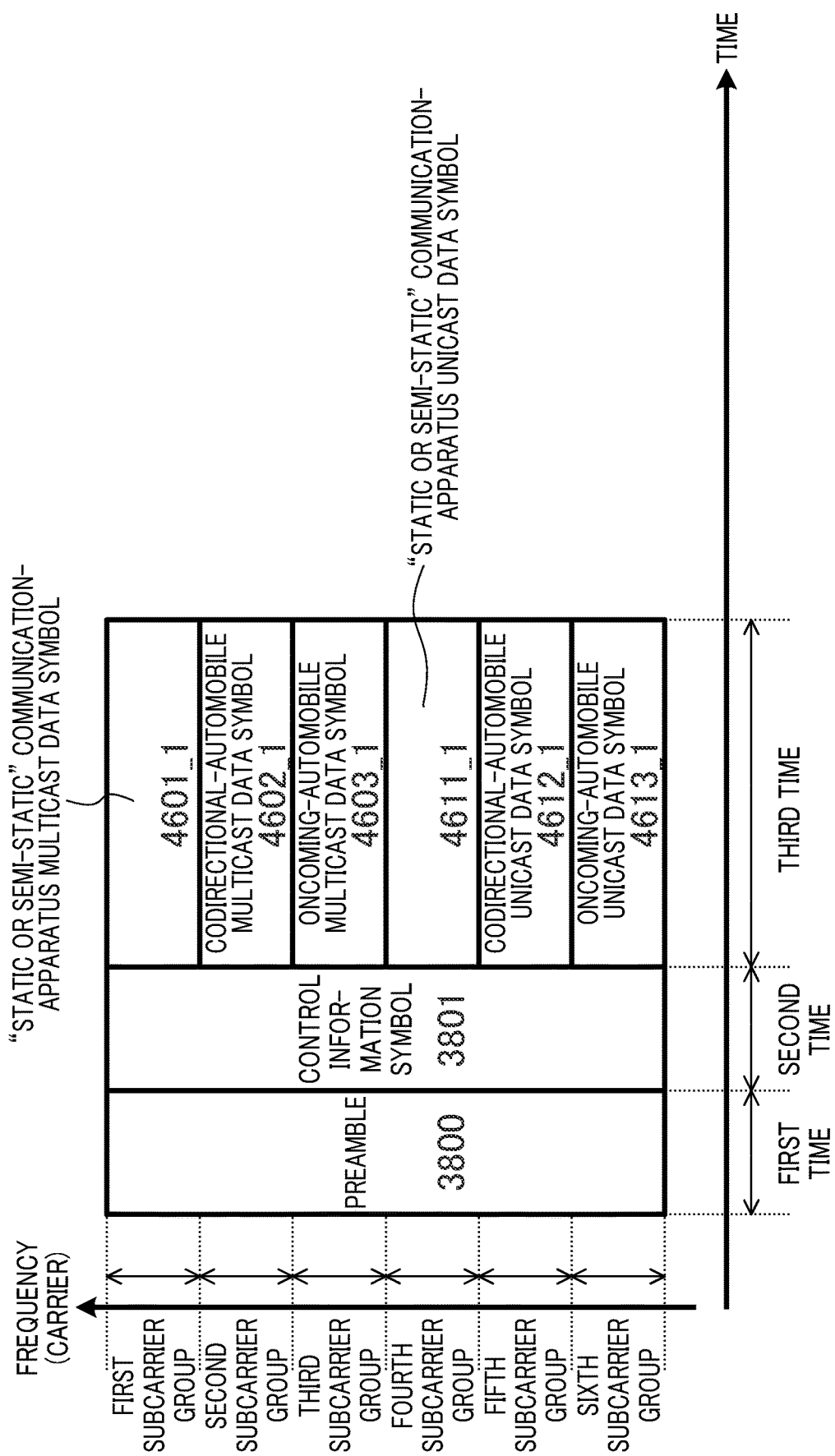
FIG. 31 illustrates an example of the frame configuration.

FIG. 31 illustrates an example of the "frame configuration of the modulation signal transmitted by the radio communication apparatus mounted on automobile 3710_1." Note that the modulation signal transmitted by the radio communication apparatus mounted on automobile 3710_1 is a modulation signal of the "OFDMA allowing multiple users to access by OFDM" or a modulation signal of the "scheme allowing multiple users to access by the multicarrier transmission scheme" as in Example 3. Note that components that operate in the same manner as those in FIG. 23 are provided with the same reference numerals, and the descriptions of those components are omitted.

In FIG. 31, the horizontal axis represents time, and the vertical axis represents the frequency (carrier or subcarrier). As illustrated in FIG. 31, a "first subcarrier group," "second subcarrier group," "third subcarrier group," "fourth subcarrier group," "fifth subcarrier group," and "sixth subcarrier group" exist on the frequency axis, for example. Note that, each of the subcarrier groups is composed of one or more subcarriers. Note that the subcarrier group may be described as "carrier group."

In addition, as illustrated in FIG. 31, the radio communication apparatus mounted on automobile 3710_1 transmits preamble 3800 using the first subcarrier group, the second subcarrier group, the third subcarrier group, the fourth subcarrier group, the fifth subcarrier group, and the sixth subcarrier group at the first time. Preamble 3800 is the same as in Example 3 and, accordingly, the description thereof is omitted.

The radio communication apparatus mounted on automobile 3710_1 transmits control information symbol 3801 using the first subcarrier group, the second subcarrier group, the third subcarrier group, the fourth subcarrier group, the fifth subcarrier group, and the sixth subcarrier group at the second time. Note that control information symbol 3801 is the same as in Example 3 and, accordingly, the description thereof is omitted.

Each data symbol is transmitted using one subcarrier group at the third time in Example 3. Meanwhile, in Example 4, a description will be given of an example in which multicast data symbols and unicast data symbols are transmitted using respective different subcarrier groups at the third time.

The radio communication apparatus mounted on automobile 3710_1 transmits "static or semi-static" communication-apparatus multicast data symbol 4601_1 in the first subcarrier group at the third time, and transmits "static or semi-static" communication-apparatus unicast data symbol 4611_1 in the fourth subcarrier group at the third time.

Note that "static or semi-static" communication-apparatus multicast data symbol 4601_1 is the data symbol described at "Case 1" of Example 3, and is further a data symbol used by the radio communication apparatus mounted on automobile 3710_1 to transmit a data symbol transmitted to a plurality of radio communication apparatuses (a plurality of radio communication apparatuses are target apparatuses for reception), i.e., a multicast (broadcast) data symbol.

Note that "static or semi-static" communication-apparatus unicast data symbol 4611_1 is the data symbol described at "Case 1" of Example 3, and is further defined as a symbol used by the radio communication apparatus mounted on automobile 3710_1 to transmit a data symbol transmitted, for example, to a single (or individual) radio communication apparatus (the single (or individual) radio communication apparatus is a target apparatus for reception), i.e., a unicast data symbol (for example, a symbol transmitted to the single (or individual) radio communication apparatus and received by the single (or individual) radio communication apparatus).

The radio communication apparatus mounted on automobile 3710_1 transmits codirectional-automobile multicast data symbol 4602_1 using the second subcarrier group at the third time, and transmits codirectional-automobile unicast data symbol 4612_1 using the fifth subcarrier group at the third time.

Note that codirectional-automobile multicast data symbol 4602_1 is the data symbol described at "Case 2" of Example 3, and is further a data symbol used by the radio communication apparatus mounted on automobile 3710_1 to transmit a data symbol transmitted to a plurality of radio communication apparatuses (the plurality of radio communication apparatuses are target apparatuses for reception), i.e., a multicast (broadcast) data symbol.

Note that codirectional-automobile unicast data symbol 4612_1 is the data symbol described at "Case 2" of Example 3, and is further defined as a symbol used by the radio communication apparatus mounted on automobile 3710_1 to transmit a data symbol transmitted, for example, to a single (or individual) radio communication apparatus (the single (or individual) radio communication apparatus is a target apparatus for reception), i.e., a unicast data symbol (for example, a symbol transmitted to the single (or individual) radio communication apparatus and received by the single (or individual) radio communication apparatus).

The radio communication apparatus mounted on automobile 3710_1 transmits oncoming-automobile multicast data symbol 4603_1 using the third subcarrier group at the third time, and transmits oncoming-automobile unicast data symbol 4613_1 using the sixth subcarrier group at the third time.

Note that oncoming-automobile multicast data symbol 4603_1 is the data symbol described at "Case 3" of Example 3, and is further a data symbol used by the radio communication apparatus mounted on automobile 3710_1 to transmit a data symbol transmitted to a plurality of radio communication apparatuses (the plurality of radio communication apparatuses are target apparatuses for reception), i.e., a multicast (broadcast) data symbol.

Note that oncoming-automobile unicast data symbol 4613_1 is the data symbol described at "Case 3" of Example 3, and is further defined as a symbol used by the radio communication apparatus mounted on automobile 3710_1 to transmit a data symbol transmitted, for example, to a single (or individual) radio communication apparatus (the single (or individual) radio communication apparatus is a target apparatus for reception), i.e., a unicast data symbol (for example, a symbol transmitted to the single (or individual) radio communication apparatus and received by the single (or individual) radio communication apparatus).

Figure 32:
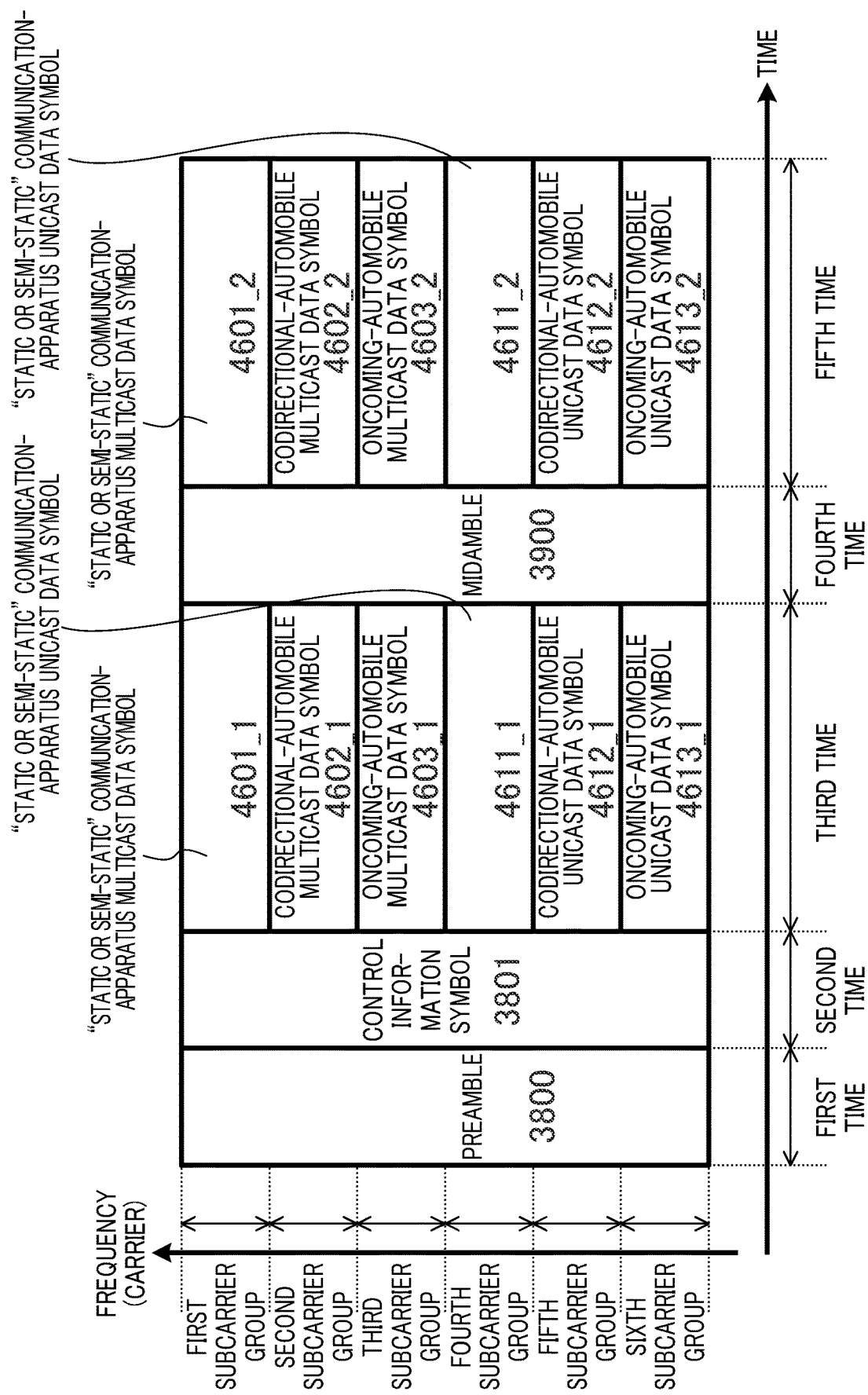
FIG. 32 illustrates an example of the frame configuration.

FIG. 32 illustrates an example of the "frame configuration of the modulation signal transmitted by the radio communication apparatus mounted on automobile 3710_1," which is different from the example of FIG. 31. Note that the modulation signal transmitted by the radio communication apparatus mounted on automobile 3710_1 is the same modulation signal as in Example 3 and, accordingly, the description thereof is omitted here. Note also that components in FIG. 32 that operate in the same manner as those in FIG. 31 are provided with the same reference numerals, and the descriptions of those components are omitted below.

In FIG. 32, the horizontal axis represents time, and the vertical axis represents the frequency (carrier or subcarrier). As illustrated in FIG. 32, a "first subcarrier group," "second subcarrier group," "third subcarrier group," "fourth subcarrier group," "fifth subcarrier group," and "sixth subcarrier group" exist on the frequency axis, for example. Note that, each of the subcarrier groups is composed of one or more subcarriers. Note that the subcarrier group may be described as "carrier group."

As illustrated in FIG. 32, the radio communication apparatus mounted on automobile 3710_1 transmits midamble 3900 using the "first subcarrier group, second subcarrier group, third subcarrier group, fourth subcarrier group, fifth subcarrier group, and sixth subcarrier group" at the fourth time. Midamble 3900 has already been described in Example 3 and, accordingly, the description thereof is omitted here.

The radio communication apparatus mounted on automobile 3710_1 transmits a multicast data symbol and a unicast data symbol of each of the data symbols respectively in different subcarrier groups at the fifth time in the same manner as at the third time.

The error correction coding scheme, the modulation scheme, and the transmission method used for generating each of the data symbols in FIGS. 31 and 32 are the same as those in Example 3 and, accordingly, the descriptions thereof are omitted here.

It is thus possible to select an error correction coding scheme, a modulation scheme (a set of modulation schemes), and a transmission method that are suitable with respect to the influence of the Doppler (shift) frequency of each of the communication partners different in relative speed, so that data reception quality at the communication partner is improved.

The insertion method and the insertion rule for the pilot symbols (reference symbols) included in the data symbols may be separately configured. The pilot symbols (reference symbols) are the same as those in Example 3 and, accordingly, the descriptions thereof are omitted here.

It is thus possible to select an insertion method and an insertion rule for the pilot symbols (reference symbols) that are suitable with respect to the influence of the Doppler (shift) frequency of each of the communication partners different in relative speed, so that data reception quality at the communication partner is improved. Note that, the modifications of the insertion method and the insertion rule for the pilot symbols have already been described in Example 3 with reference to FIGS. 25A, 25B, 25C, 25D, 25E, 25F, 25G, and 25H, and accordingly, such modifications are not described here.

In FIGS. 31 and 32, an error correction coding scheme (e.g., the type of error correction code, coding rate, code length, and the like for use), a modulation scheme, a transmission method, and an insertion method and an insertion rule for a pilot symbol (reference symbol) to be used for generating each of the data symbols (4611_1, 4611_2, 4612_1, 4612_2, 4613_1, and 4613_2) are configured in consideration, for example, of the situation of the radio communication apparatus mounted on automobile 3710_1 and a "communication partner of the radio communication apparatus mounted on automobile 3710_1." These may be configured in anyway.

In the present embodiment, the "multicast data symbols and unicast data symbol" for "static or semi-static" communication exist, the "multicast data symbol and unicast data symbol" for codirectional automobiles exist, and the "multicast data symbol and unicast data symbol" for oncoming automobiles exist further to Example 3. Accordingly, in Example 4 as in Example 3, communication can be performed in consideration of the situation of the communication partner (for example, a difference in Doppler (shift) frequency caused by a difference in relative speed), and unicast communication and multicast communication can be performed in consideration of the situation of the communication partner (for example, Doppler (shift) frequency), so that the data reception quality of the communication partner can be further improved.

Note that control information symbol 3801 in FIGS. 31 and 32 includes, as in Example 3, information used by the reception apparatus for demodulation, such as e.g., information on the error correction code, information on the modulation scheme, information on the transmission method, information on the frame configuration, "information indicating whether each data symbol is a unicast data symbol or a multicast data symbol," and/or the like for generating each data symbol. Thus, the reception apparatus can demodulate the data symbols by obtaining the information included in control information symbol 3801.

Note that the frame configurations illustrated in FIGS. 31 and 32 are only examples, and the present example can be implemented even with a different frame configuration from those of FIGS. 31 and 32.

In addition, in the description with reference to FIG. 32, the subcarrier groups used for the data symbols at the third time are the same as the subcarrier groups used for the data symbols at the fifth time. However, some or all of the subcarrier groups used for the data symbols at the third time may be different from the subcarrier groups used for the data symbols at the fifth time.

In addition, each of FIGS. 31 and 32 illustrates the example in which the multicast data symbols (4601_1, 4601_2, 4602_1, 4602_2, 4603_1, and/or 4603_2) and the unicast data symbols (4611_1, 4611_2, 4612_1, 4612_2, 4613_1, and/or 4613_2) exist in the frame. However, the frame configuration may be a frame configuration in which at least one data symbol of the multicast data symbols (4601_1, 4601_2, 4602_1, 4602_2, 4603_1, and 4603_2) and at least one data symbol of the unicast data symbols (4611_1, 4611_2, 4612_1, 4612_2, 4613_1, and 4613_2) exist.

Note that, the configuration examples of the transmission apparatus transmitting the modulation signal of the frame configuration of FIG. 31 or 32 and the reception apparatus receiving the modulation signal are "FIGS. 1 and 27" and "FIGS. 4 and 28," respectively. The operations of "FIGS. 1 and 27" and "FIGS. 4 and 28" have already been described above, and accordingly, the descriptions thereof are omitted here.

Further, in the case of transmission of each unicast data symbol by the radio communication apparatus of FIG. 1 or 27, the communication partner of the radio communication apparatus transmits a modulation signal including a request for transmission of the unicast data symbol.

For example, the radio communication apparatus of FIG. 1 receives the modulation signal at reception-antenna group 151 and performs predetermined processing on the received modulation signal to obtain request information from the communication partner. Based on the request information, setter 158 in FIG. 1 then instructs generation of the unicast symbol, arrangement of frames, and the like.

Similarly, the radio communication apparatus of FIG. 27 receives the modulation signal at reception antenna 4251 and performs predetermined processing on the received modulation signal to obtain the request information. Based on the request information, setter 4258 in FIG. 27 then instructs generation of the unicast symbol, arrangement of frames, and the like, for example.

Next, an example of the frame configuration of the modulation signal transmitted by the radio communication apparatus mounted on automobile 3710_1 in the situation of FIG. 22, which is different from the example of FIG. 31 or 32, will be described.

Figure 33:
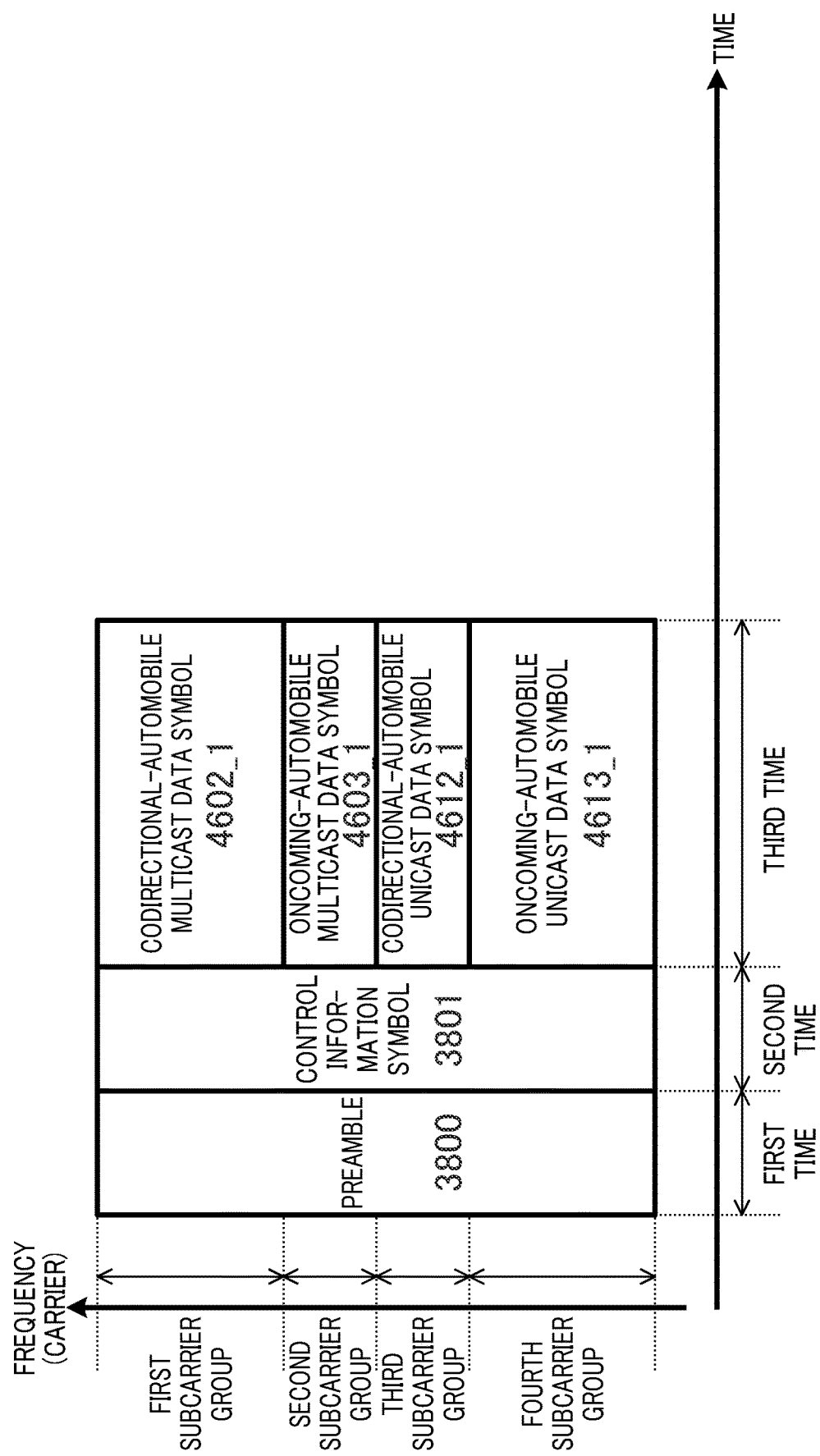
FIG. 33 illustrates an example of the frame configuration.

FIG. 33 illustrates an example of the "frame configuration of the modulation signal transmitted by the radio communication apparatus mounted on automobile 3710_1." Note that the modulation signal transmitted by the radio communication apparatus mounted on automobile 3710_1 is a modulation signal of the "OFDMA allowing multiple users to access by OFDM" or a modulation signal of the "scheme allowing multiple users to access by the multicarrier transmission scheme."

In FIG. 33, the horizontal axis represents time, and the vertical axis represents the frequency (carrier or subcarrier). As illustrated in FIG. 33, a "first subcarrier group," "second subcarrier group," "third subcarrier group," and "fourth subcarrier group" are present on the frequency axis. Note that, each of the subcarrier groups is composed of one or more subcarriers. Note that the subcarrier group may be described as "carrier group."

Then, as illustrated in FIG. 33, the radio communication apparatus mounted on automobile 3710_1 transmits preamble 3800 using the first subcarrier group, the second subcarrier group, the third subcarrier group, and the fourth subcarrier group at the first time. Preamble 3800 is the same as in Example 3 and, accordingly, the description thereof is omitted.

The radio communication apparatus mounted on automobile 3710_1 transmits control information symbol 3801 using the first subcarrier group, the second subcarrier group, the third subcarrier group, and the fourth subcarrier group at the second time. The configuration of control information symbol 3801 is as described above.

In FIG. 33, the radio communication apparatus mounted on automobile 3710_1 transmits codirectional-automobile multicast data symbol 4602_1 using the first subcarrier group at the third time. Note that codirectional-automobile multicast data symbol 4602_1 is the same as that illustrated in FIGS. 31 and 32, and accordingly, the description thereof is omitted here.

The radio communication apparatus mounted on automobile 3710_1 transmits oncoming-automobile multicast data symbol 4603_1 using the second subcarrier group at the third time. Note that oncoming-automobile multicast data symbol 4603_1 is the same as that illustrated in FIGS. 31 and 32, and accordingly, the description thereof is omitted here.

The radio communication apparatus mounted on automobile 3710_1 transmits codirectional-automobile unicast data symbol 4612_1 using the third subcarrier group at the third time. Note that codirectional-automobile unicast data symbol 4612_1 is the same as that illustrated in FIGS. 31 and 32, and accordingly, the description thereof is omitted here.

The radio communication apparatus mounted on automobile 3710_1 transmits oncoming-automobile unicast data symbol 4613_1 using the fourth subcarrier group at the third time. Note that oncoming-automobile unicast data symbol 4613_1 is the same as that illustrated in FIGS. 31 and 32, and accordingly, the description thereof is omitted here.

Note that, as in Example 3, the radio communication apparatus possessed by "person 3712" and communication apparatus 3713 in FIG. 22 may receive "codirectional-automobile multicast data symbol 4602_1" or "codirectional-automobile unicast data symbol 4612_1" to obtain data, or may receive the "oncoming-automobile multicast data symbol 4603_1" or "oncoming-automobile unicast data symbol 4613_1" to obtain data in the case of the frame configuration illustrated in FIG. 33.

However, in the case where radio communication apparatuses mounted on codirectional automobiles form a multi-hop network or a mesh network, the radio communication apparatus possessed by "person 3712" and communication apparatus 3713 may receive the "oncoming-automobile multicast data symbol 4603_1" or "oncoming-automobile unicast data symbol 4613_1" to obtain data as in Example 3.

Thus, even "codirectional-automobile multicast data symbol 4602_1" and "codirectional-automobile unicast data symbol 4612_1" may include data to be transmitted to the radio communication apparatus possessed by "person 3712" and communication apparatus 3713 that are "static or semi-static" communication apparatuses. In addition, even "oncoming-automobile multicast data symbol 4603_1" and "oncoming-automobile unicast data symbol 4613_1" may include data to be transmitted to the radio communication apparatus possessed by "person 3712" and communication apparatus 3713 that are "static or semi-static" communication apparatuses.

Figure 34:
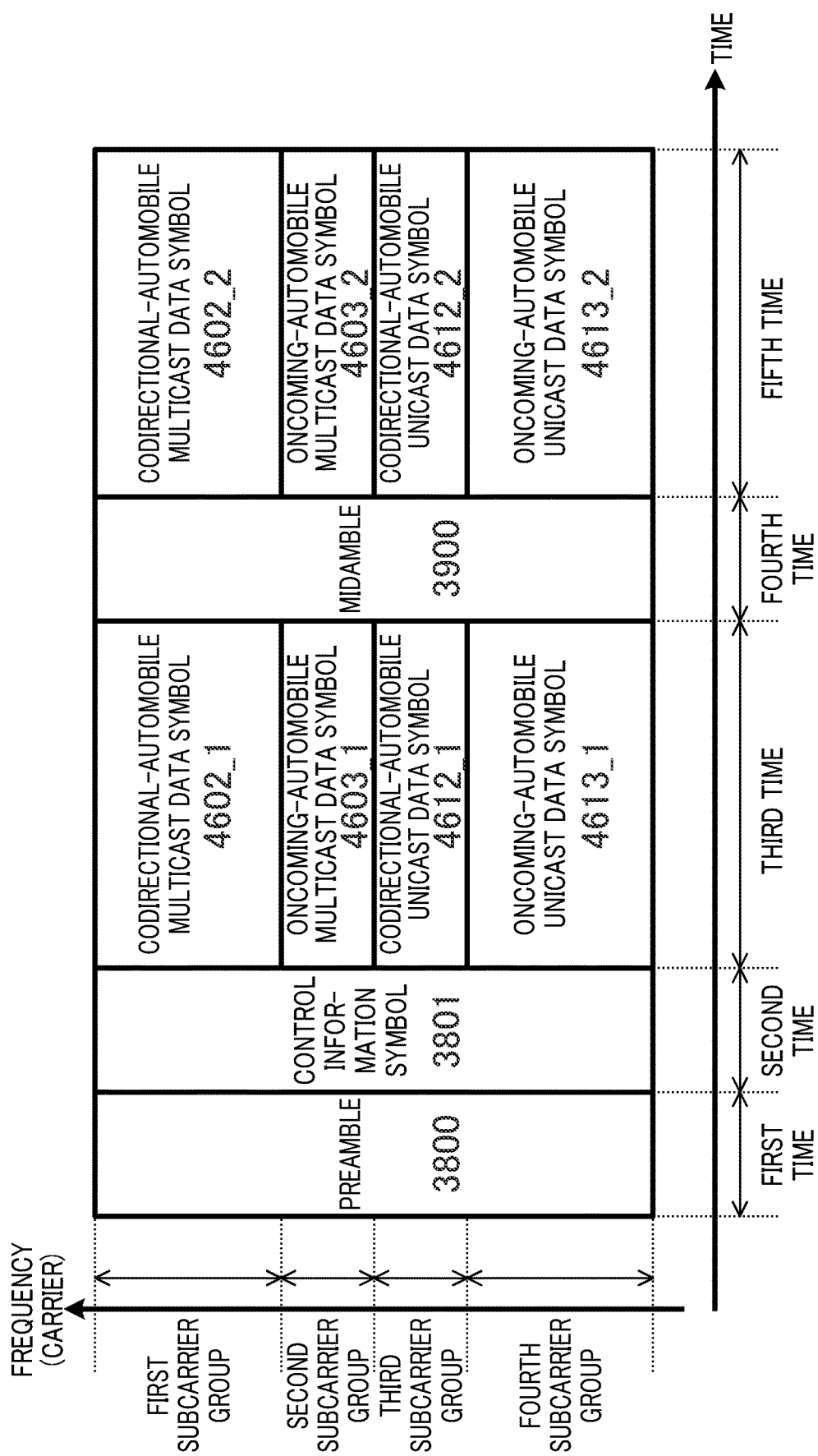
FIG. 34 illustrates an example of the frame configuration.

FIG. 34 illustrates an example of the "frame configuration of the modulation signal transmitted by the radio communication apparatus mounted on automobile 3710_1," which is different from the example of FIG. 33. Note that the modulation signal transmitted by the radio communication apparatus mounted on automobile 3710_1 is a modulation signal of the "OFDMA allowing multiple users to access by OFDM" or a modulation signal of the "scheme allowing multiple users to access by the multicarrier transmission scheme." Note also that components that operate in the same manner as those in FIG. 33 are provided with the same reference numerals, and the descriptions of those components are omitted.

As illustrated in FIG. 34, the radio communication apparatus mounted on automobile 3710_1 transmits midamble 3900 using the "first subcarrier group, second subcarrier group, third subcarrier group, and fourth subcarrier group" at the fourth time. Midamble 3900 is the same as in Example 3 and, accordingly, the description thereof is omitted.

In FIG. 34, the radio communication apparatus mounted on automobile 3710_1 transmits codirectional-automobile multicast data symbol 46022 using the first subcarrier group at the fifth time. Note that codirectional-automobile multicast data symbol 4602_2 is the same as that illustrated in FIGS. 31 and 32, and accordingly, the description thereof is omitted here.

The radio communication apparatus mounted on automobile 3710_1 transmits oncoming-automobile multicast data symbol 4603_2 using the second subcarrier group at the fifth time. Note that oncoming-automobile multicast data symbol 4603_2 is the same as that illustrated in FIGS. 31 and 32, and accordingly, the description thereof is omitted here.

The radio communication apparatus mounted on automobile 3710_1 transmits codirectional-automobile unicast data symbol 4612_2 using the third subcarrier group at the fifth time. Note that codirectional-automobile unicast data symbol 4612_2 is the same as that illustrated in FIGS. 31 and 32, and accordingly, the description thereof is omitted here.

The radio communication apparatus mounted on automobile 3710_1 transmits oncoming-automobile unicast data symbol 4613_2 using the fourth subcarrier group at the fifth time. Note that oncoming-automobile unicast data symbol 4613_2 is the same as that illustrated in FIGS. 31 and 32, and accordingly, the description thereof is omitted here.

Note that, the radio communication apparatus possessed by "person 3712" and communication apparatus 3713 in FIG. 22 may receive "codirectional-automobile multicast data symbols 4602_1 and/or 4602_2" or "codirectional-automobile unicast data symbols 4612_1 and/or 4612_2" to obtain data, or may receive the "oncoming-automobile multicast data symbols 4603_1 and/or 4603_2" or "oncoming-automobile unicast data symbols 4613_1 and/or 4613_2" to obtain data in the case of the frame configuration illustrated in FIG. 34.

However, in the case where radio communication apparatuses mounted on codirectional automobiles form a multihop network or a mesh network, the radio communication apparatus possessed by "person 3712" and communication apparatus 3713 may receive "oncoming-automobile multicast data symbols 4603_1 and/or 4603_2" or "oncoming-automobile unicast data symbols 4613_1 and/or 4613_2" to obtain data.

Thus, "codirectional-automobile multicast data symbols 4602_1 and 4602_2" and "codirectional-automobile unicast data symbols 4612_1 and 4612_2" may include data to be transmitted to the radio communication apparatus possessed by "person 3712" and communication apparatus 3713. In addition, "oncoming-automobile multicast data symbols 4603_1 and 4603_2" and "oncoming-automobile unicast data symbols 4613_1 and 4613_2" may include data to be transmitted to the radio communication apparatus possessed by "person 3712" and communication apparatus 3713.

In FIGS. 33 and 34, the error correction coding scheme, the modulation scheme, and the transmission method used for generating each of the data symbols (4602_1, 4602_2, 4603_1, 4603_2, 4612_1, 4612_2, 4613_1, and 4613_2) may be separately configurable.

It is thus possible to select an error correction coding scheme, a modulation scheme (a set of modulation schemes), and a transmission method that are suitable with respect to the influence of the Doppler (shift) frequency of the communication partner, so that data reception quality at the communication partner is improved.

In addition, the insertion method and the insertion rule for pilot symbols (reference symbols) included in codirectional-automobile multicast data symbols 4602_1 and 4602_2 and for pilot symbols (reference symbols) included in oncoming-automobile multicast data symbols 4603_1 and 4603_2 may be separately configured. The pilot symbols (reference symbols) are symbols for a reception apparatus receiving a modulation signal, for example, to perform time synchronization, frequency synchronization, frequency offset estimation, channel estimation, or the like.

It is thus possible to select an insertion method and an insertion rule for the pilot symbols (reference symbols) that are suitable with respect to the influence of the Doppler (shift) frequency on the communication partner, so that data reception quality at the communication partner is improved. Note that, the modifications of the insertion method and the insertion rule for the pilot symbols have already been described in Example 1 with reference to FIGS. 25A, 25B, 25C, 25D, 25E, 25F, 25G, and 25H, and accordingly, such modifications are not described here.

In FIGS. 33 and 34, an error correction coding scheme (e.g., the type of error correction code, coding rate, code length, and the like for use), a modulation scheme, a transmission method, and an insertion method and an insertion rule for a pilot symbol (reference symbol) to be used for generating each of the data symbols (4602_1, 4602_2, 4603_1, 4603_2, 4612_1, 4612_2, 4613_1, and 4613_2) are configured in consideration, for example, of the situation and the like of the radio communication apparatus mounted on automobile 3710_1 and a "communication partner of the radio communication apparatus mounted on automobile 3710_1." These may be configured in anyway.

Here, in the present example, the "multicast data symbol and unicast data symbol" for codirectional automobiles exist, and the "multicast data symbol and unicast data symbol" for oncoming automobiles exist further to Example 3. Accordingly, as in Example 3, communication can be performed in consideration of the situation of the communication partner (for example, Doppler (shift) frequency), and unicast communication or multicast communication can be performed in consideration of the situation of the communication partner (for example, Doppler (shift) frequency), so that the data reception quality of the communication partner can be further improved.

Note that control information symbol 3801 in FIGS. 33 and 34 includes information used by the reception apparatus for demodulation, such as e.g., information on the frame configuration, information on the error correction code and information on the modulation scheme for generating each of the data symbols (4602_1, 4602_2, 4603_1, 4603_2, 4612_1, 4612_2, 4613_1, and 4613_2), information on the transmission method, and "information indicating whether each of the data symbols is a unicast data symbol or a multicast data symbol." Thus, the reception apparatus can demodulate the data symbol by obtaining the information included in control information symbol 3801.

Note that the frame configurations illustrated in FIGS. 33 and 34 are only examples, and the present example can be implemented even with a different frame configuration from those of FIGS. 33 and 34.

In addition, in the description with reference to FIG. 34, the subcarrier groups used for the data symbols (4602_1, 4603_1, 4612_1, and 4613_1) at the third time are the same as the subcarrier groups used for the data symbols (4602_2, 4603_2, 4612_2, and 4613_2) at the fifth time. However, some or all of the subcarrier groups used for the data symbols (4602_1, 4603_1, 4612_1, and 4613_1) at the third time may be different from the subcarrier groups used for the data symbols (4602_2, 4603_2, 4612_2, and 4613_2) at the fifth time.

Further, each of FIGS. 33 and 34 illustrates the example in which "codirectional-automobile multicast data symbols 4602_1 and/or 4602_2," "oncoming-automobile multicast data symbols 4603_1 and/or 4603_2," "codirectional-automobile unicast data symbols 4612_1 and/or 4612_2," and "oncoming-automobile unicast data symbols 4613_1 and/or 4613_2" exist in the frame. However, the frame may have a frame configuration in which at least one data symbol among "codirectional-automobile multicast data symbols 4602_1 and 4602_2" and "oncoming-automobile multicast data symbols 4603_1 and 4603_2" exists, and at least one data symbol among "codirectional-automobile unicast data symbols 4612_1 and 4612_2" and "oncoming-automobile unicast data symbols 4613_1 and 4613_2" exists.

Note that, the configuration examples of the transmission apparatus transmitting the modulation signal of the frame configuration of FIG. 33 or 34 and the reception apparatus receiving the modulation signal are "FIGS. 1 and 27" and "FIGS. 4 and 28," respectively. The operations of "FIGS. 1 and 27" and "FIGS. 4 and 28" have already been described above, and accordingly, the descriptions thereof are omitted here.

Further, in the case of transmission of a unicast data symbol by the radio communication apparatus of FIG. 1 or 27, the communication partner of the radio communication apparatus transmits a modulation signal including a request for transmission of the unicast data symbol.

For example, the radio communication apparatus of FIG. 1 receives the modulation signal at reception-antenna group 151 and performs predetermined processing on the received modulation signal to obtain request information from the communication partner. Based on the request information, setter 158 in FIG. 1 then instructs generation of the unicast symbol and arrangement of frames, for example.

Similarly, the radio communication apparatus of FIG. 27 receives the modulation signal at reception antenna 4251 and performs predetermined processing on the received modulation signal to obtain the request information from the communication partner. Based on the request information, setter 4258 in FIG. 27 then instructs generation of the unicast symbol, arrangement of frames, and the like, for example.

In the frame configuration (FIG. 31, 32, 33, or 34) described in the present example, the "data included in 'static or semi-static' communication-apparatus multicast data symbol 4601_1 or 4601_2," the "data included in codirectional-automobile multicast data symbol 4602_1 or 4602_2," and the "data included in oncoming-automobile multicast data symbol 4603_1 or 4603_2" may include the same information and/or the same data as described in other examples.

It is thus possible to broadcast data to more radio communication apparatuses within a certain time interval.

The frame configurations (FIGS. 31, 32, 33, and 34) may include symbols other than those illustrated in the figures. Additionally, for MIMO, the frame configuration illustrated in FIG. 31, 32, 33, or 34 may be applied to each stream or each modulation signal.

Further, the radio communication apparatus can select "the frame configuration of FIG. 23, 24, 29, or 30 described in Example 3, or the frame configuration of FIG. 31, 32, 33, or 34 described in the present example." For example, the radio communication apparatus may select any one of the "frame configurations of FIGS. 23, 24, 29, and 30 described in Example 3" and the "frame configurations of FIGS. 31, 32, 33, and 34 described in the present example" depending on the environment such as the communication situation, and transmit the modulation signal.

Thus, the data reception quality at the communication partner of the radio communication apparatus is improved.

<Supplement 2>

It is needless to say that the examples described in the present specification may be implemented by combining the examples with a plurality of other contents such as the supplements.

In addition, the configuration of the base station is not limited to FIGS. 1 and 3 as examples, and a base station which includes a plurality of transmission antennas, and generates and transmits a plurality of transmission beams (transmission directional beams) is capable of implementing the present disclosure.

Further, the examples are mere examples, and the "modulation scheme, error correction coding scheme (error correction code, code length, coding rate, and the like for use), control information, and the like" are illustrated in the examples, for example. However, it is possible to implement the present disclosure with a similar configuration even when a "modulation scheme, error correction coding scheme (error correction code, code length, coding rate, and the like for use), control information, and the like" different from the illustrations are applied.

As for modulation schemes, the embodiments, examples, and other contents described in this specification can be implemented even when a modulation scheme other than the modulation scheme described in this specification is used. For example, APSK (e.g., 16APSK, 64APSK, 128APSK, 256APSK, 1024APSK, 4096APSK, or the like), PAM (e.g., 4PAM, 8PAM, 16PAM, 64PAM, 128PAM, 256PAM, 1024PAM, 4096PAM, or the like), PSK (e.g., BPSK, QPSK, 8PSK, 16PSK, 64PSK, 128PSK, 256PSK, 1024PSK, 4096PSK, or the like), QAM (e.g., 4QAM, 8QAM, 16QAM, 64QAM, 128QAM, 256QAM, 1024QAM, 4096QAM, or the like), and/or the like may be applied, and uniform mapping and non-uniform mapping may be used in each of the modulation schemes. In addition, the method of arranging signal points (e.g., 2, 4, 8, 16, 64, 128, 256, or 1024 signal points) on the I-Q plane (modulation scheme with 2, 4, 8, 16, 64, 128, 256, or 1024 signal points or other number of signal points) is not limited to the signal-point arrangement method of the modulation scheme indicated in the present specification.

In this specification, it is considered that a communication/broadcast device such as a broadcast station, a base station, an access point, a terminal, a mobile phone, or the like includes the transmission apparatus, and in this case, it is considered that a communication apparatus such as a television, a radio, a terminal, a personal computer, a mobile phone, an access point, a base station, or the like includes the reception apparatus. Further, it is considered that the transmission apparatus and the reception apparatus in the present disclosure are devices having a communication function, and the devices are configured to be capable of being connected via some interface to an apparatus for executing an application of a television, a radio, a personal computer, a mobile phone, or the like. In addition, symbols other than data symbols, for example, a pilot symbol (preamble, unique word, postamble, or reference symbol), a control information symbol, and the like may be arranged in any manner in a frame in the present embodiment. Further, symbols as referred to as pilot symbol and control information symbol in the present specification may be called by any name and the symbols are distinguishable by function of the symbols.

The pilot symbol may be a known symbol modulated using PSK modulation in a transceiver, for example, and a receiver uses this symbol to perform frequency synchronization, time synchronization, channel estimation of each modulation signal (estimation of Channel State Information (CSI)), signal detection, and the like. Alternatively, the receiver may synchronize to the pilot symbol so as to be capable of knowing a symbol transmitted by the transmitter.

In addition, the control information symbol is a symbol for transmitting information (for example, a modulation scheme, an error correction coding scheme, a coding rate of the error correction coding scheme, configuration information of a higher layer, and/or the like used for communication) other than data (data of an application or the like), which is to be transmitted to a communication partner for realizing communication.

Note that the present disclosure is not limited to each of the examples, and can be implemented with various modifications. For example, each of the examples has been described in which the example is performed as the communication apparatus, but the present disclosure is not limited to this, and the communication method can be performed as software.

Note that a program for executing the above communication method, for example, may be stored in a ROM in advance, and the program may be operated by a CPU.

Further, the program for executing the above communication method may be stored in a computer-readable storage medium, the program stored in the storage medium may be recorded in a RAM of the computer, and the computer may be operated in accordance with the program.

The configurations of each of the above examples may typically be implemented as an LSI that is an integrated circuit having an input terminal and an output terminal. These configurations may be individually formed into single chips, or may be formed into one chip to include all or some of the configurations of each of the examples. In this case, an appellation "LSI" is employed. However, depending on the degree of integration, appellations such as IC, system LSI, super LSI, and ultra LSI may be employed. In addition, the technique of circuit integration is not limited to the LSI, and it may be realized by a dedicated circuit or a general-purpose processor. An FPGA that can be programmed after LSI fabrication or a reconfigurable processor that can reconfigure connections and settings of circuit cells inside the LSI may be used. If future integrated circuit technology replaces LSIs as a result of the advancement of semiconductor technology or other derivative technology, the functional blocks could be integrated using the future integrated circuit technology. Biotechnology can also be applied.

The various frame configurations have been described in the present specification. For example, a base station (AP) including the transmission apparatus of FIG. 1 transmits the modulation signals of the frame configurations described herein using a multi-carrier scheme such as the OFDM scheme. In this case, an application method can be considered in which, when a terminal (user) communicating with the base station (AP) transmits a modulation signal, the modulation signal transmitted by the terminal is of a single carrier system. (The base station (AP) can transmit a data symbol group to a plurality of terminals at the same time by using the OFDM system, and the terminals also can reduce power consumption by using the single carrier system.)

Further, a terminal may apply a Time Division Duplex (TDD) scheme for transmitting a modulation scheme using a part of a frequency band used for a modulation signal transmitted by the base station (AP).

The configuration of each of antenna sections 106-1, 106-2, ..., and 106-M in FIG. 1 is not limited to the configuration described in relation to the embodiment. For example, each of antenna sections 106-1, 106-2, ..., and 106-M may not be composed of a plurality of antennas, and/or each of antenna sections 106-1, 106-2, ..., and 106-M may not receive an input of signal 159.

The configuration of each of antenna sections 401-1, 401-2, ..., and 401-N in FIG. 4 is not limited to the configuration described in relation to the embodiment. For example, each of antenna sections 401-1, 401-2, ..., and 401-N may not be composed of a plurality of antennas, and/or each of antenna sections 401-1, 401-2, ..., and 401-N may not receive an input of signal 410.

<Supplement 3>

Note that, although the symbols illustrated in FIGS. 23, 24, 29, 30, 31, 32, 33, and 34 have been described as frames transmitted by the base station, the symbols may be frames transmitted by any of communication apparatus 3713 and automobiles 3710 and 3711.

Note that any of the base station, communication apparatus 3713, and automobiles 3710 and 3711 may transmit "'static or semi-static' communication-apparatus group-cast data symbol," "codirectional-automobile group-cast data symbol," and "oncoming-automobile group-cast data symbol" instead of "'static or semi-static' communication-apparatus data symbol," "codirectional-automobile data symbol," and "oncoming-automobile data symbol." Further, a unicast data symbol, group-cast data symbol, and multicast data symbol may be mixed in one frame.

Here, "group-cast" means transmission of a data symbol to one or more communication apparatuses that meet a certain condition, for example. For example, attribute information meeting the condition of "'static or semi-static' communication-apparatus group-cast data symbol" can be set as "communication terminal possessed by a human."

While the transmission destination of the "'static or semi-static' communication-apparatus data symbol" is an "other statically-moving, semistatically-moving, or non-moving (stationary) communication apparatus," and may thus be a roadside apparatus or a communication terminal possessed by a pedestrian, the communication terminal possessed by the human can be set as the transmission destination of group-cast.

Note that, the communication terminal can have one or more pieces of attribute information meeting the conditions for group-cast. For example, the communication terminal may have attribute information "large vehicle" and attribute information "bicycle" that meet the conditions for group-cast. That is, when a transmitting communication apparatus (communication terminal or base station) includes the attribute information for group-cast in the frame and transmits the frame, a receiving communication terminal is capable of obtaining the attribute information from the frame, knowing the attribute of group-cast (data symbol), and determining whether or not to receive the data symbol.

Note that, when one communication terminal has a plurality of IP addresses that differ for each attribute, the communication terminal is capable of indicating the attribute by each of the IP addresses, for example. Thus, the receiving communication terminal is capable of knowing the destination (attribute) of group-cast (data symbol) by obtaining the IP address as destination information for transmission by the transmitting communication terminal. Note that, other examples of the attribute may include a normal passenger vehicle, large vehicle, motorcycle, bicycle, roadside apparatus, human age, human sex, and the like.

Note that, the attributes of the transmission destinations can also be configured respectively for the "codirectional-automobile group-cast data symbol" and the "oncoming-automobile group-cast data symbol," separately.

Note that, in the multicast and group-cast, communication terminals to which a frame is transmitted may all be different, or the same frame may be transmitted to one or more of the communication terminals.

Note that, control information symbol 3801 may include information on the destination of the "codirectional-automobile unicast data symbol," information on the destination of the "oncoming-automobile unicast data symbol," information on Modulation and Coding Scheme (MCS) for each data symbol, and information on the insertion method for the pilot symbol of each data symbol. The information on the destination of the "oncoming-automobile unicast data symbol" may, for example, be information on Basic Service Set Identifier (BSSID) of a terminal as the destination, or information on the Media access Control (MAC) address of the terminal as the destination.

In addition, control information symbol 3801 may include: information on the destination of "'static or semi-static' communication-apparatus multicast data symbol 4601," "codirectional-automobile multicast data symbol 4602," or "oncoming-automobile multicast data symbol 4603" which indicates that the data symbol is multicast; information on the MCS of each data symbol; and information on the insertion method for the pilot symbol of each data symbol. The information on the destination of "oncoming-automobile multicast data symbol 4603" which indicates that the data symbol is multicast may, for example, be information on MAC addresses indicating multicast or BSSIDs indicating multicast.

In addition, control information symbol 3801 may include: information on the destination of "'static or semi-static' communication-apparatus group-cast data symbol," "codirectional-automobile group-cast data symbol," or "oncoming-automobile group-cast data symbol" which indicates that the data symbol is group-cast; information on the MCS of each data symbol; and information on the insertion method for the pilot symbol of each data symbol. The information on the destination of "oncoming-automobile group-cast data symbol" which indicates that the data symbol is group-cast may, for example, be information on MAC addresses indicating group-cast or BSSIDs indicating group-cast.

The radio communication apparatus mounted on the automobile (or vehicle) and/or communication apparatus may transmit multiple streams of modulation signals using a plurality of antennas at the same time using the same or common frequency or frequency band.

Accordingly, the radio communication apparatus mounted on the automobile (or vehicle) and/or the communication apparatus may transmit the modulation signals by the transmission method of Multiple Input Multiple Output (MIMO) or the transmission method of Multiple Input Single Output (MISO).

Note that "common frequency" means that part of "frequencies or frequency bands" are used in common.

Note also that, the radio communication apparatus mounted on the automobile (or vehicle) and/or communication apparatus may receive a modulation signal transmitted by a communication partner using a plurality of reception antennas.

The transmission apparatus included in the communication apparatus and/or the radio communication apparatus described in the present disclosure may transmit the modulation signal without performing transmission directivity control, or may perform transmission directivity control that is different for each data symbol. Accordingly, the transmission apparatus may perform directivity control that is different for each frequency (i.e., carrier).

Further, the reception apparatus included in the communication apparatus and/or the radio communication apparatus described in the present disclosure may receive the modulation signal without performing reception directivity control.

Note that, there may be a subcarrier in which no symbol is transmitted or time at which no symbol exists in the frames illustrated in FIGS. 23, 24, 29, 30, 31, 32, 33, and 34.

For example, in FIG. 23, the frame configuration may be a frame configuration in which at least one of codirectional-automobile data symbol 3803_1 and oncoming-automobile data symbol 3804_1 does not exist.

For example, in FIG. 24, the frame configuration may be a frame configuration in which at least one of codirectional-automobile data symbol 3803_1, codirectional-automobile data symbol 3803_2, oncoming-automobile data symbol 3804_1, and oncoming-automobile data symbol 3804_2 does not exist.

For example, in FIG. 31, the frame configuration may be a frame configuration in which at least one symbol of "static or semi-static" communication multicast data symbols 4601_1 and 4611_1, codirectional-automobile multicast data symbols 4602_1 and 4612_1, and oncoming-automobile multicast data symbols 4603_1 and 4613_1 does not exist.

For example, in FIG. 32, the frame configuration may be a frame configuration in which at least one symbol of "static or semi-static" communication multicast data symbols 4601_1 and 4601_2, codirectional automobile multicast data symbols 4602_1 and 4602_2, oncoming-automobile multicast data symbols 4603_1 and 4603_2, "static or semi-static" communication-apparatus unicast data symbols 4611_1 and 4611_2, codirectional-automobile unicast data symbols 4612_1 and 4612_2, and oncoming-automobile unicast data symbols 4613_1 and 4613_2 does not exist.

In the above descriptions, the expression "section" used for the components may be replaced with another expression such as "circuit (circuitry)," "device," "unit," or "module."

The present patent application claims the benefit of priority based on Japanese Patent Application No. 2018-111090 filed on Jun. 11, 2018, and the entire content of Japanese Patent Application No. 2018-111090 is hereby incorporated by reference.

INDUSTRIAL APPLICABILITY

The present disclosure is useful for mobile radio communication.

REFERENCE SIGNS LIST

4202, 4305, 4255, 4352 Signal processor
4204, 4303, 4253, 4354 Radio
4206, 4356 Transmission antenna
4251, 4301 Reception antenna
4258 Setter

The invention claimed is:
1. A transmission apparatus that transmits a signal to a plurality of communication apparatuses, the transmission apparatus comprising:
a signal processor, which in operation, generates a first signal addressed to a first communication apparatus whose relative speed to the transmission apparatus is less than a predetermined threshold, and a second signal addressed to a second communication apparatus whose relative speed to the transmission apparatus is equal to or greater than the predetermined threshold; and a radio transmitter, which in operation, transmits the first signal using a first frequency domain and the second signal using a second frequency domain in a first period, and transmits a preamble signal or a midamble signal in a second period before the first period using the first frequency domain and the second frequency domain, the preamble signal or the midamble signal being common to the first communication apparatus and the second communication apparatus.

2. The transmission apparatus according to claim 1, wherein the first signal and the second signal include respective different pilot signals.

3. The transmission apparatus according to claim 1, wherein the transmission apparatus, the first communication apparatus, and the second communication apparatus are included respectively in mobile entities, and a direction of movement of one of the mobile entities including the second communication apparatus is opposite to a direction of movement of one of the mobile entities including the transmission apparatus.

4. The transmission apparatus according to claim 3, wherein the first signal and the second signal have respective different directivities.

5. A transmission method for a transmission apparatus that transmits a signal to a plurality of communication apparatuses, the transmission method comprising:

generating a first signal to be transmitted to a first communication apparatus whose relative speed to the transmission apparatus is less than a predetermined threshold, and a second signal to be transmitted to a second communication apparatus whose relative speed to the transmission apparatus is equal to or greater than the predetermined threshold;

transmitting the first signal using a first frequency domain and the second signal using a second frequency domain in a first period; and transmitting a preamble signal or a midamble signal in a second period before the first period using the first frequency domain and the second frequency domain, the preamble signal or the midamble signal being common to the first communication apparatus and the second communication apparatus.

6. A first communication apparatus, comprising:

a radio receiver, which in operation, receives a first signal addressed to the first communication apparatus from a second communication apparatus, the first communication apparatus having a relative speed to the second communication apparatus that is less than a predetermined threshold, the second communication apparatus addressing a second signal to a third communication apparatus whose relative speed to the second communication apparatus is equal to or greater than the predetermined threshold, wherein the first signal is received using a first frequency domain and the second signal is received using a second frequency domain in a first period, and wherein the radio receiver, in operation, receives a preamble signal or a midamble signal in a second period before the first period using the first frequency domain and the second frequency domain, the preamble signal or the midamble signal being common to the first communication apparatus and the third communication apparatus.

7. A receiving method for a first communication apparatus, the receiving method comprising:

receiving a first signal addressed to the first communication apparatus from a second communication apparatus, the first communication apparatus having a relative speed to the second communication apparatus is less than a predetermined threshold, the second communication apparatus addressing a second signal to a third communication apparatus whose relative speed to the second communication apparatus is equal to or greater than the predetermined threshold, wherein the first signal is received using a first frequency domain and the second signal is received using a second frequency domain in a first period; and receiving a preamble signal or a midamble signal in a second period before the first period using the first frequency domain and the second frequency domain, the preamble signal or the midamble signal being common to the first communication apparatus and the third communication apparatus.

* * * * *